Nov. 19, 1968      J. T. DENNIS      3,411,791
AUTOMATIC RECORD CHANGER
Original Filed Aug. 4, 1958      19 Sheets-Sheet 1
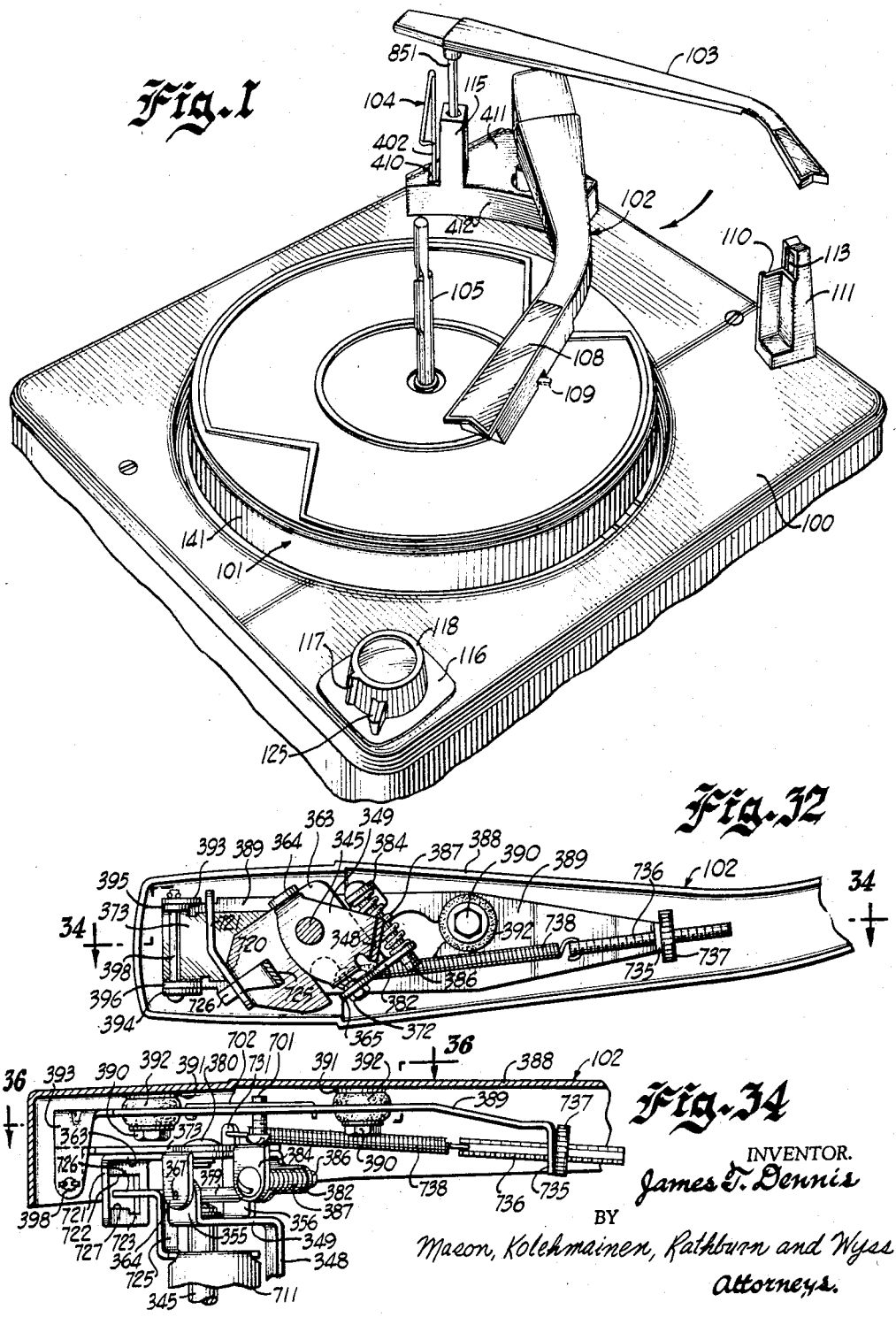
INVENTOR.
James T. Dennis
BY Mason, Kolehmainen, Rathburn and Wyss.
Attorneys.

Nov. 19, 1968 J. T. DENNIS 3,411,791
AUTOMATIC RECORD CHANGER
Original Filed Aug. 4, 1958 19 Sheets-Sheet 3

INVENTOR.
James T. Dennis
BY Mason, Kolehmainen, Rathburn and Wyss.
Attorneys

Nov. 19, 1968  J. T. DENNIS  3,411,791
AUTOMATIC RECORD CHANGER
Original Filed Aug. 4, 1958  19 Sheets-Sheet 2

INVENTOR.
James T. Dennis
BY Mason, Kolehmainen,
Rathburn and Wyss
Attorneys.

INVENTOR.
James T. Dennis
BY Mason, Kolehmainen,
Rathburn and Wyss
Attorneys.

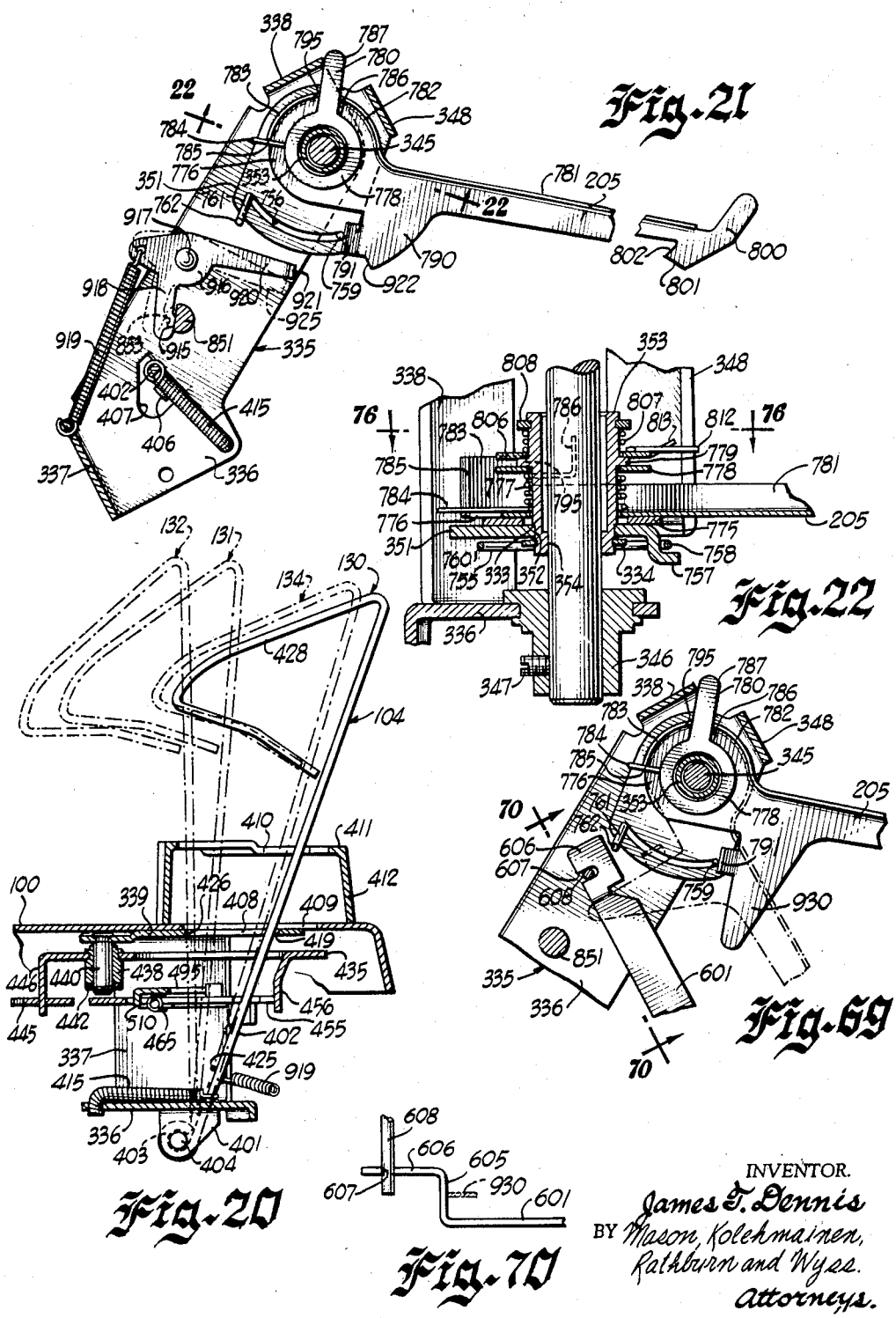

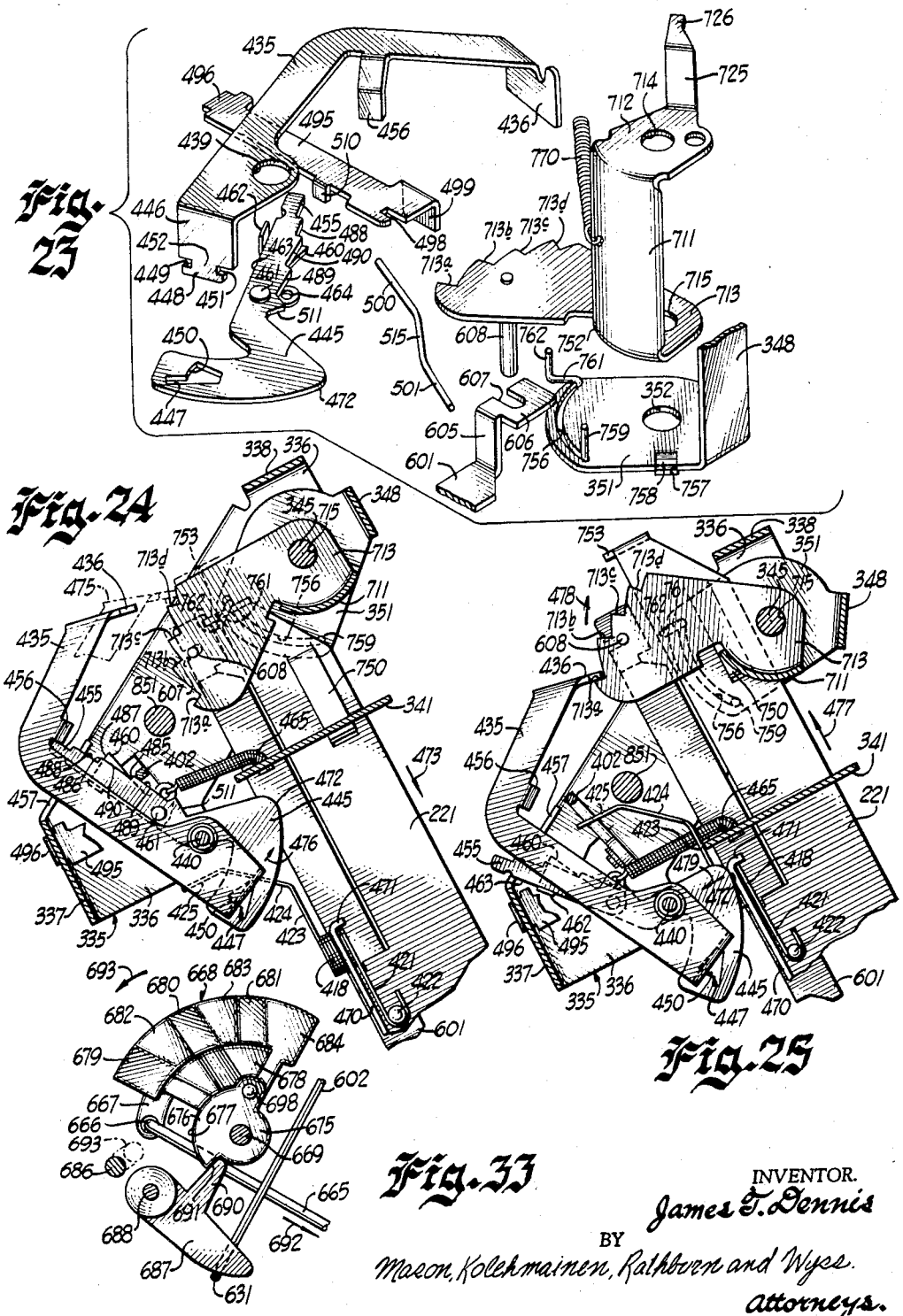

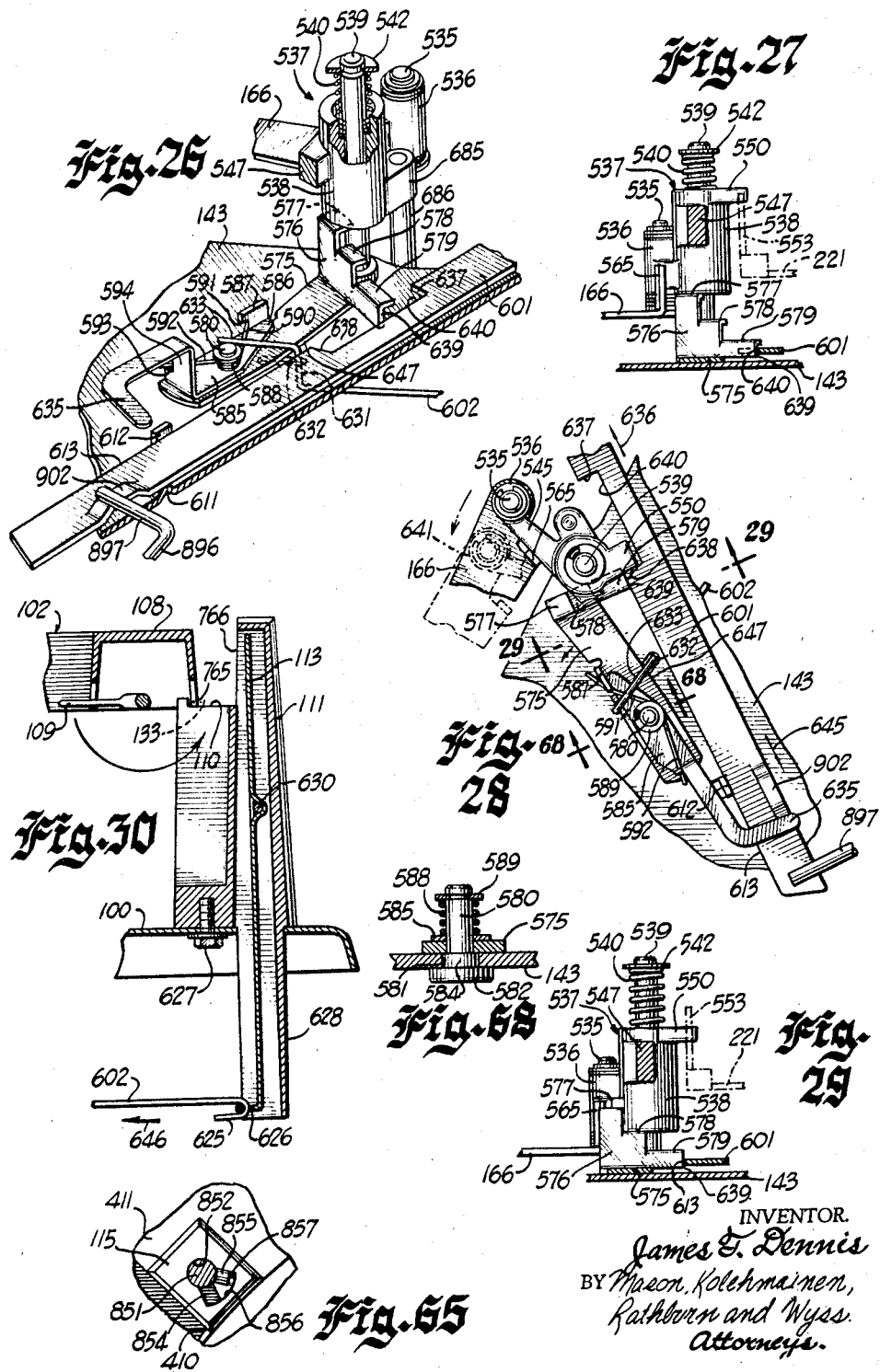

Nov. 19, 1968  J. T. DENNIS  3,411,791
AUTOMATIC RECORD CHANGER
Original Filed Aug. 4, 1958  19 Sheets-Sheet 13
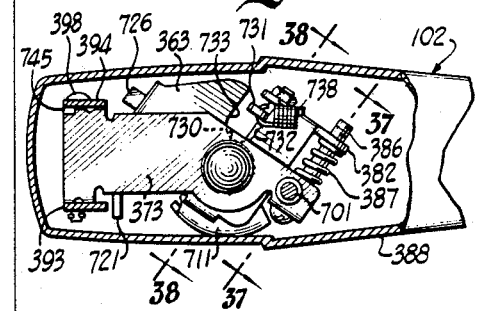
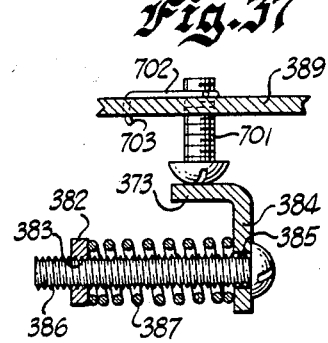
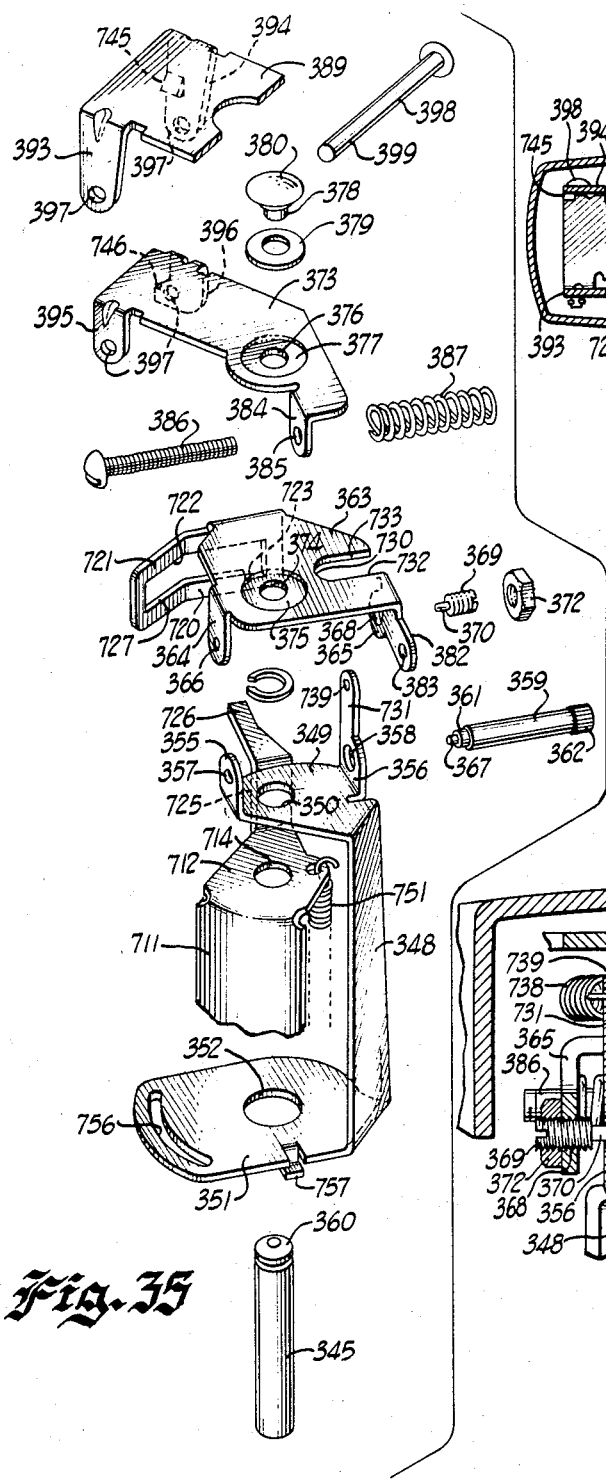
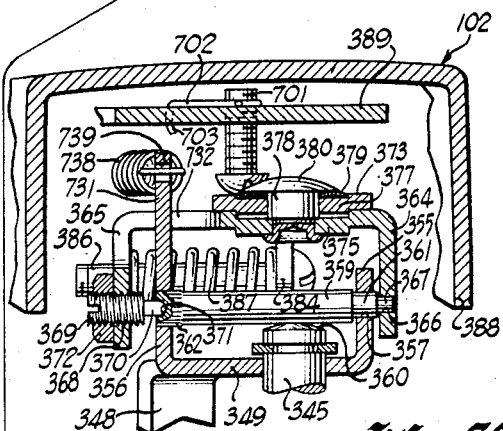
INVENTOR.
James T. Dennis
BY Mason, Kolehmainen,
Rathburn and Wyss.
Attorneys.

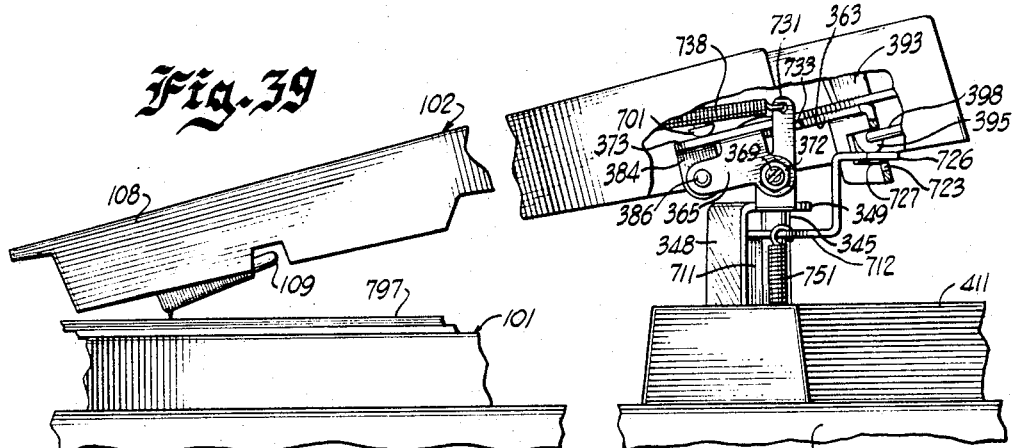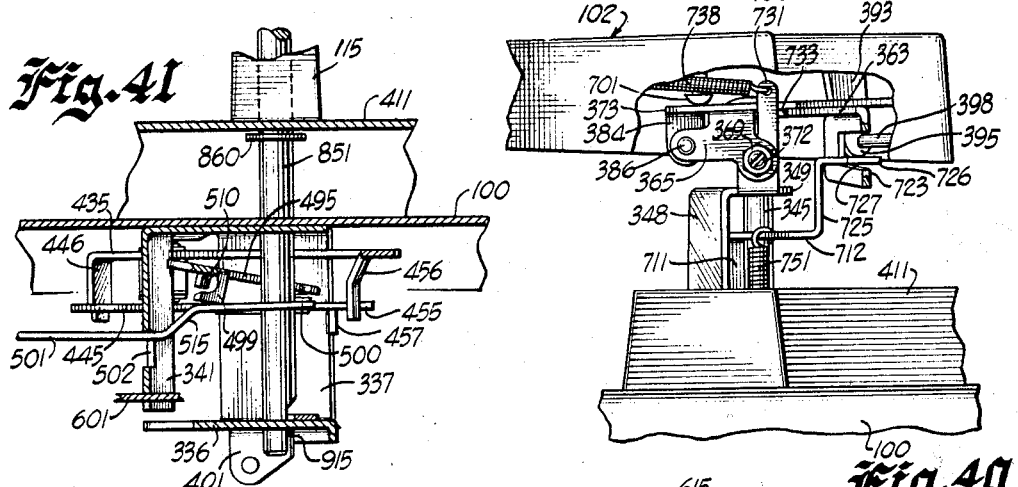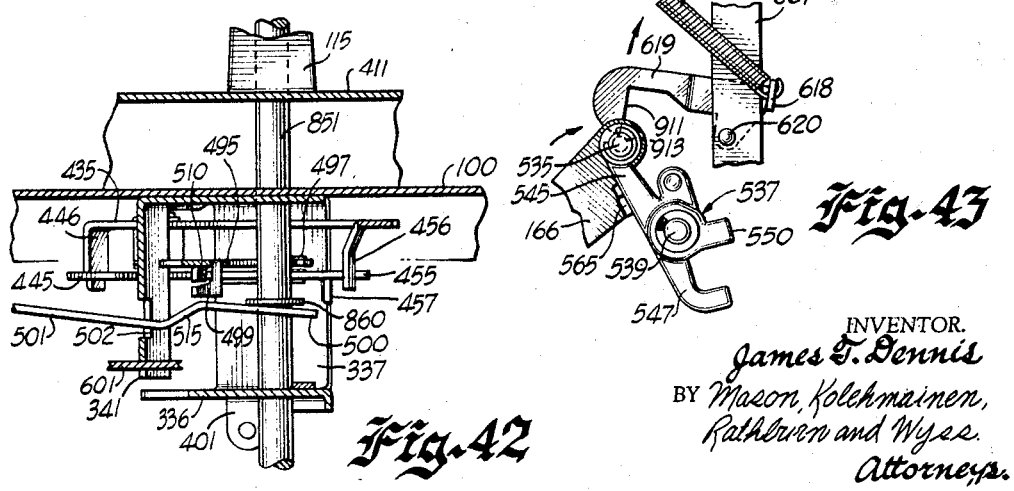

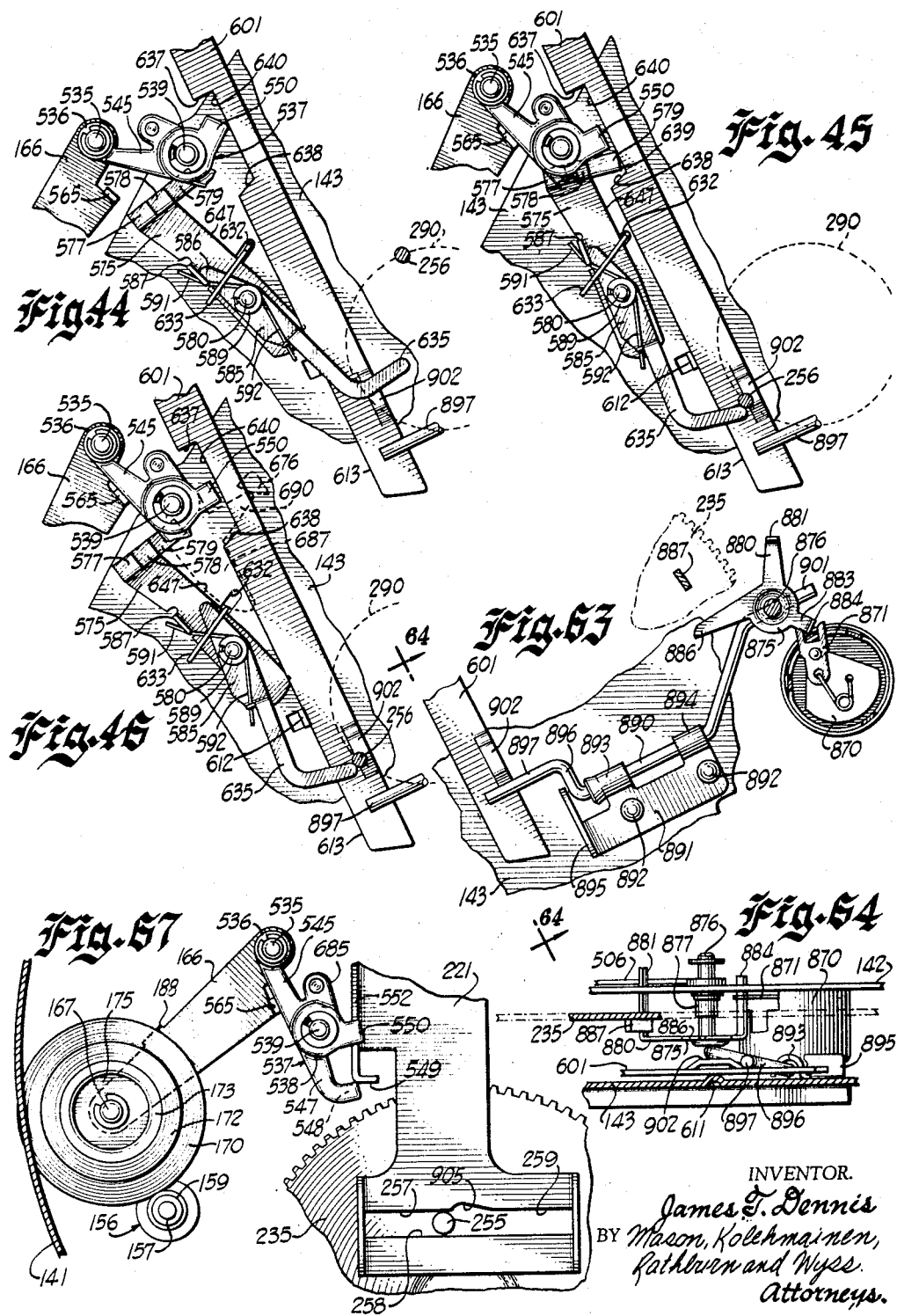

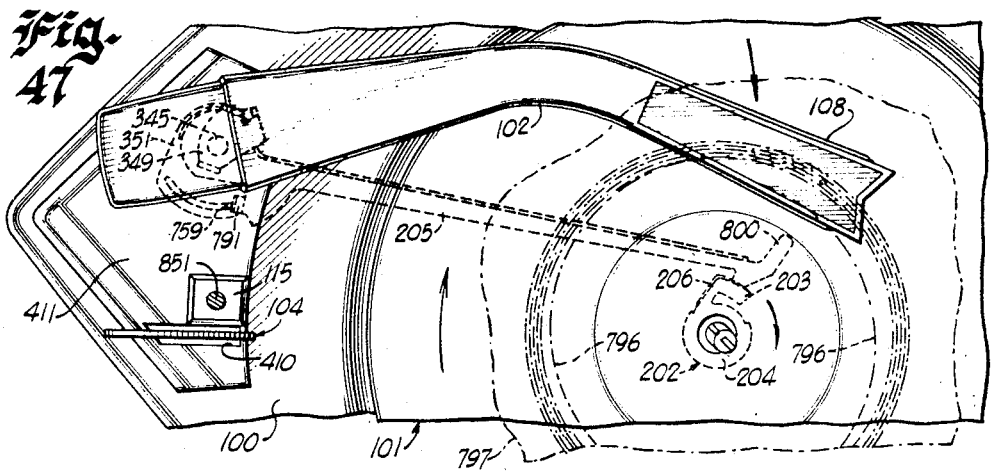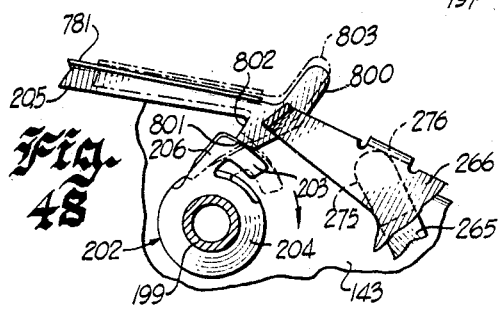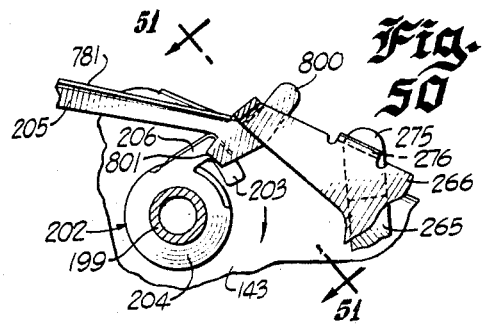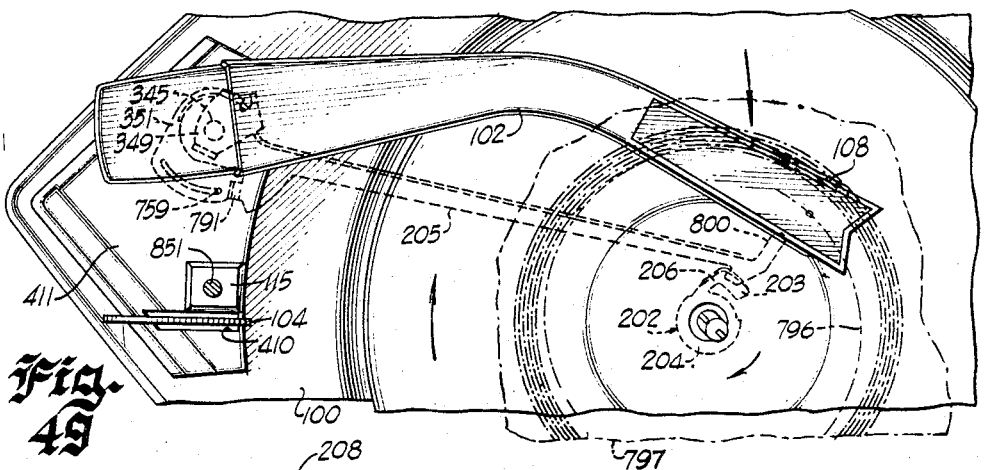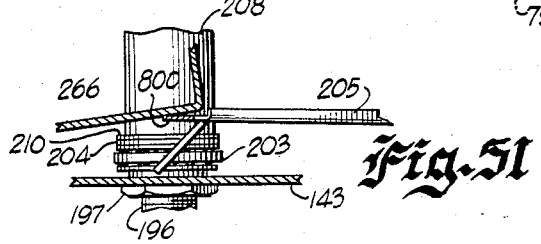

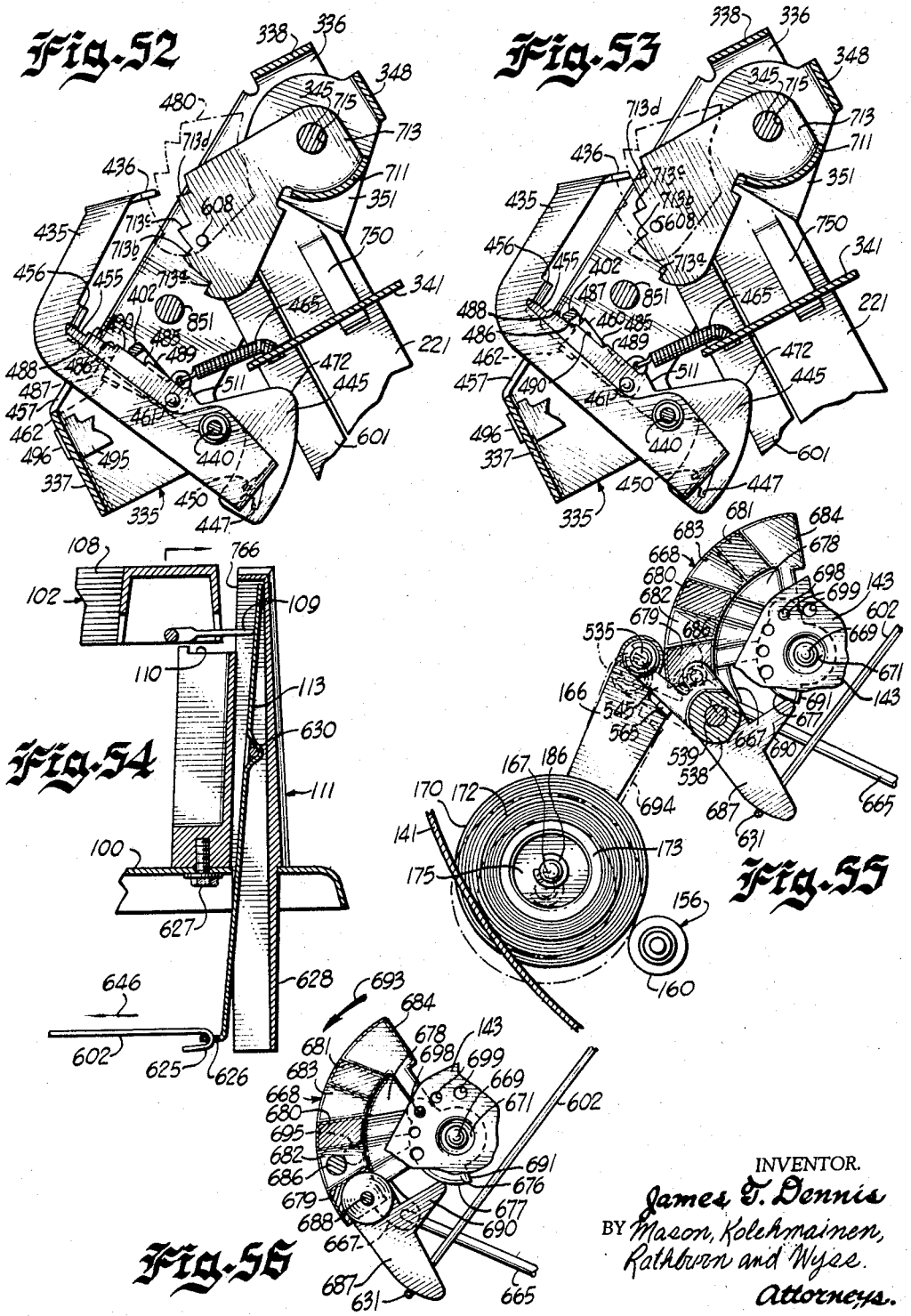

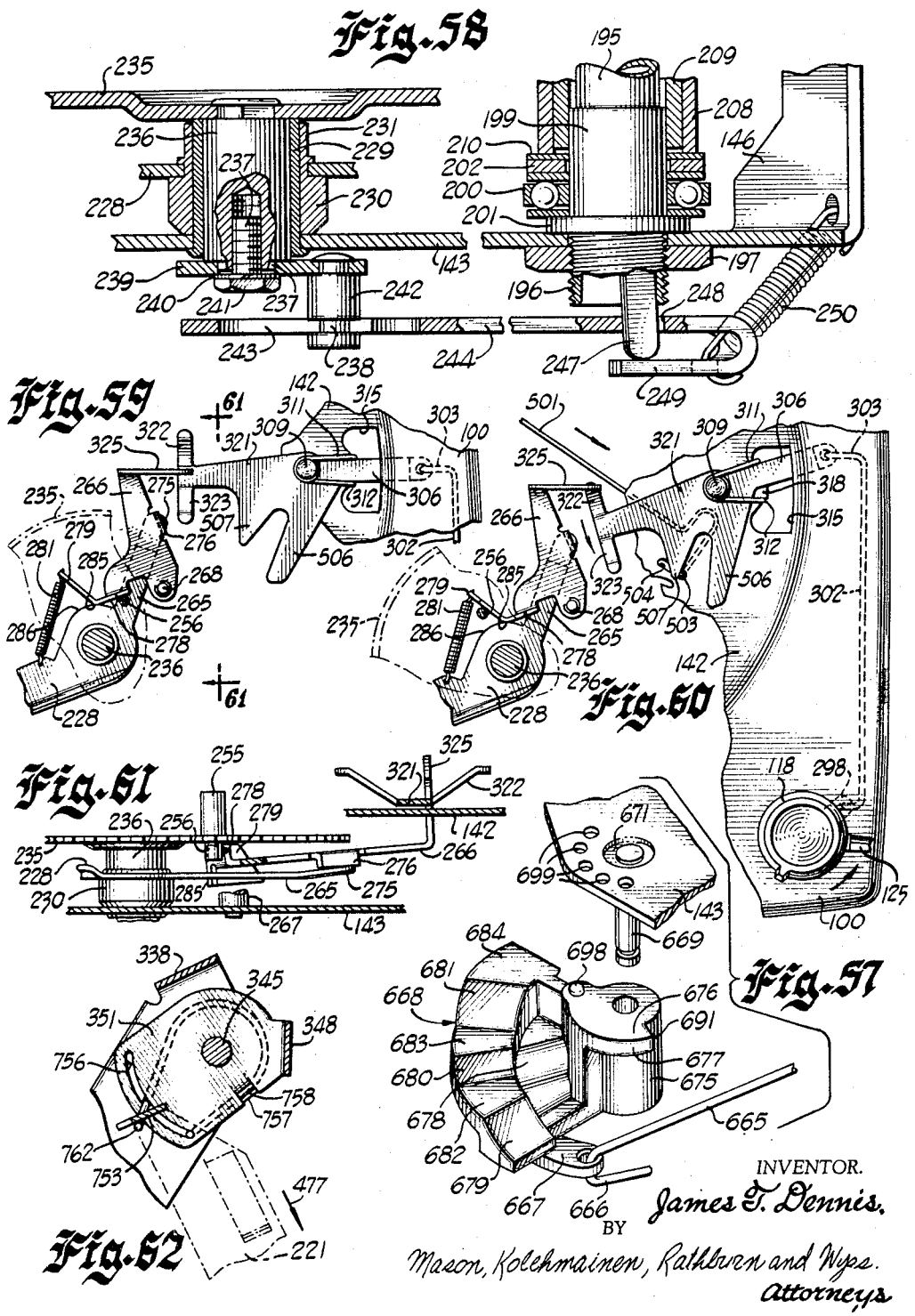

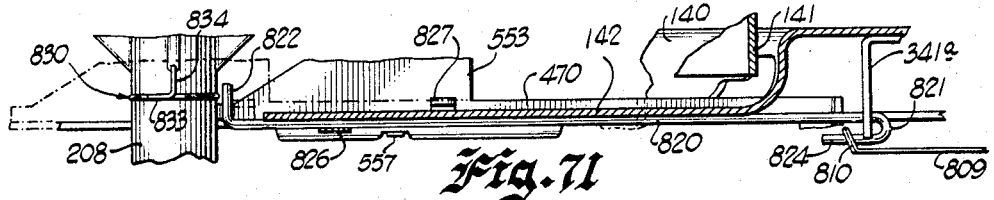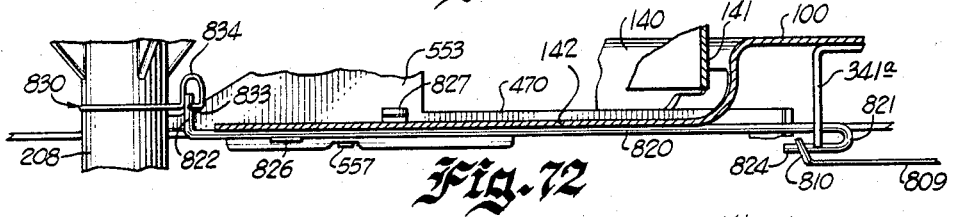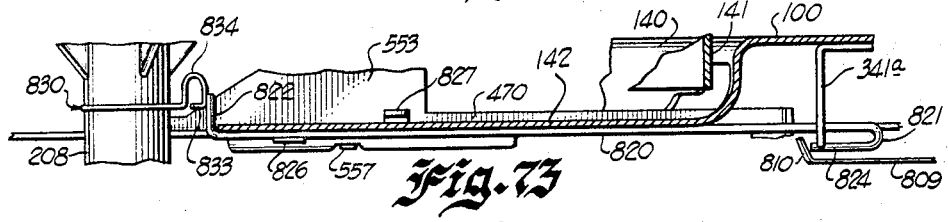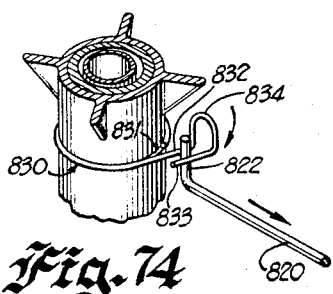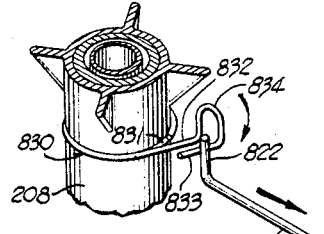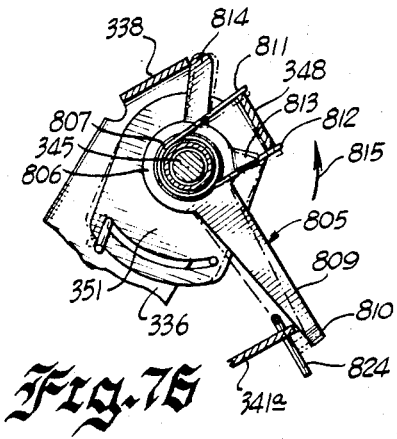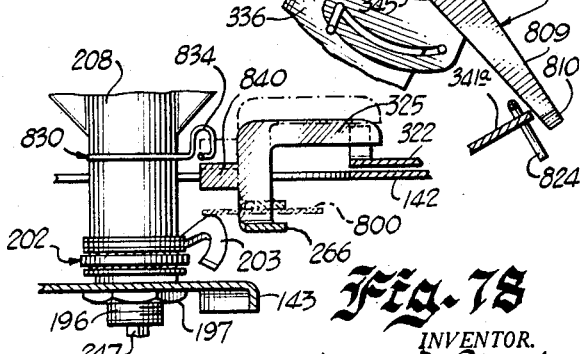

3,411,791
AUTOMATIC RECORD CHANGER
James T. Dennis, 812 American National Bldg.,
Oklahoma City, Okla. 73102
Application Jan. 16, 1962, Ser. No. 168,305, which is a
continuation of abandoned application Ser. No. 752,969,
Aug. 4, 1958. Divided and this application Mar. 31,
1966, Ser. No. 539,049
17 Claims. (Cl. 274—10)

ABSTRACT OF THE DISCLOSURE

An automatic record changer in which the turntable is stopped during the record changing cycle and as the record is deposited thereon. A slip clutch arrangement is provided to bring the turntable smoothly up to speed again. Automatic control of the turntable speed is provided in response to (1) the size of the record released, (2) the movement of the tone arm and stylus selected for play, and (3) use of a 45 r.p.m. adaptor for large center hole records. An anti-skate arrangement is provided to prevent the tone arm from skipping inwardly over the initial grooves of the record. Manual speed selection may be made by a common control knob at any time. A velocity tripping mechanism is provided which initiates a record changing cycle with low needle pressure and places substantially no load on the tone arm during the playing cycle. The position of the balance arm can disable the automatic tripping mechanism.

---

The present invention is a division of my copending application Ser. No. 168,305, filed Jan. 16, 1962, now U.S. Patent No. 3,254,896, which is itself a continuation of parent application Ser. No. 752,969, filed Aug. 4, 1958, now abandoned.

The present invention relates to automatic phonograph apparatus, and, more particularly, to a new and improved automatic record changer for phonograph apparatus.

In present day automatic record changers the records to be played are usually supported in a stack on the centering spindle of the changer and are individually deposited onto the turntable of the changer during successive record changing cycles. During these record changing cycles the turntable is continuously rotated and as a result when a record is dropped onto another record already on the rotating turntable the records scrape and grind against one another with considerable damage to the playing surfaces of the records. This is particularly noticeable in the case of high fidelity installations wherein even the dropping of a record on the rotating turntable itself, which is usually provided with a rubber mat, produces noticeable damage to the playing surface of the record due to the sliding of the record with respect to the upper surface of the turntable as the record is brought up to the speed of the rotating turntable.

It is, therefore, one of the important objects of the present invention to provide a new and improved automatic record changer in which substantial protection is provided for the records as they are deposited on the turntable during the record changing cycle.

It is another object of the present invention to provide a new and improved automatic record changer in which substantial protection is provided for the records which are deposited on the turntable by stopping the turntable during the record changing cycle so that the record which is deposited does not grind or scrape over the records already on the turntable or the upper surface of the turntable itself.

It is a further object of the present invention to provide a new and improved automatic record changer in which rotation of the turntable is terminated during at least a portion of the record changing cycle while providing automatic record changing means for moving the tone arm and positioning the records in sequence on the turntable during successive record changing cycles.

It is still another object of the present invention to provide a new and improved automatic record changer in which a brake is applied to the turntable during the record changing cycle to stop the turntable and prevent wear on the records as they are deposited on the turntable during successive record changing cycles.

It is a further object of the present invention to provide a new and improved automatic record changer in which the turntable is automatically brought smoothly to a standstill during the first part of the record changing cycle and is brought smoothly to the desired speed during the last part of the record changing cycle after the record has been deposited on the turntable.

It is a still further object of the present invention to provide a new and improved automatic record changer in which the turntable is automatically brought to a standstill during the first portion of the record changing cycle and at substantially the end of the record changing cycle is automatically brought to the playing speed of the record deposited on the turntable during the same record changing cycle.

It is another object of the present invention to provide a new and improved automatic record changer in which the turntable is automatically brought to a standstill during the first portion of the record changing cycle and here is provided means responsive to the size of the record deposited on the turntable for thereafter automatically bringing the turntable to the playing speed of the deposited record.

It is still another object of the present invention to provide a new and improved automatic record changer in which the turntable is automatically brought to a standstill during the first portion of each record changing cycle and there is provided means responsive to the size of the needle selected to engage the record for thereafter automatically bringing the turntable to the playing speed of the record deposited on the turntable during the same record changing cycle.

In most, if not all, of the present day automatic record changers, the record changer is automatic only in the sense that it deposits records on the turntable of the record changer and positions the tone arm for playing the new record and these changes do not include facilities for changing the speed of the turntable automatically. In my copending application Ser. No. 404,191, filed Jan. 15, 1954, now U.S. Patent No. 2,956,830, there is disclosed a fully automatic record changer in which the speed of the turntable is automatically adjusted to the playing speed of the record deposited on the turntable. While the arrangement disclosed in my copending application is entirely suitable for its intended purpose, in some instances it may be desirable to incorporate in the record changer facilities for manual speed selection and to disable the automatic speed adjustment mechanism when a desired turntable playing speed is manually selected. Such an arrangement permits the playing of records such as the seven inch 33⅓ r.p.m. record which is not now commercially offered, while retaining all of the advantages of automatic speed selection for convention record sizes and speeds, as described in detail in my above identified copending application.

It is, therefore, another important object of the present invention to provide a new and improved automatic record changer wherein the turntable speed is automatically adjusted in accordance with the size of the record deposited on the turntable while, at the same time, permitting the speed of the turntable to be manually adjusted at any time to a desired one of a plurality of playing speeds.

It is another object of the present invention to provide a new and improved automatic record changer wherein the turntable speed is automatically adjusted in accordance with the size of the needle selected to engage the record while, at the same time, permitting the speed of the turntable to be manually adjusted at any time to a desired playing speed.

It is another object of the present invention to provide a new and improved automatic record changer having a single control knob for both manual and automatic speed selection, this control knob having a first position in which the speed of the turntable is automatically adjusted in accordance with the size of the record deposited on the turntable and having a plurality of different positions in which different positions the speed of the turntable is manually adjusted to desired playing speeds.

It is a further object of the present invention to provide a new and improved automatic record changer wherein an automatic speed changing mechanism is provided for automatically adjusting the speed of the turntable in accordance with the size of the record deposited on the turntable and the size of the needle which is selected to engage a record on the turntable, this automatic speed changing mechanism being simple in construction, readily adapted to mass production and being reliable in its operation.

In the high fidelity field increasing emphasis is being placed upon high fidelity transducers which require a very low needle pressure. However, the trip mechanisms of most conventional changers place such a large frictional load on the tone arm that the trip mechanism does not function properly with low needle pressure tone arm arrangements. This is particularly true in the case of extended play 45 r.p.m. records in which the playing portion of the record is increased to a maximum and the run-out groove lasts for only a single revolution of the record so that the velocity trip mechanism must function with only a very brief increase in the velocity of the tone arm. Furthermore, even if the velocity trip mechanism is designed to function properly with a low needle pressure tone arm arrangement, the trip mechanism usually places a substantial frictional load on the tone arm movement during the playing cycle which interferes with true high fidelity reproduction of the recorded selection.

Accordingly, it is another object of the present invention to provide a new and improved automatic record changer wherein the automatic tripping mechanism places substantially no load on the tone arm during the playing cycle and yet permits tripping of the automatic record changing mechanism with low needle pressure tone arm arrangements.

It is a further object of the present invention to provide a new and improved automatic tripping mechanism of the velocity type which is simple in construction, can be readily manufactured on a mass production basis, and which places substantially no load on the tone arm during the playing cycle.

It is a further object of the present invention to provide a new and improved tone arm mounting arrangement for an automatic record changer wherein the automatic record changing mechanism is not jammed or damaged if the tone arm is inadvertently held down during the record changing cycle.

It is a still further object of the present invention to provide a new and improved tone arm mounting arrangement for an automatic record changer which is simple in construction, may be readily manufactured on a mass production basis, and is reliable in its operation.

It is another object of the present invention to provide a new and improved tone arm indexing arrangement for an automatic record changer for automatically positioning the tone arm to play records of different diameters, this tone arm indexing arrangement being of simplified construction and being readily manufactured on a mass production basis.

It is still another object of the present invention to provide an automatic record changer wherein a balance arm is arranged to rest on the top of a stack of records supported on the centering spindle and means are provided responsive to movement of the balance arm to a position over the tone arm rest position for disabling the automatic tripping mechanism of the changer so that manual playing of records is permitted.

It is a further object of the present invention to provide a manual play mechanism for an automatic record changer whereby the automatic tripping mechanism of the changer is disabled in a simple and convenient manner to permit manual playing of records if desired.

In many present-day record changers there is a tendency for the needle to skip or skate inwardly over the grooves of the record when the needle is first lowered onto the record at the beginning of the playing cycle. This skipping or skating tendency arises due to the fact that the tone arm is pivoted on a center beyond the edge of the record and in most record changers the needle path is on an arc which passes through or beyond the center of the record so that a force component toward the center of the record is produced when the record is rotated with the needle in engagement with a record groove. Also, in many instances the record changer is not levelled properly so that the tone arm pivot is not exactly vertical in which case a force component tending to skip or skate the needle inwardly is produced due to the weight of the tone arm itself. Furthermore, many high fidelity records are now being manufactured with a raised outer edge which slopes downwardly to the sound groove of the record. This raised edge portion of the high fidelity records is provided to prevent the sound grooves of records of the same diameter from touching when records are stacked one on top of another. When the needle lands on this sloping portion of a high fidelity record it tends to slide down the slope and may skip or skate across the first few sound grooves of the records. It is, therefore, a further important object of the present invention to provide a tone arm skip preventing mechanism for an automatic record changer whereby inward skipping or skating of the needle over the first few grooves of the record at the beginning of the playing cycle is positively prevented.

It is another object of the present invention to provide an anti-skipping mechanism for the tone arm of a record changer whereby the tone arm is restrained from inward movement as the needle is lowered to the record with a force sufficient to prevent the needle from skipping inwardly as the record is rotated, this force being sufficiently small, however, that the tone arm can be moved inwardly by engagement of the needle with the spiral lead-in groove of the record and the restraining force being removed after one or two revolutions of the record so that undue wear on the sound grooves of the record is prevented.

The invention, both as to its organization and method of operation, together with further objects and advantages thereof, will best be understood by reference to the following specification taken in connection with the accompanying drawings in which:

FIG. 1 is a perspective view of an automatic record changer embodying the features of the present invention;

FIG. 4 is a sectional view taken along the lines 4—4 of FIG. 2 on a somewhat larger scale;

FIG. 5 is a fragmentary top plan view similar to FIG. 2 but taken on a somewhat larger scale and showing the details of the cycling drive mechanism portion of the record changer of FIG. 1;

FIG. 6 is a perspective exploded view of certain of the parts of the cycling drive mechanism of FIG. 5;

FIG. 7 is a fragmentary top plan view similar to FIG. 2 and showing the parts of FIG. 6 in assembled operative relationship with the control linkage for the cycling drive mechanism in the on, reject position;

FIG. 8 is a fragmentary sectional view taken along the lines 8—8 of FIG. 7;

FIG. 9 is a fragmentary top plan view similar to FIG. 7, but showing the cycling drive mechanism being reset near the end of the record changing cycle;

FIG. 10 is a fragmentary sectional view taken along the lines 10—10 of FIG. 9;

FIG. 19 is a fragmentary section view taken along the lines 19—19 of FIG. 17;

FIG. 20 is a fragmentary section view taken along the lines 20—20 of FIG. 17;

FIG. 21 is a fragmentary sectional view taken along the lines 21—21 of FIG. 18;

FIG. 22 is a fragmentary sectional view taken along the lines 22—22 of FIG. 21;

FIG. 23 is an exploded perspective view of certain of the parts of the tone arm indexing and tone arm mounting arrangement of FIG. 17;

FIG. 24 is a fragmentary sectional plan view similar to FIG. 17 but showing the position of the parts at the midpoint of the record changing cycle with the tone arm indexing mechanism in the seven inch indexing position;

FIG. 25 is a fragmentary plan view similar to FIG. 24 but showing the position of the parts at the end of a record changing cycle and indexed to play a seven inch 45 r.p.m. record;

FIG. 26 is a fragmentary perspective view of the automatic speed selecting mechanism portion of the changer of FIG. 1 shown in the 33⅓ r.p.m. position;

FIG. 27 is a fragmentary sectional view taken along the lines 27—27 of FIG. 5;

FIG. 28 is a fragmentary top plan view of the automatic speed selecting mechanism shown in prespective in FIG. 26 with the parts thereof in the 45 r.p.m. position;

FIG. 29 is a fragmentary sectional view taken along the lines 29—29 of FIG. 28;

FIG. 30 is a fragmentary sectional view taken along the lines 30—30 of FIG. 2 and showing the tone arm in rest position;

FIG. 31 is a fragmentary sectional view taken along the lines 31—31 of FIG. 5 and showing the shut-off mechanism of the changer in shut-off position;

FIG. 32 is a sectional view taken along the lines 32—32 of FIG. 18 showing the details of the tone arm mounting arrangement of the changer of FIG. 1;

FIG. 33 is a fragmentary sectional view taken along the lines 33—33 of FIG. 4 showing the details of the manual speed control mechanism of the changer of FIG. 1 with the parts thereof in the automatic-intermix speed control position;

FIG. 34 is a fragmentary sectional view taken along the lines 34—34 of FIG. 32;

FIG. 35 is an exploded perspective view of certain of the parts of the tone arm mounting mechanism shown in FIG. 34;

FIG. 36 is a fragmentary sectional view taken along the lines 36—36 of FIG. 34;

FIG. 37 is a fragmentary sectional view taken along the lines 37—37 of FIG. 36;

FIG. 38 is a fragmentary sectional view taken along the lines 38—38 of FIG. 36;

FIG. 39 is a side elevational view of the changer of FIG. 1 showing the tone arm in engagement with a record on the turntable and with a portion thereof broken away to show the tone arm mounting mechanism;

FIG. 40 is a side elevational view similar to FIG. 39 but showing the tone arm in elevated position;

FIG. 41 is a fragmentary sectional view taken along the lines 41—41 of FIG. 17 but showing the last record shutoff mechanism of the changer of FIG. 1 in playing position;

FIG. 42 is a fragmentary sectional view similar to FIG. 41 and showing the parts thereof in shut-off position;

FIG. 43 is a fragmentary plan view of a portion of the automatic speed control mechanism of FIG. 15 and showing the operation of the neutral catch when the changer is adjusted for manual play;

FIG. 44 is a fragmentary plan view similar to FIG. 28 but showing the automatic speed selecting mechanism in the 78 r.p.m. position;

FIG. 45 is a fragmentary plan view similar to FIG. 44 and showing how the automatic speed selecting mechanism is reset to the 33⅓ r.p.m. position during the record changing cycle;

FIG. 46 is a fragmentary plan view similar to FIG. 44 and showing the operation of the reset mechanism during the record changing cycle when the automatic speed selecting mechanism is disabled by manual selection of the desired turntable speed;

FIG. 47 is a fragmestary plan view of the changer of FIG. 1 showing the relationship of the tone arm and the automatic tripping mechanism of the changer near the end of a record playing period;

FIG. 48 is a fragmentary sectional view taken along the lines 48—48 of FIG. 4 and showing the operation of the automatic tripping mechanism when the tone arm is in the position shown in FIG. 47;

FIG. 49 is a fragmentary plan view similar to FIG. 47 but showing the tone arm in engagement with the run-out groove of the record at the end of the record playing period;

FIG. 50 is a fragmentary sectional view similar to FIG. 48 but showing the automatic tripping mechanism in tripping position when the tone arm is in the position shown in FIG. 49;

FIG. 51 is a fragmentary sectional view taken along the lines 51—51 of FIG. 50;

FIG. 52 is a fragmentary sectional view similar to FIG. 24 but with the tone arm indexing mechanism in the ten inch indexing position;

FIG. 53 is a fragmentary sectional view similar to FIG. 24 but with the tone arm indexing mechanism in the twelve inch indexing position;

FIG. 54 is a fragmentary sectional view similar to FIG. 30 but showing the tone arm in engagement with the 78 r.p.m. speed control mechanism at substantially the mid-point of the record changing cycle;

FIG. 55 is a fragmentary sectional view similar to FIG. 33 but showing the position of the parts in the 78 r.p.m. manual speed control position;

FIG. 56 is a fragmentary sectional view similar to

Figure 66:
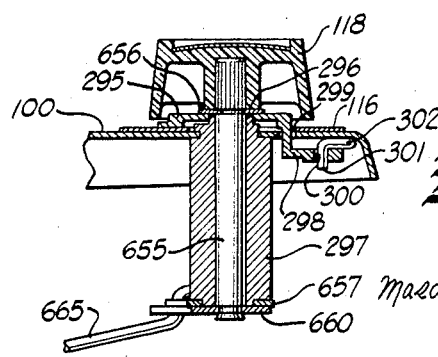
Figure 2:
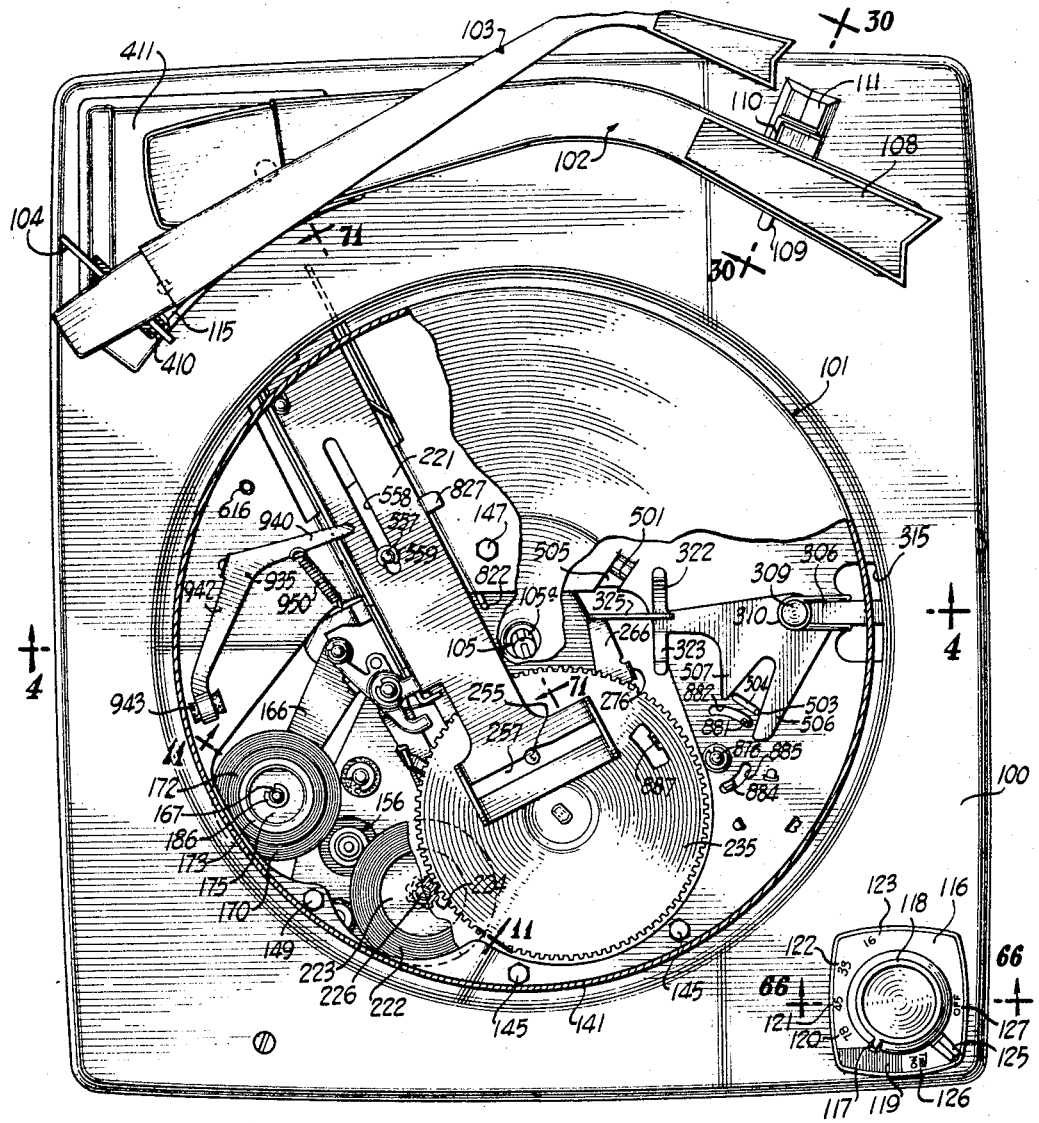
FIG. 2 is a top plan view of the record changer of FIG. 1 with the turntable thereof broken away to show the record changer mechanism in rest position thereneath.
Figure 15:
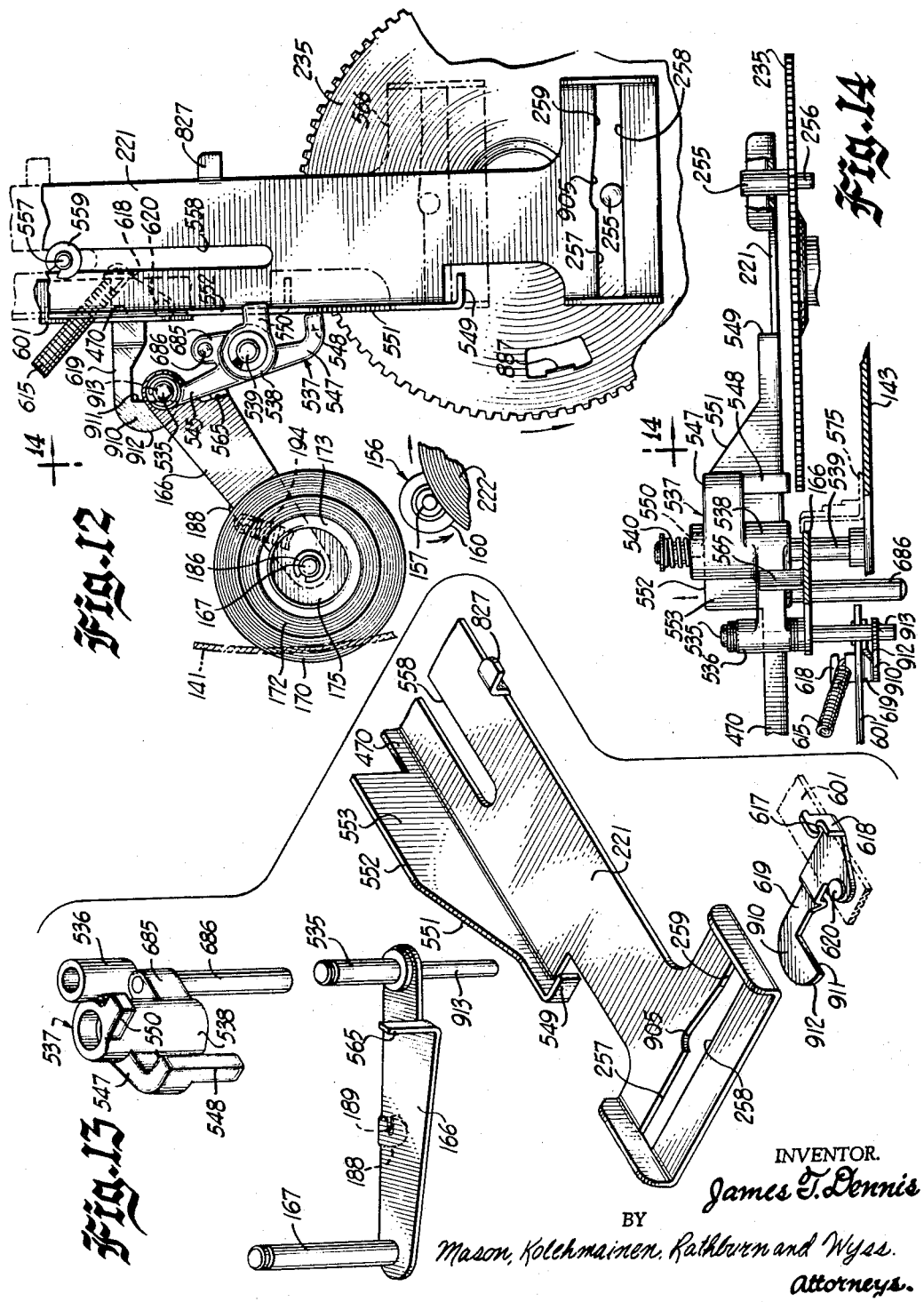
FIG. 15 is a fragmentary top plan view similar to FIG. 12 but showing the position of the parts near the end of the record changing cycle.

FIG. 33 but showing the position of the parts in the 45 r.p.m. manual speed control position;

FIG. 57 is an exploded perspective view of certain of the parts of the manual speed control mechanism shown in FIG. 33;

FIG. 58 is a fragmentary sectional view taken along the lines 58—58 of FIG. 5;

FIG. 59 is a fragmentary plan view similar to FIG. 7 but showing the position of the parts after the control linkage for the cycling drive mechanism has been returned to its neutral position;

FIG. 60 is a fragmentary plan view similar to FIG. 59 but showing the control linkage actuated to the off position;

FIG. 61 is a fragmentary sectional view taken along the lines 61—61 of FIG. 59;

FIG. 62 is a fragmentary sectional view similar to FIG. 24 but showing the operation of the tone arm indexing mechanism when the tone arm is restrained from outward movement during the record changing cycle by the operator;

FIG. 63 is a fragmentary sectional view similar to FIG. 31 but showing the shut-off mechanism of the changer in normal playing position;

FIG. 64 is a fragmentary sectional view taken along the lines 64—64 of FIG. 63;

FIG. 65 is a fragmentary sectional view taken along the lines 65—65 of FIG. 4;

FIG. 66 is a fragmentary sectional view taken along the lines 66—66 of FIG. 2;

FIG. 67 is a fragmentary plan view similar to FIG. 15 but showing the position of the speed control mechanism near the start of the record changing cycle;

FIG. 68 is a fragmentary sectional view taken along the lines 68—68 of FIG. 28;

FIG. 69 is a fragmentary sectional view similar to FIG. 21 but showing an alternative arrangement for adjusting the changer for manual play;

FIG. 70 is a fragmentary sectional view taken along the line 70—70 of FIG. 69;

FIG. 71 but showing the parts in a still different position
the lines 71—71 of FIG. 2 and showing a portion of the skip preventing mechanism of the changer of FIG. 1;

FIG. 72 is a fragmentary sectional view similar to FIG. 71 but showing the parts in an intermediate position;

FIG. 73 is a fragmentary sectional view similar to FIG. 71 but showing the parts in a still different position;

FIGS. 74 and 75 are fragmentary perspective views of a portion of the skip preventing mechanism of FIG. 71 showing different positions thereof;

FIG. 76 is a fragmentary sectional view taken along the lines 76—76 of FIG. 22;

FIG. 77 is a fragmentary sectional view similar to FIG. 76 but showing the position of the parts at the midpoint of the record changing cycle; and FIG. 78 is a fragmentary elevational view of the turntable hub portion of an alternative skip preventing mechanism suitable for use in a changer in which the turntable rotates during the record changing cycle.

Referring now to the drawings, the record changer of the present invention is therein illustrated as comprising a main base plate, indicated generally at 100, which supports the component parts of the record changer including a rotatable turntable 101, a tone arm 102, a record balance or hold-down arm 103, and a tone arm indexing member 104. A centering spindle 105 is positioned at the center of the turntable 101 and supports a stack of records in non-playing position above the turntable 101 which may be individually released to the turntable during successive record changing cycles, as will be described in more detail hereinafter. The tone arm 102 is provided with a head portion 108 within which is positioned a two-position cartridge (not shown) which is provided with a transversely projecting needle selecting arm 109, the arm 109 projecting from the outer side of the tone arm head 108 when a three-mil needle, suitable for playing 78 r.p.m. records, is positioned to engage a record on the turntable 101, and the arm 109 extending inwardly toward the spindle 105 when a one-mil needle, suitable for playing microgroove 33⅓ r.p.m. or 45 r.p.m. records, is positioned to engage a record on the turntable 101. The head portion 108 of the tone arm 102 is adapted to rest on a ledge 110 provided in a tone arm rest post 111 which is secured to the base plate 100. The upper portion of the rest post 111 houses a recessed 78 r.p.m. speed control lever 113 which is adapted to be actuated by the arm 109 when the tone arm 102 is moved outwardly during the record changing cycle, as will be described in more detail hereinafter. The balance arm 103 is mounted in a balance arm support 115 and is employed to hold a stack of records, level on shelf 105a of the spindle 105. The balance arm 103 is arranged to be lifted upwardly and moved outwardly to a position over the rest post 111, as shown in FIG. 1, to permit records to be loaded on the centering spindle 105 and also to permit the manual playing of records, as will be described in more detail hereinafter.

At the front left hand corner of the base plate 100 there is provided a speed control knob 118, this knob having a pointer flange 117 indicating the position of the knob 118 with respect to a fixed indicating scale 116 mounted on the base plate 100. The knob 118 has an automatic intermix control position 119 (FIG. 2) and a plurality of manually selectable speed control positions 120, 121, 122 and 123 in any one of which records are changed automatically and the turntable is rotated at the manually selected speed. When the knob 118 is moved to the position 120 the turntable 101 is rotated at a playing speed of 78 r.p.m. during record playing periods, when the knob 118 is moved to the position 121 the turntable 101 is rotated at 45 r.p.m., in the position 122 the turntable is rotated at 33⅓ r.p.m. and in the position 123 the turntable is rotated at 16⅔ r.p.m. An on, reject-off control lever 125 is rotatably mounted on the same center as the control knob 118 and is normally spring biased to a neutral position, as shown in FIGS. 1 and 2. When the control lever 125 is moved to the on, reject position 126 (FIG. 2), the record changer is turned on, if previously deenergized, and an automatic record changing cycle is initiated. If the lever 125 is moved to the off position 127 (FIG. 2) an automatic shut-off record changing cycle is initiated at the end of which cycle the turntable driving mechanism is deenergized and placed in a neutral position and the tone arm 102 is positioned on the rest post 111.

Briefly, to consider the general mode of operation of the record changer described thus far, it is pointed out that when the control knob 118 is in the automatic-intermix control position 119 the record changer of the present invention is adapted to play seven inch 45 r.p.m. records and ten and twelve inch 33⅓ r.p.m. records completely automatically and in intermixed sequence if the needle selecting arm 109 is in the 33⅓–45 r.p.m. needle position and the changer is also adapted in this position of the control knob 118 to play seven inch, ten inch and twelve inch 78 r.p.m. records completely automatically and in intermixed sequence upon adjustment of the needle selecting arm 109 to the 78 r.p.m. needle position.

Considering first the situation wherein a group of 33⅓ r.p.m. and 45 r.p.m. records are to be played in intermixed sequence, it being understood that the 45 r.p.m. records have a large centering hole which is adapted with a suitable adapter plug to the standard size hole of the 33⅓ r.p.m. records so that both types of records may be intermixed on a common spindle, and assuming that the needle selecting arm 109 is in the microgroove needle position shown in FIGS. 2 and 30, these records are positioned on the spindle 105 and the balance arm 103 is positioned on the topmost record and adjacent the spindle 105, after which the operator merely moves the control lever 125 to the on, reject position 126 to initiate a completely automatic playing period during which the above mentioned records are played in intermixed sequence without further attention on the part of the operator.

When the record changer of FIG. 1 is turned off by the automatic shut-off mechanism thereof, the turntable 101 is completely disengaged from the turntable driving mechanism and can be rotated manually with complete freedom and without harming the mechanism. However, as soon as the record changer is turned on and a record changing cycle is initiated by moving the control lever 125 to the on, reject position 126, a brake is applied to the turntable 101 so that this turntable is held stationary during the period when a record is dropped onto the turntable from the stack supported on the spindle 105. Furthermore, this brake is applied during all succeeeding record changing cycles so that the turntable 101 is always held stationary when a record is dropped thereon.

Assuming that a twelve inch 33⅓ r.p.m. record is dropped onto the turntable 101, as this record falls it strikes the size indexing finger 104, the head portion of which is generally in the shape of the figure four, and moves the head portion thereof outwardly to the position 134 shown in dotted lines in FIG. 20 with the result that the tone arm 102 is positioned to engage the lead-in groove of the twelve inch record at the end of this record changing cycle. At the same time the playing speed of the turntable 101 is automatically adjust to 33⅓ r.p.m. by means to be described in more detail hereinafter so that the twelve inch 33⅓ r.p.m. record will be played at the correct speed. Toward the end of the record changing cycle the brake is released from the turntable 101 and this turntable is brought up to the proper playing speed, in this case 33⅓ r.p.m., before the tone arm is brought into engagement with the lead-in groove of the record. In order to prevent the needle from skipping or skidding inwardly over the record as the turntable is brought up to playing speed there is provided a skip preventing mechanism for the tone arm 102 which develops a predetermined frictional force which must be overcome to move the tone arm inwardly toward the center of the record. This frictional force is sufficient to prevent the needle from skipping inwardly as the turntable is brought up to speed but is overcome when the needle engages the spiral lead-in groove of the record. After one or two revolutions of the record this frictional force is removed from the tone arm so that wear on the sound grooves of the record during the playing cycle is prevented. When the tone arm 102 reaches the run-out groove of the record, a new record changing cycle is initiated, rotation of the turntable 101 is stopped, the tone arm 102 is lifted off of the record and moved outwardly beyond the edge of the record, after which the next record of the stack supported on the spindle 105 is dropped onto the record previously deposited on the turntable 101 while this latter record is stationary.

Assuming that a ten inch 33⅓ r.p.m. record is next dropped to the turntable 101, this record strikes the indexing finger 104 in dropping to the turntable so that the finger 104 is moved to the position shown in dotted lines at 131 in FIG. 20 and the tone arm 102 is thereafter positioned in the lead-in groove of the ten inch record deposited on the turntable 101, the braking action on the turntable 101 being released toward the end of the record changing cycle so that the turntable may be again brought to the correct playing speed of 33⅓ r.p.m.

Assuming that a seven inch 45 r.p.m. record is dropped to the turntable 101 during the next record changing cycle, the indexing finger 104 is not struck by this record as it is released to the turntable and hence the finger 104 remains in its forward position shown in dotted lines at 132 in FIG. 20 with the result that the tone arm 102 is positioned to engage the lead-in groove of the seven inch record at the end of the record changing cycle. At the end of this record changing cycle the brake is again released from the turntable 101 and the speed of the turntable is brought to 45 r.p.m., the correct playing speed for the seven inch record.

If the operator desires to play 78 r.p.m. records, a group of these records of different sizes may be placed on the spindle 105 and the needle selecting arm 109 is adjusted to the 78 r.p.m. needle position shown in FIGS. 1 and 54. When the tone arm 102 is positioned on the ledge 110 of the rest 111 the needle selecting arm 109 is positioned adjacent to but does not touch the upper end of the recessed speed control lever 113. The lever 125 is then moved to the on, reject position to energize the changer and initiate a record changing cycle, and during this cycle the first 78 r.p.m. record is dropped to the turnable 101. At substantially the mid-point of this record changing cycle the tone arm 102 is moved outwardly beyond the rest position shown in FIG. 30 so that the end of the needle selecting arm 109 strikes the upper end of the control lever 113 and moves this lever outwardly, as best illustrated in FIG. 54. As a result, the record changing mechanism is controlled so that the speed of the turntable 101 is adjusted to 78 r.p.m. at the end of the record changing cycle after the braking action has been removed from the turntable 101.

In the event that the above described automatic intermixed type of operation is not required, as, for example, when a group of records having the same playing speed are to be played, the operator may select the desired playing speed of the turntable by manually adjusting the control knob 118 to the corresponding playing speed position thereof. For example, if the operator desires to play a stack of 16⅔ r.p.m. records, he merely shifts the control knob 118 to the 16⅔ r.p.m. speed position 123, as indicated on the scale 116, and then pushes the control lever 125 to the on, reject position 126. The record changer will then successively deposit the 16⅔ r.p.m. records onto the turntable 101 during successive record changing cycles, the turntable 101 being held stationary during each record changing cycle so that the records do not scrape or grind over one another as they are deposited on the turntable during record changing cycles. The indexing finger 104 will also detect the size of the 16⅔ r.p.m. record as it is deposited on the turntable and will position the tone arm 102 in accordance therewith. However, the automatic speed control facilities which are employed in the automatic intermix position 119 of the control knob 118 are disabled in the other positions of the control knob 118 so that the turntable 101 is always rotated at 16⅔ r.p.m. when the control knob is in the 16⅔ r.p.m. playing speed position 123. In a similar manner, a group of 33⅓ r.p.m. records, or a group of 45 r.p.m. records, or a group of 78 r.p.m. records may be positioned on the spindle 105 and the control knob 118 adjusted to the corresponding one of the speed control positions thereof and the changer will automatically deposit the records of any one of these groups onto the turntable during successive record changing cycles during which cycles the turntable is held stationary to prevent wear and damage to the records during the record changing operation. In the event the braking action of the turntable is not desired the automatic speed control or the manual speed control will still function in the same manner as described above and the turntable will merely coast during record changing cycles.

In the event that the operator wishes to play one or more records of a particular playing speed without employing the automatic record changing mechanism to deposit these records on the turntable, as for example, when the operator desires to play a particular record over a number of times or to position the tone arm 102 to play a particular portion of the record, the speed selector knob 118 is moved to the playing speed position corresponding to the record which is to be played manually and the balance arm 103 is lifted upwardly and swung outwardly to a position over the rest post 111, as shown in FIG. 1. The record to be played is then worked over the record supporting ledge of the spindle 105 and is placed on the turntable 101 and the control lever 125 is then pushed to the on, reject position to start the turntable 101 rotating at the correct playing speed. The record changer will then go through an automatic record changing cycle in which the tone arm is deposited on the record which has been manually positioned on the turntable and thereafter the automatic tripping mechanism is disabled so that the tone arm 102 can be moved manually without actuating the automatic record changing mechanism. If it is desired to play another record manually, the tone arm 102 is lifted off the record and set on the ledge 110 and the next record is placed on the turntable 101, after which the tone arm is manually engaged with the lead-in groove of the new record.

If, at any time, the operator desired to turn off the machine, he merely moves the control lever 125 to the off position 127 and an automatic shut-off record changing cycle is initiated during which cycle the tone arm 102 is automatically returned to the ledge 110 on the rest post 111 and the changer is put in a neutral position and deenergized.

Turntable driving mechanism

Considering now in more detail the manner in which the turntable 101 is driven, and the speed thereof changed in accordance with the above described automatic-intermix operation to conform to the playing speed of the record deposited on the turntable, the turntable 101 is provided with a relatively deep downturned rim portion 141 and the base plate 100 is recessed at 140 to provide a circular depressed central portion 142 which is adapted to receive the bottom portion of the flange 141 so that the upper surface of the turntable 101 is positioned relatively close to the upper surface of the base plate 100. A motor plate 143 is positioned beneath the base plate 100 and is supported in spaced relation therefrom. More particularly, the motor plate 143 is provided with a first upturned flange portion 144 (FIG. 31) which is secured to the depressed center portion 142 of the base plate 100 by means of the machine screws 145 (FIG. 2). The motor plate 143 is also provided with an upturned flange portion 146 (FIG. 4) which is secured to the center portion 142 of the base plate 100 by means of the machine screw 147 (FIG. 2). In addition a spacer stud 148 (FIG. 5) is secured to the motor plate 143 and is secured to the central portion 142 of the base plate 100 by means of the machine screw 149 (FIG. 2).

The motor plate 143 is employed to support a turntable driving motor 150, as well as the turntable 101 and certain other portions of the record changer. More particularly, the motor 150 is provided with three spaced mounting studs 151 (FIG. 5) which extend through suitable holes in the motor plate 143, and rubber shock mount washers 152 are provided between the motor plate 143 and C-type lock washers 153 which are clipped on the ends of the mounting studs 151 so that the motor 150 is floatingly suspended from the motor plate 143. The rotor shaft 154 (FIG. 11) of the motor 150 extends upwardly through an opening 155 in the motor plate 143 and a multistep turret indicated generally at 156 is secured to the upper end of the rotor shaft 154. The turret 156 is provided with a 16⅔ r.p.m. step 157, a 33⅓ r.p.m. step 158, a 45 r.p.m. step 159 and a 78 r.p.m. step 160.

In order to connect the rim 141 of the turntable 101 with any desired one of the steps of the turret 156 while at the same time permitting an overload slip clutch action between these members, for reasons to be described in more detail hereinafter, there is provided an idler wheel assembly indicated generally at 165 which is rotatably mounted on the end of a pivotally mounted idler arm 166. More particularly, a post 167 is mounted on the free end of the idler arm 166 and a generally cylindrical bushing 168 is positioned on the post 167, a washer 169 being positioned between the end of the bushing 168 and the idler arm 166 so that the bushing 168 is freely rotatable with respect to the arm 166. A lower rubber idler wheel 170 is molded to a flat central disc element 171, the disc element being staked or otherwise suitably secured to the lower portion of the bushing 168 so that the wheel 170 and the bushing 168 form an integral, rotatably mounted unit. A relatively small upper rubber idler wheel 172 is molded to a hub element 173 which is provided with a recess 174 in the upper surface thereof adapted to receive the enlarged head portion 175 of the bushing 168, it being understood that the hub 173 is rotatably mounted on the upper portion of the bushing 168 beneath the head portion 175 thereof.

In order to provide a driving connection between the lower idler wheel 170, which is adapted to engage one of the steps of the turret 156, and the upper idler wheel 172, which is adapted to engage the rim 141 of the turntable 101 there is provided a coil spring 178 which is positioned between the disc element 171 and a washer 179, the washer 179 being provided with an inwardly extending key portion 180 which is received in the vertically extending keyway 181 in the bushing 168. A friction washer 182 is provided between the key washer 179 and the bottom end of the hub 173 and the bushing 168 is retained on the post 167 by means of a spacer washer 185 and a C-washer 186. An overload slip clutch action is thus provided between the idler wheel 170 and the idler wheel 172 through the frictional connection of the bushing 168 to the hub 173 through the key washer 179 and the friction washer 182. It will also be noted that the shoulder provided by the head portion 175 and the recess 174 provides an additional frictional surface 187 between the hub 173 and the bushing 168. Since the frictional area of the shoulder surfaces 187 is substantially smaller than the area of contact of the friction washer 182, the frictional surfaces 187 will control the overload point at which the bushing 168 starts to slip with respect to the hub 173 and this overload point is also controlled by the force exerted by the coil spring 178 on the surfaces 187.

Figure 13:
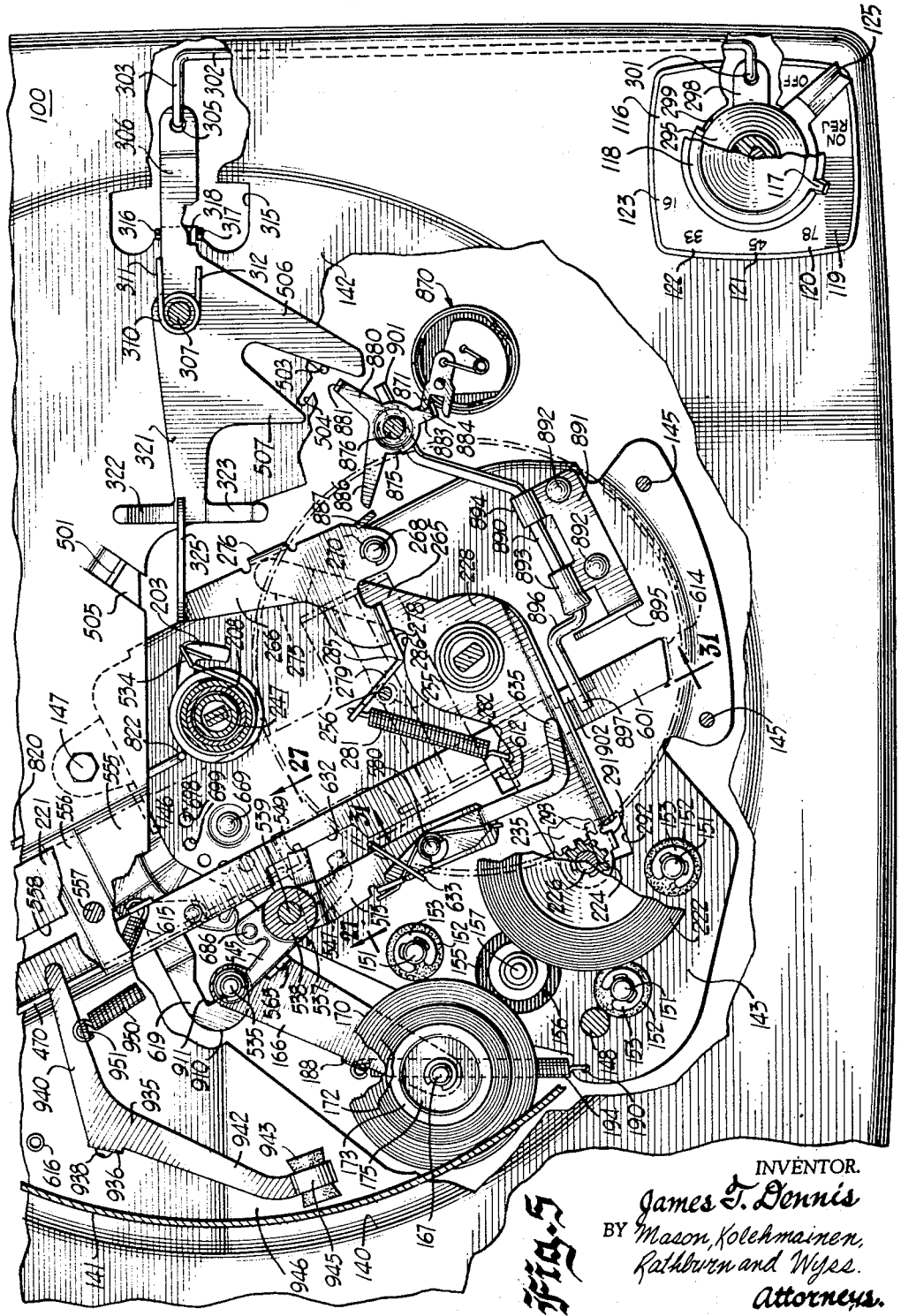
FIG. 13 is an exploded perspective view of certain of the parts of the main cycling slide and turntable speed control mechanism of FIG. 12.

During record playing periods the lower idler wheel 170 is urged into engagement with one of the steps on the turret 156 and the upper idler wheel 172 is urged into engagement with the turntable rim 141 by means of a spring 194 (FIG. 5) one end of which is hooked over a downturned flange 188 on the idler arm 166, the flange 188 being provided with a slot 189 (FIG. 13) to facilitate retention of this end of the spring 194, and the other end of the spring 194 is hooked into an aperture 190 (FIG. 5) in the motor plate 143. As the idler arm 166 is moved up and down by means to be described in more detail hereinafter, the idler wheel 170 is caused to engage a particular one of the steps of the turret 156, while at the same time the idler wheel 172 contacts the rim 141 irrespective of the turret step contacted by the idler wheel 170. Normally, the bushing 168 and hub 173 are drivingly connected together through the above described slipclutch arrangement so that the turntable 101 is rotated at the correct playing speed corresponding to the turret step engaged by the idler wheel 170. However, when the turntable 101 is to be brought up to playing speed from a standstill at approximately the end of the record changing cycle, as will be described in more detail hereinafter, the friction clutch arrangement between the members 168 and 173 will permit the turntable to be brought up to speed smoothly and gradually by a slipping action between idler wheels 170 and 172.

Considering now the manner in which the turntable 101 is rotatably mounted on the motor plate 143, a hollow turntable mounting stud 195 (FIG. 4) which is adapted to receive and position the centering spindle 105, is provided with a threaded end portion 196 which is secured to the motor plate 143 by means of the nut 197, the stud 195 being provided with an upper bearing surface 198 and a lower bearing surface 199. A thrust bearing 200 of the ball bearing type rests on a flange 201 of the stud 195 and a trip cam 202 is adapted to fit over the bearing portion 199 of the stud 195 and rests on the upper washer of the thrust bearing 200. The trip cam 202 is provided with a camming surface 203 which cooperates with the velocity trip arm 205 of the record changer to initiate an automatic record changing cycle, as will be described in more detail hereinafter.

The turntable 101 is suitably secured by riveting or otherwise to the upper flange portion 207 of a turntable bushing hub 208, the turntable bushing hub 208 having a sleeve type turntable bushing 209 press fitted thereinto, the bushing 209 being adapted to engage the bearing surfaces 198 and 199 when the bottom end of the hub 208 rests on a flat washer 210 which, in turn, rests on the top surface of the trip cam 202. The weight of the turntable 101 and the hub 208 is sufficient to cause the trip cam 202 to be rotated as the turntable 101 is driven by engagement of the idler wheel 172 with the rim 141 thereof. A groove 211 is provided in the upper end of the turntable stud 195 within which a C-washer may be placed to retain the turntable on the stud 195.

*Cycling slide driving mechanism*

Figure 12:
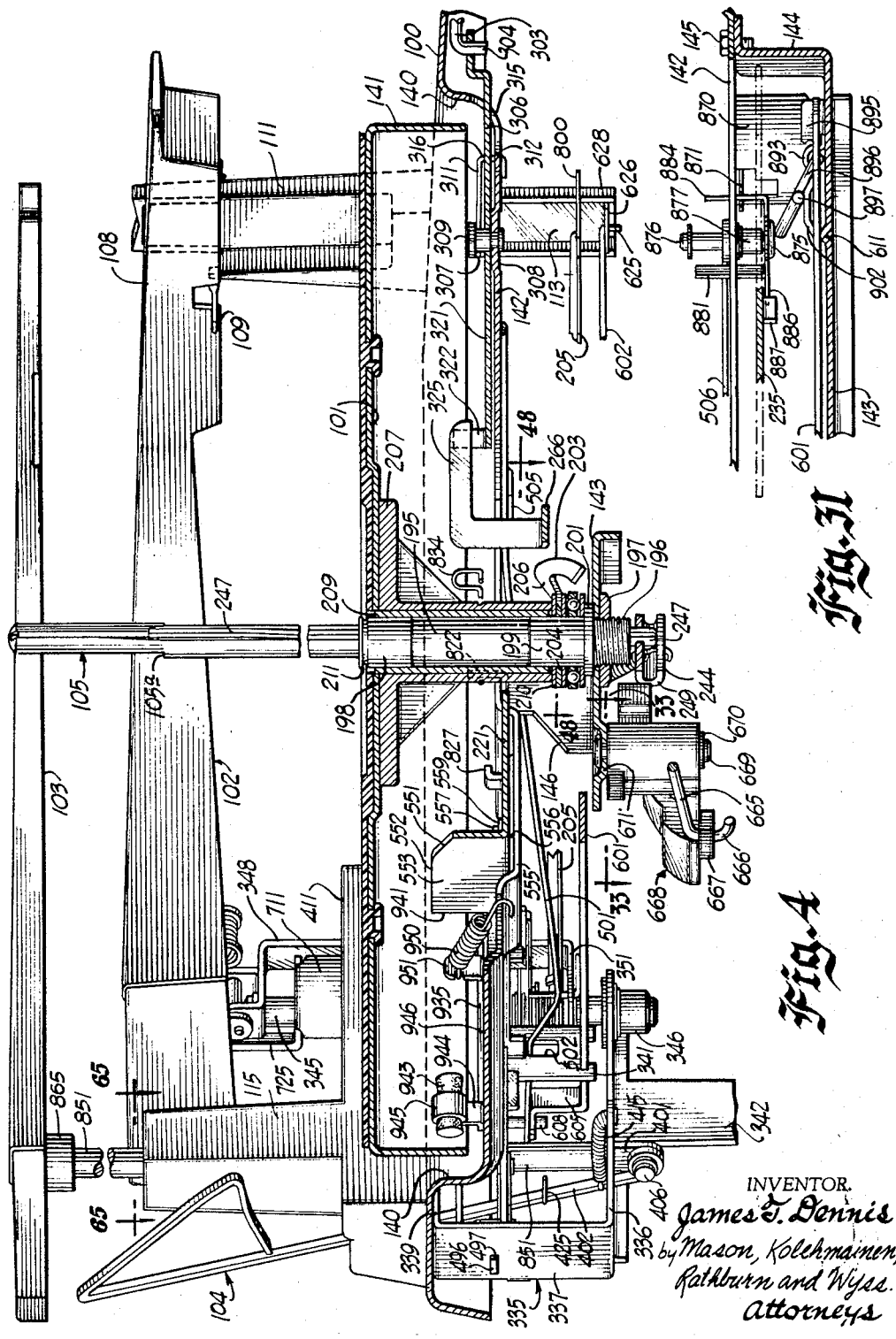
FIG. 12 is a fragmentary top plan view similar to FIG. 2 but taken on a somewhat larger scale and showing the details of the main cycling slide and turntable driving mechanism of the changer of FIG. 1 with the cycling slide at the midpoint of the record changing cycle.

The automatic record changing mechanism of the record changer of the present invention includes a main cycling slide 221 which is moved from the rest position shown in FIG. 2 of the drawings to the extreme forward position shown in full lines in FIG. 12 and then is returned to the position shown in FIG. 2 during the last half of the record changing cycle. This movement of the slidably mounted reciprocable main cycling slide 221 is employed to control the lifting of the tone arm 102 off of a record positioned on the turntable 101, moving the tone arm outwardly beyond the edge of the turntable, and returning the tone arm inwardly and lowering it onto a record on the turntable 101. In addition, movement of the cycling slide 221 performs certain additional functions in the automatic record changing operation, as will be described in more detail hereinafter.

In accordance with an important feature of the present invention, the main cycling slide 221 is not driven from the turntable 101 but instead is directly driven from the 16⅔ r.p.m. step 157 on the multistep turret 156 so that power is continuously applied to the main slide 221 during the record changing cycle while permitting the idler wheel 170 to be withdrawn from the turret 156 and the turntable 101 stopped during the record changing cycle to prevent wear on the records as they are deposited on the turntable. More particularly, there is provided a rubber drive wheel 222 (FIG. 11) which is molded to a central disc element 223, which element is secured to the upper end of a spur drive gear 224 by a suitable staking operation or the like. The drive gear 224 is rotatably mounted on a post 226, which post is secured to the end of an arm portion 227 of a cycling driver lever 228. The cycling driver lever 228 is mounted for pivotal movement about a hollow bearing sleeve 229 (FIG. 58) which is secured to and extends upwardly from the motor plate 143. More particularly, the cycling driver lever 228 is secured, by means of a suitable staking operation or the like, to the enlarged head portion 230 of a bearing member 231 which is rotatably mounted on the sleeve 229, the head portion 230 resting on the motor plate 143 so that the cycling driver lever 228 may be pivoted about the axis of the sleeve 229. The main driving gear 235 of the automatic record changing mechanism is seated on the upper end of the bearing sleeve 229 and is secured to the upper end of a shaft 236 which extends through the bearing sleeve 229. A double D shoulder 237 is provided on the bottom end of the shaft 236 which is adapted to receive a similarly shaped opening in a spindle crank lever 239, the lever 239 being retained on the end of the shaft 236 by means of a lock washer 240 and a retaining screw 241 which threads into the bottom end of the shaft 236. The spindle crank lever 239 is provided with a downwardly extending pin 242 on the end thereof, the pin 242 being provided with a groove 238 which is positioned within a slot 243 (FIG. 3) in a spindle slide member 244. The centering spindle 105, which may be of conventional construction, is provided with a record supporting shelf 105a on which a stack of records is supported and held substantially horizontally by means of the balance arm 103, the spindle 105 being provided with a vertically extending, pivotally mounted control lever 247 the upper end of which is adapted to move the bottommost record of the stack off of the shelf 105a, as will be readily understood by those skilled in the art. The bottom end of the control lever 247 extends through an opening 248 (FIG. 58) in the spindle slide 244 and the slide 244 is provided with an inturned end portion 249 which is held in engagement with the bottom end of the control lever 247 by means of a spring 250, one end of the spring 250 being connected to the motor plate 143 and the other end thereof being connected to the spindle slide 244, as best illustrated in FIG. 58. When the main gear 235 is rotated during the record changing cycle the spindle crank 239 is secured to the end of the shaft 236 is also rotated and hence the spindle slide 244 is reciprocated and moves the bottom end of the control lever 247 so that a record is released to the turntable 101 at substantially the mid-point of the record changing cycle.

The main gear 235 is provided with a crank pin 255 (FIG. 10) which projects upwardly from the upper surface of the main gear 235 and is secured thereto by a suitable staking operation, the crank pin 255 also having a portion 256 thereof of smaller diameter which extends below the bottom surface of the main gear 235. The crank pin 255 is positioned within a transverse slot 257 (FIG. 13) formed in the main cycling slide 221. As the main gear 235 is rotated in a counterclockwise direction as viewed in FIG. 2, the crank pin 255 moves the main slide 221 in the direction of the arrow 473 (FIG. 17) to the position shown in full lines in FIG. 12 by engagement of the crank pin 255 with the edge 258 of the slot 257 in the slide 221 during the first half revolution of the gear 235. During the second half revolution of the main gear 235 the crank pin 255 moves the cycling slide 221 in the direction of the arrow 477 (FIG. 15) back to its rest position shown in FIG. 2 by engagement of the crank pin 255 with the edge portion 259 of the slot 257.

It will be noted that the main gear 235 and the cycling driver lever 228 are rotatably mounted on a common center and the drive gear 224 is positioned on the arm 227 of the cycling driver lever 228 in such relationship to this common center that the gears 224 and 235 remain always in mesh even though the cycling driver lever 228 is pivoted about the bearing sleeve 229. Accordingly, if the drive wheel 222 is engaged with the 16⅔ r.p.m. step 157 on the turret 156 the drive wheel 222 will be rotated in the direction of the arrow 260 of FIG. 7 with the result that the main gear 235 will be rotated in the direction of the arrow 261 of FIG. 7, i.e., the counterclockwise direction as the gear 235 is viewed in FIG. 2. However, the drive wheel 222 is normally held out of engagement with the turret step 157 by means of a control linkage now to be described, so that during record playing periods no power is applied to the automatic record changing mechanism of the changer and the main gear 235 is not rotated.

This control linkage includes a projecting arm 265 on the cycling driver lever 228 and a cycling control lever 266, the lever 266 being loosely mounted on a supporting stud 267 which is secured to the motor plate 143. More particularly, the stud 267 is provided with an upper portion 268 of reduced diameter which is adapted to be received in the oversize aperture 269 (FIG. 6) provided in the cycling control lever 266, a C-washer 270 being provided on the stud portion 268 so that the lever 266 is loosely retained on the stud 267, the aperture 269 being of sufficient clearance that the lever 266 may be tilted on the stud 267 as well as pivoting about the axis thereof. The cycling driver arm 265 is provided with a slightly upwardly inclined end portion 275 (FIG. 6) which is adapted to be engaged by a downturned flange 276 on the cycling control lever 266. In addition, the cycling control lever 266 is provided with an upturned flange 278 which terminates in an outwardly inclined end portion 279, the end portion 279 having an aperture 280 therein which is adapted to receive one end of a coil spring 281, the other end of the spring 281 being secured in the aperture 282 in the cycling driver lever 228.

Figure 11:
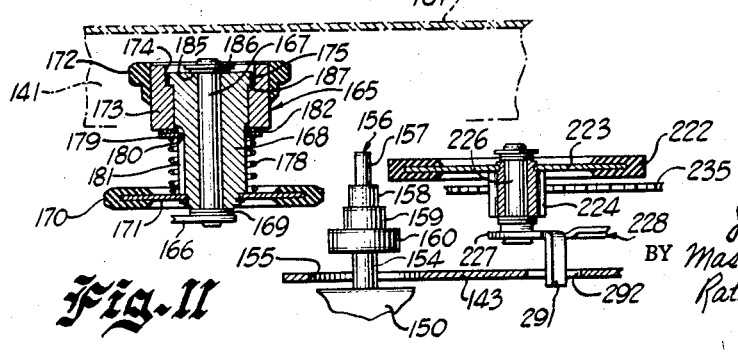
FIG. 11 is a fragmentary sectional view taken along the lines 11—11 of FIG. 2.

The shoulder 285 formed by the flange portions 278 and 279 on the lever 266, normally rests against the arcuate edge 286 of the cycling driver lever 228, as shown in FIG. 5. During playing periods when the automatic record changing mechanism is quiescent, the flange 276 on the lever 266 engages the end portion 275 of the lever 228 and the force exerted by the spring 281 through the lever 266 onto the end portion 275 of the lever 228 pivots the lever 228 about the bearing sleeve 229 so that the driver wheel 222 is held out of engagement with the 16⅔ r.p.m. step 157 of the turret 156, as shown in FIGS. 5 and 11 of the drawings. However, when the lever 266 is tilted upwardly, by means to be described in more detail hereinafter, so that the flange 276 clears the end portion 275 of the lever 228 (FIG. 8), the lever 228 is then free to pivot about the bearing sleeve 229 and the spring 281 urges the drive heel 222 into engagement with the 16⅔ r.p.m. step 157 on the turret 156. The drive wheel 222 is then rotated by engagement with the rotating turret step 157, and the driving gear 224 rotates the main gear 235 so that the downwardly extending end portion 256 of the crank pin 255 is moved in the circular path indicated in dotted lines at 290 in FIG. 7.

As the main gear 235 is thus rotated during the record changing cycle the flange 276 of the lever 266 rests on the tip portion 275 of the lever 228, as best illustrated in FIG. 61. However, during the latter portion of the second half revolution of the main gear 235, the end portion 256 of the crank pin 255 is moved to the position shown in FIGS. 59 and 61 and engages the flange 278 on the cycling control lever 266. As the gear 235 continues to rotate, the crank pin portion 256 pivots the lever 266 to the position shown in FIG. 9 in which position the flange 276 on the lever 266 is moved outwardly beyond the edge of the end portion 275 on the lever 228. Also, when the end portion 256 engages the flange 278 it exerts a downward force on the tilted lever 266 so that as soon as the flange 276 is moved beyond the edge of the tip portion 275 the lever 266 is moved back to a horizontal position as shown in FIG. 10. Accordingly, as the crank pin end portion 256 moves beyond the shoulder 285 on the lever 266 and engages the flange portion 279 thereof, the lever 266 is moved inwardly by the spring 281 so that the flange 276 on the lever 266 engages the end portion 275 and pivots the cycling driver lever 228 about the bearing sleeve 229 so that the drive wheel 222 is moved out of engagement with the turret step 157 to the position shown in FIG. 5 in which the drive wheel 222 is completely disengaged from the step 157. As soon as the drive wheel 222 is disengaged from the step 157, rotation of the main gear 235 ceases until the next automatic record changing cycle is initiated. In this connection it will be understood that the spring 281 performs the dual function of biasing the drive wheel 222 into engagement with the turret step 157 when the flange 276 is not engaging the end portion 275 (FIG. 7) and that of holding the drive wheel 222 out of engagement with the turret step 157 when the flange 276 engages the end portion 275 (FIG. 5). This is because the flange 276 engages the tip portion 275 at a point farther from the pivotal axis of the lever 228 than the point 282 on the other side of this pivotal axis at which the force of the spring 281 is applied. Accordingly, a greater lever arm is provided when the flange 276 engages the tip portion 275 which overrides the force of the spring 281 applied at the point 282. However, as soon as the flange 276 is disengaged from the tip portion 275 by tilting the lever 226 upwardly the force exerted by the spring 281 on the point 282 is unopposed and hence urges the drive wheel 222 into engagement with the turret step 157. If desired, separate springs may be employed to perform the above described two functions of the spring 281.

It will be noted that if the main gear 235 is, for any reason, held so that it is prevented from rotating while the drive wheel 222 is engaged with the turret step 157, the drive wheel 222 will tend to wedge more tightly into engagement with the turret step 157 and since this wedge action increases as the main gear 235 is held, there is a possibility that the drive wheel 222 might jam or wedge against the step 157 with sufficient force to stall the motor 150. To prevent such occurrence, a downturned flange 291 (FIG. 11) is provided on the arm portion 227 of the cycling driver lever 228 adjacent the supporting post 226 on which the drive wheel 222 is mounted. The flange 291 extends into an aperture 292 in the motor plate 143. When the drive wheel 222 is moved into engagement with the turret step 157 in the manner described heretofore, the flange 291 just clears the edge 293 (FIG. 5) of the aperture 292 in the motor plate 143. However, if the main gear 235 is held for any reason and the drive wheel starts to wedge against the turret step 157, the flange 291 engages the edge 293 of the aperture 292 and positively prevents any increase in wedging action of the drive wheel with respect ot the turret step 157. Accordingly, jamming of the drive wheel 222 and stalling of the motor 150 are positively prevented even though the cycling mechanism may have a substantial load placed thereon. It should also be noted that with this controlled wedging action slippage between the turret step 157 and the drive wheel 222 is prevented so that stalling of the record changing mechanism due to slippage is prevented.

The above described cycle of rotation of the main gear 235 was initiated by lifting the outer end of the cycling control lever 266 upwardly so that the flange 276 clears the end portion 275 of the lever 228 in the manner shown in FIG. 8. One way in which the end of the lever 266 may be moved upwardly to initiate a record changing cycle is through actuation of the on, reject lever 125 to either to on, reject position 126 thereof or the off position 127 thereof. More particularly, the on, reject-off control lever 125 is provided with a hub portion 295 (FIG. 66) which rests on the indicator plate 116 and is pivotally mounted on the upper end portion 296 of a speed knob bushing 297 which is secured ot the main base plate 100 by any suitable means such as a staking operation or the like. The hub portion 295 of the lever 125 is provided with an offset end portion 298 which extends through an aperture 299 (FIG. 3) in the main base plate 100. The offset portion 298 is provided with an aperture 300 therein which is adapted to receive the end portion 301 of a control rod 302. The other end of the control rod 302 is provided with a right angle portion 303 terminating in a downwardly extending end portion 304 which is positioned in an aperture 305 in the end of a pivotally mounted control lever 306. More particularly, the control lever 306 is pivotally mounted on a stud 307 (FIG. 4), the stud 307 being mounted on a raised or bossed portion 308 of the centrally depressed portion 142 of the base plate 100 so as to provide a bearing surface for the lever 306 to permit this lever to be freely pivoted. The stud 307 is provided with a head portion 309 and a biasing spring 310 is positioned around the stud 307 between the lever 306 and the head 309. The end portions 311 and 312 (FIG. 5) of the spring 310 extend away from the stud 307 to an opening 315 in the base plate wall 140 through which opening the lever 306 extends, the end portions 311 and 312 of the spring 310 terminating in U-shaped tip portions 316 and 317 which engage the sides of a projecting tongue 318 formed in the central portion 142 of the base plate 100. The tongue 318 is of the same width as the corresponding portion of the lever 306 which is positioned above this tongue and the end portions 311 and 312 of the spring 310 exert a sidewise force on the lever 306 so that this lever is normally held in alignment with the tongue 318, i.e., the position shown in FIGS. 3, 5, 9 and 10 of the drawings. When the control lever 306 is thus biased to its neutral or mid-position by means of the end portions 311 and 312 of the spring 310, the control arm 125 is also biased to a position midway between the on, reject position 126 and the off position 127 of the control arm 125.

The control lever 306 is arranged to exert a lifting force on the end of the cycling control lever 266 when the control arm is moved to either the on, reject position, thereby to initiate a normal record changing cycle, or when the arm 125 is moved to the off position, thereby to initiate an automatic shut-off record changing cycle. To this end, the lever 306 is provided with a projecting arm portion 321 (FIG. 5) which terminates in a pair of transversely positioned upwardly inclined end portions 322 and 323. The cycling control lever 266 is also provided with a transverse offset arm portion 325 the end portion of which extends over the arm portion 321 of the lever 306 and is positioned between the inclined shoulders 322 and 323, as best illustrated in FIG. 5. When the control arm 125 is moved to the on reject position 126, the control rod 302 is actuated and pivots the lever 306 against the biasing force of the spring arm 312 to the position shown in FIG. 7 of the drawing. As the lever 306 is pivoted to this position, the inclined shoulder 323 engages the offset arm 325 on the lever 266 and lifts this lever upwardly so that the flange 276 on the lever 266 clears the end portion 275 of the cycling driver lever 228, as shown in FIG. 8. When this occurs, the lever 228 is pivoted about the bearing sleeve 229 by the spring 281 so that the drive wheel 222 is urged into engagement with the turret step 157 and a record changing cycle is initiated during which the main gear 235 makes one revolution, as described in detail heretofore.

As soon as the operator releases the control arm 125, the control lever 306 is returned to its mid-point or neutral position by virtue of the force exerted thereon by the spring arm 312 with the result that the inclined shoulder 323 is moved away from the offset arm 325 and the lever 226 is permitted to drop downwardly. By this time, however, the end portion 275 of the lever 228 has moved outwardly beyond the flange 276 so that the flange 276 rests on the end portion 275, as shown in FIGS. 59 and 61, and remains in this position until the crank pin end portion 256 cams the lever 266 outwardly to the position shown in FIG. 9 at which time the flange 276 is permitted to drop over the end of the end portion 275 and as the end portion 256 moves along the flange 279 the lever 226 is permitted to move in the reverse direction so that the drive wheel 222 is moved out of engagement with the turret step 157 at the end of the record changing cycle.

When the control arm 125 is moved to the off position 127 thereof, the control rod 302 is actuated in the reverse direction and pivots the control lever 306 to the position shown in FIG. 60 on the other side of its neutral position against the biasing force of the spring arm 311. When the lever 306 is moved to this position the inclined shoulder 322 engages the offset arm 325 on the lever 266 and tilts the lever 266 upwardly in a manner similar to that described above in connection with the engagement of the shoulder 323 with the arm 325. Accordingly, when the lever 306 is pivoted to either side of its neutral position by actuation of the control arm 125, the lever 266 is lifted upwardly by means of the above described linkage so that the flange 276 releases the end portion 275 with the result that a record changing cycle is initiated. In this connection, it will be understood that certain additional functions are performed upon actuation of the lever 306 to either the on, reject position or the off position, these functions having to do with the energization of the driving motor 150 and the shutoff mechanism of the changer, as will be described in more detail hereinafter in connection with these specific features.

*Tone arm mounting mechanism*

Considering now in more detail the mechanism provided for mounting and moving the tone arm 102, it will be recalled from the general description of the changer that the tone arm is moved upwardly off the record at the start of the record changing cycle and is then moved outwardly beyond the edge of the largest record. The tone arm 102 is thereafter moved inwardly to the correct position to engage the lead-in groove of the record which is released to the turntable 101 under the control of the tone arm indexing finger 104 and its associated control mechanism.

In order to support both the tone arm 102 and the indexing finger 104 and their associated control mechanisms, there is provided a main mounting bracket indicated generally at 335 having a base portion 336, side flanges 337 and 338 and top flanges 339 and 340 (FIG. 19), the top flanges 339 and 340 being secured to the underside of the main base plate 100 by any suitable means such as screws, rivets or the like. The top flange 339 has a depending flange portion 341 which is used as a support and guide for certain components of the record changer, as will be described in more detail hereinafter. Also, a depending bracket 342 extends downwardly from the base portion 336 of the bracket 335, the depending bracket 342 serving as a rest for the changer and to protect the components positioned below the base plate 100 from damage during servicing. A similar bracket 343 (FIG. 3) is also provided as a rest support for the changer during servicing operations.

In order to provide a pivotal mounting arrangement for the tone arm 102, there is provided a pivot post 345 (FIG. 22) the bottom end of which is mounted in a sleeve bushing 346 which is secured to the bottom flange 336 of the main mounting bracket 335, the post 345 being secured within the sleeve 346 by means of the set screw 347 (FIG. 22). A generally U-shaped tone arm bracket 348 is pivotally mounted on the pivot post 345, the upper flange 349 (FIG. 35) of the bracket 348 being provided with an aperture 350 which is adapted to receive the pivot post 345 and the bottom flange 351 of the bracket 348 being provided with an aperture 352 which is adapted to receive a sleeve-like bearing member 353 (FIG. 22) the bearing sleeve 353 being provided at the bottom end thereof with a bearing surface or land 354 which is adapted to receive the pivot post 345. The bearing sleeve 353 extends through the opening 352 in the flange 351 and is provided with a shoulder 333 which is held in engagement with the flange 351 by means of a bowed C-washer 334 so that the bearing sleeve 353 is secured to and rotates with the bracket 348 about the pivot post 345. The bearing sleeve 353 is provided in connection with the mounting arrangement for the velocity trip arm 205 and the tone arm skip preventing mechanism, as will be described in more detail hereinafter. The top flange 349 of the tone arm bracket 348 is provided with a pair of upstanding flanges 355 and 356 which are provided respectively with the aligned apertures 357 and 358, which apertures are adapted to receive a transversely extending pivot pin 359, the pivot pin 359 resting upon the bevelled top surface 360 of the pivot post 345, as shown in FIG. 38. More particularly, the pivot pin 359 is provided with a shoulder portion 361 (FIG. 35) which is adapted to be inserted into the aperture 357 in the upstanding flange 355 of the tone arm bracket 348, the other end of the pivot pin 359 being provided with a knurled portion 362 which is adapted to engage and grip the edges of the opening 358 in the flange 356 when the pivot pin 359 is inserted into the aligned apertures 357 and 358.

In order to provide a pivotal mounting for the tone arm 102 so that it may be raised and lowered with respect to the turntable 101, there is provided a pivot bracket 363 (FIG. 35) which is pivotally mounted on the ends of the pivot pin 359. More particularly, the pivot bracket 363 is provided with a pair of spaced apart downturned flanges 364 and 365, the flange 364 being provided with an aperture 366 which is adapted to receive the end portion 367 of the pivot pin 359, the end portion 367 being of somewhat smaller diameter than the shoulder portion 361 of the pin 359. The flange 365 is provided with a threaded aperture 368 which is adapted to receive an adjustable pivot screw 369, the screw 369 being provided with a rounded end bearing portion 370 which is adapted to be inserted into a bearing seat 371 (FIG. 38) provided in the knurled end of the pivot pin 359. The pivot screw 369 is adjusted so that the end portion 367 of the pivot pin 359 is positioned in the opening 366 of the flange 364 and a locking nut 372 is provided to lock the pivot screw 369 in its adjusted position so that the pivot bracket 363 is journalled on the end portion 367 and the bearing seat 371 so that the bracket 363 may be pivoted about the axis of the pivot pin 359.

In order to provide an adjustment of the set down position of the tone arm 102 so that it may be positioned correctly to engage the lead-in groove of a record positioned on the turntable 101, there is provided a set down adjustment bracket 373 (FIG. 35) which is supported on and is adjustable with respect to the pivot bracket 363. More particularly, the pivot bracket 363 is provided with an aperture 374 which is formed in the center of an annular depressed portion 375 of the pivot bracket 363 and the set down adjustment bracket 373 is provided with an aperture 376 which is positioned at the center of an annular depressed portion 377. A mounting stud 378 is provided to hold the brackets 373 and 363 in assembled relation with the annular portion 377 of the bracket 373 seated in the recess formed in the bracket 363 by the annular depressed portion 375 thereof.

An annular spring washer 379 is positioned between the head portion 380 of the stud 378 and the recess in the bracket 373 formed by the annular depressed portion 377 thereof, the end of the stud 378 being peened over to hold the brackets 373 and 363 in assembled relation while permitting adjustment of these brackets relative to one another about the axis of the mounting stud 378. To effect such adjustment, the pivot bracket flange 365 is provided with an extending arm portion 382 which is provided with a threaded aperture 383 in the end thereof, and the set down adjustment bracket 373 is provided with a depending flange portion 384 having an aperture 385 therein. A set down adjustment screw 386 is adapted to extend through the aperture 385 of the set down adjustment bracket 373 and threads into the aperture 383 on the pivot bracket 363, a coil spring 387 being positioned around screw 386 and between the flanges 384 and 382 which forces the flange 384 against the head of the screw 386 and thus holds the brackets 373 and 363 in their adjusted set down position.

The tone arm 102 is pivotally connected to the rear end of the set down adjustment bracket 373 and facilities are provided for adjusting the position of the tone arm 102 relative to the adjustment bracket 373 so that the head portion 108 of the tone arm 102 may be correctly positioned with respect to the ledge 110 on the rest post 111. More particularly, the tone arm 102 includes a hollow body portion 388 (FIG. 34), which may be of aluminum or similar material, and a tone arm hinge bracket 389 is mounted within the hollow tone arm body 388 by means of the mounting bolts 390 which thread into bosses 391 provided in the top wall of the tone arm body 388, the rubber grommets 392 being provided to shock mount the tone arm body 388 with respect to the hinge bracket 389. A pair of downturned flanges 393 and 394 (FIG. 35) on the rear end of the tone arm hinge bracket 389 cooperate with a pair of downturned flanges 395 and 396 on the set down adjustment bracket 373 to provide for pivotal connection of the tone arm hinge bracket 389 to the set down adjustment bracket 373, the flanges 393 to 396, inclusive, being provided with aligned apertures 397 which are adapted to receive a pivot pin 398 which is provided with an end portion 399 which is deformed after assembly to hold the pin 398 in place.

To provide an adjustment of the height of the tone arm head 108 with respect to the rest ledge 110, there is provided a height adjustment screw 701 (FIG. 37) which threads into the tone arm hinge bracket 389, the head of the screw 701 resting on the upper surface of the set down adjustment bracket 373 adjacent the flange portion 384 thereof, as best illustrated in FIG. 37. In order to hold the height adjustment screw 701 in its adjusted position, a spring wire 702 (FIG. 34) engages the threads of the screw 701 and exerts a side thrust on this screw, the ends 703 (FIG. 37) of the wire 702 being hooked over the edges of the tone arm hinge bracket 389 to provide this side thrust on the screw 701.

In order to raise and lower the tone arm 102 with respect to the turntable 101, while at the same time providing facilities for indexing the tone arm properly for seven inch, ten inch and twelve inch records, there is provided a generally U-shaped tone arm index bracket 711 which is pivotally and slidably mounted on the pivot post 345 between the end flanges 349 and 351 of the tone arm bracket 348. More particularly, the bracket 711 is provided with end flanges 712 and 713, these flanges being provided with aligned apertures 714 and 715, respectively (FIG. 23). The pivot bracket 363 is provided with a downturned flange portion 720 which terminates in an offset end portion 721, the flange portions 720 and 721 having formed therein a horizontally extending slot 722 having a notch 723 in the bottom edge thereof (FIG. 35). The upper flange 712 of the index bracket 711 is provided with an upstanding flange portion 725 which terminates in a horizontally extending tongue portion 726 which is adapted to extend into the slot 722 provided in the pivot bracket 363. When the tongue portion 726 is moved downwardly it engages the bottom edge 727 of the slot 722 and rotates the pivot bracket 363 about the axis of the pivot pin 359 so as to raise the head portion 108 of the tone arm upwardly, as best illustrated in FIG. 40. Also, when the tongue portion 726 is moved into engagement with the notch 723 it falls into this notch and the index bracket 711 is locked into engagement with the tone arm bracket 348 and thereafter rotates with the tone arm bracket 348 as the bracket 348 is rotated on the post 345 by forward movement of the cycling slide 221 during which movement the tone arm is moved outwardly to a position adjacent the rest post 111. The bottom flange 713 of the index bracket 711 is provided with a series of tone arm indexing steps 713a, 713b, 713c and 713d and as the tone arm is moved inwardly during the second half of the record changing cycle the index bracket is rotated about the post 345, since it is still locked in engagement with the tone arm bracket 348, until one of the indexing steps on the flange 713 strikes an indexing pawl flange 436 on the indexing pawl 435 at which time rotation of the brackets 348 and 711 and inward movement of the tone arm 102 ceases. If the step 713a strikes the pawl flange 436 the tone arm 102 is positioned to engage the lead-in groove of a seven inch record. The step 713b corresponds to a ten inch record, the step 713c corresponds to a twelve inch record and the step 713d corresponds to a position of the tone arm 102 over the ledge 110 of the rest post 111. The pawl flange 436 is positioned to engage one of these steps by means of the tone arm indexing mechanism of the changer which will be described in more detail hereinafter. When the tongue portion 726 of the index bracket 711 is moved upwardly at substantially the end of the record changing cycle the tone arm 102 is permitted to lower of its own weight in its previously indexed horizontal position until it strikes the record on the turntable 101 or until it rests on the ledge 110 of the rest post 111.

In order to provide upper and lower limits for the above described movement of the tone arm by engagement of the tongue portion 726 with the slot edge 727 on the pivot bracket 363, an inwardly extending slot 730 (FIG. 35) in the side of the pivot bracket 363 is provided and the flange portion 356 on the tone arm bracket 348 is provided with an upstanding arm portion 731 which is adapted to extend through the slot 730 in the pivot bracket 363 when the brackets 363 and 373 are assembled together. When the tone arm 102 is lifted upwardly from the turntable 101 in response to the above described downward movement of the tongue 726, the tone arm may move upwardly until the edge 732 of the slot 730 strikes the arm 731, after which further upward movement of the tone arm is prevented. The tone arm is normally lowered onto a record positioned on the turntable 101. However, if no record is on the turntable and the tone arm is lowered beside the turntable and below the level of the surface of the turntable 101, the other edge portion 733 of the slot 730 strikes the arm 731 and prevents further downward movement of the tone arm so as to protect the stylus from touching the metal surface of the main base plate 100 and damaging the stylus.

In order to provide for adjustment of needle pressure, the tone arm hinge bracket 389 is provided with a downturned end flange 735 which is adapted loosely to receive a threaded stud 736, a knurled adjustment nut 737 being threaded onto the stud 736. A needle pressure adjustment spring 738 is connected between the upstanding arm portion 731 of the tone arm bracket 348 and the end of the stud 736 so that the adjustment nut 737 is held in engagement with the flange 735. The spring 738 hooks into an aperture 739 in the arm 731 and since this aperture is positioned above the pivot pin 398 the spring 738 exerts an upward force on the tone arm 102 which tends to counterbalance the weight of this member. By adjustment of the nut 737 the force exerted by the spring 738 may be varied so as to vary the needle pressure exerted on a record positioned on the turntable 101.

If the operator grasps the head portion 108 of the tone arm and lifts the tone arm upwardly, the pivot bracket 363 first pivots about the pin 359 until the edge 732 of the slot 730 in the pivot bracket 363 engages the arm 731. Upon further upward movement of the tone arm head 108, the tone arm pivots about the pivot pin 398. However, as the tone arm is raised the flange 735 is moved above the arm 731 and the spring 738 exerts a downward force tending to oppose upward movement of the tone arm. The tone arm can be moved upwardly against the force of the spring 738 to permit inspection of the needle cartridge, etc., but upward movement of the tone arm 102 is limited by providing a lug portion 745 (FIG. 35) on the downturned flange 394 of the tone arm hinge bracket 389, the lug 745 engaging with a shoulder 746 (FIG. 35) provided on the flange 396 of the set down adjustment bracket 373 to limit upward pivotal movement of the tone arm about the hinge pin 398.

Figure 17:
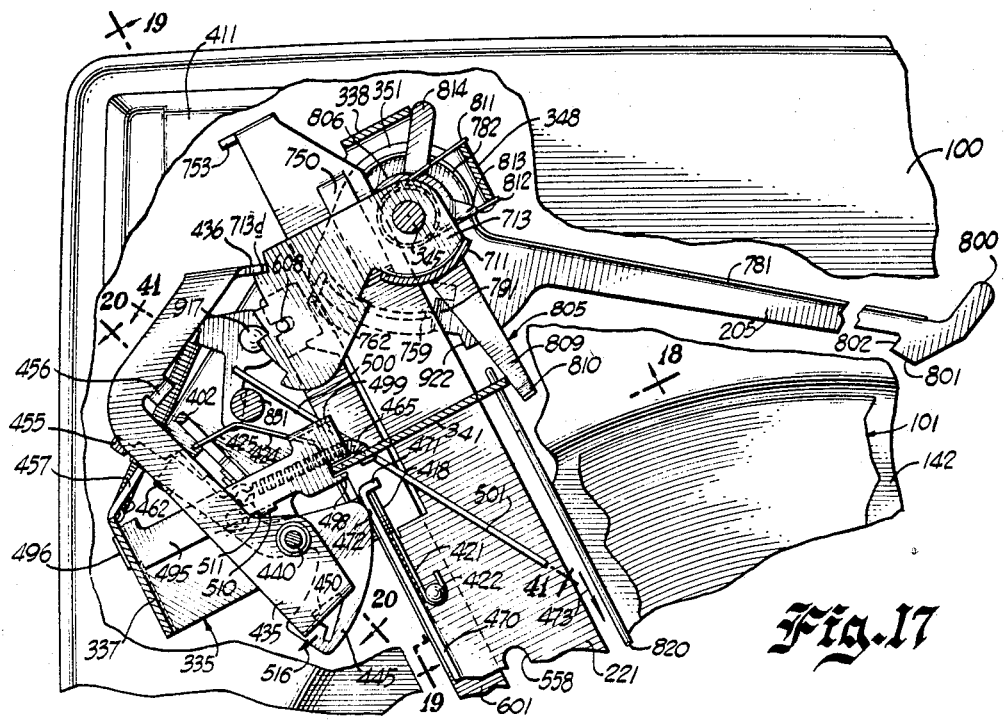
FIG. 17 is a fragmentary top plan view of the record changer of FIG. 1, taken on a somewhat larger scale and showing the details of the tone arm indexing and tone arm mounting mechanism with the tone arm in rest position.

Considering now the manner in which the above described tone arm mounting mechanism functions to move the tone arm 102 in the desired manner during the record changing cycle, and assuming that a record changing cycle has just been initiated, when the record changing cycle is initiated the cycling slide 221 is moved in the direction of the arrow 473 in FIG. 17 during the first half of the record changing cycle. During this half of the record changing cycle movement of the cycling slide 221 is employed to control the lifting of the tone arm 102 off of a record positioned on the turntable 101 and the movement of the tone arm outwardly to a position adjacent the rest post 111. More particularly, the cycling slide 221 is provided with an inclined flange 750 (FIG. 19) which is adapted to engage the underside of the flange portion 713 of the index bracket 711. At the start of the record changing cycle the upper end of the inclined flange 750 engages the bottom of the index flange portion 713 of the index bracket 711, as shown in FIG. 19, so that the tongue portion 726 of the bracket 711 is held out of engagement with the bottom edge 727 of the slot 722 provided in the pivot bracket 363.

A lift spring 751 is connected between the flange portion 712 of the index bracket 711 and the main base plate 100. As the cycling slide 221 is moved in the direction of the arrow 473 the flange 750 is moved to the right as viewed in FIG. 19 and the bottom corner 752 (FIG. 23) of the bracket 711 engages the inclined flange 750 so that the index bracket 711 is lowered on the post 345 since the lift spring 751 holds the bottom corner 752 in engagement with the flange 750 as this flange is moved further to the right. As the index bracket 711 is thus moved downwardly on the post 345 the tongue 726 strikes the bottom edge 727 of the slot 722 in the pivot bracket 363 and exerts a downward force on the rear end of this bracket so that the tone arm is lifted off of the record positioned on the turntable 101, as shown in FIG. 40.

The cycling slide 221 is provided with a downturned end flange 753 (FIG. 19) and as the cycling slide 221 continues to move in the direction of the arrow 473 the end flange 753 thereof is arranged to rotate the tone arm bracket 348 about the pivot post 345 so that the tone arm 102 will be moved outwardly beyond the edge of the largest record, and, when 78 r.p.m. records are being played into engagement with the recessed speed control lever 113 positioned within the rest post 111. However, the flange 753 does not engage the tone arm bracket 348 directly, since if it did the operator could hold the tone arm during the record changing cycle and stall the cycling mechanism and possibly cause jamming thereof and damage thereto. Instead, a generally U-shaped safety spring 755 (FIG. 2) is positioned beneath and is attached to the bottom flange 351 of the tone arm bracket 348 and the flange 753 is adapted to engage the safety spring 755 rather than the tone arm bracket 348. More particularly, the bottom flange 351 is provided with an arcuate slot 756 and a downturned lug portion 757 is formed in one edge thereof. One arm 758 (FIG. 22) of the U-shaped safety spring 755 is positioned between the lug 757 and the bottom surface of the flange 351, the arm portion 758 terminating in an upstanding end portion 759 (FIG. 23) which extends through the arcuate slot 756 in the flange 351 and is urged into engagement with the adjacent end of this slot. The other arm 760 of the safety spring 755 extends upwardly through the arcuate slot 756 and terminates in a horizontal end portion 761 provided with an upstanding tip 762.

The safety spring 755 is so arranged that the arm portions 758 and 760 thereof are urged outwardly into engagement with the ends of the arcuate slot 756 with substantial force. Accordingly, after the tone arm has been lifted off of the record in the manner described above, the flange 753 engages the upstanding tip portion 762 of the safety spring 755 and exerts a force thereon which causes the tone arm bracket 348 to rotate about the post 345. Since the pivot bracket 363 and the set down adjustment bracket 373 are mounted on the pivot pin 359 which is carried by the tone arm bracket 348, and the tone arm 102 is hingedly connected to the set down adjustment bracket 373 through the tone arm hinge bracket 389, the above described rotation of the tone arm bracket 348 causes the tone arm 102 to be moved outwardly toward the rest post 111. As the tone arm is moved in this direction the pivot bracket 363 moves with respect to the tongue portion 723 of the index bracket 711 since the index bracket 711 is held in its previously indexed position by the index pawl flange 436 of the tone arm indexing mechanism described generally heretofore. However, when the pivot bracket 363 is moved by an amount sufficient to position the tongue 726 adjacent the end of the slot 722 the tongue 726 drops down into the notch 723 provided in the lower edge 727 of the slot 722. When this occurs the index bracket 711 is locked into engagement with the pivot bracket 363, and hence the tone arm bracket 348 and the tone arm 102 itself, so that the index bracket 711 may now be used to control the position of the tone arm upon inward movement thereof during the last half of the record changing cycle.

The tone arm 102 is moved outwardly during the first half of the record changing cycle by an amount sufficient to provide positive engagement with the rest post 111. More particularly, if the needle selecting arm 109 is positioned in the one mil or microgroove needle position shown in FIG. 30, which is suitable for playing 33⅓ r.p.m. and 45 r.p.m. records, the tone arm 102 is moved outwardly by an amount sufficient to provide positive engagement of the outer edge 765 (FIG. 30) of the tone arm head 108 with the edge 766 of the rest post 111. On the other hand, if the needle selecting arm 109 is positioned in the three mil position suitable for playing 78 r.p.m. records, such as shown in FIG. 54, the tone arm is moved outwardly by an amount sufficient to provide positive engagement of the end of the needle selecting arm 109 with the recessed speed control lever 113 and the movement of this lever to the 78 r.p.m. speed control position shown in FIG. 54. This positive engagement with either the edge 766 of the rest post 111 or the recessed speed control lever 113 is provided by arranging the parts so that the tone arm edge 765 strikes the rest post edge 766 or the end of the needle selecting arm 109 moves the lever 113 to the position shown in FIG. 54 before the slide has completed its forward movement in the direction of the arrow 473 shown in FIG. 17. This means that after the edges 765 and 766 engage, or the lever 113 is actuated, the flange 753 on the cycling slide 221 continues to move forwardly and hence compresses the U-shaped safety spring so that the end portion 761 thereof is moved away from the adjacent end of the arcuate slot 756 in the tone arm bracket 348, as best illustrated in FIG. 24. With this arrangement, the compression of the safety spring 755 permits substantial variation in the tolerances of the parts and positioning thereof while providing positive actuation of the speed control lever 113 during outward movement of the tone arm 102. Also, if the operator restrains the tone arm from outward movement during the record changing cycle so that the tone arm bracket 348 is held, for example, in the position shown in FIG. 62, the tone arm positioning mechanism is not jammed but instead the movement of the cycling slide 221 in the forward direction 473 merely causes the safety spring 755 to be compressed so that the end portion 761 thereof is moved within the slot 756 to the position shown in FIG. 62. However, as soon as the tone arm is released by the operator, the compression force of the safety spring 755 causes the tone arm to move outwardly to the correct position without damage to the tone arm mounting mechanism or the automatic changing mechanism.

During the last half of the record changing cycle the tone arm is moved inwardly to a position over the lead-in groove of the record which has been deposited on the turntable by the spindle 105 during the same record changing cycle and is then lowered into engagement with this lead-in groove at substantially the end of the record changing cycle. In order to move the tone arm inwardly to the correct index position, there is provided a tone arm spring 770 (FIG. 19) which is connected between the index bracket 711 and the main base plate 100. The spring 770 exerts a force on the index bracket 711 which tends to hold the index pawl flange 436 of the tone arm indexing mechanism in engagement with a particular one of the indexing steps 713a–713d, inclusive, provided on the flange 713 of the index bracket 711. However, as the tone arm bracket 348 is rotated during the first portion of the record changing cycle and the tongue 726 is engaged by the notch 723 on the pivot bracket 363, the index bracket 711 becomes locked to the tone arm bracket 348 and upon further rotation of the tone arm bracket 348 the index bracket 711 is also rotated about the pivot post 345 against the biasing force of the spring 770. As the index bracket 711 is thus rotated it releases the index pawl flange 436 and permits the tone arm indexing mechanism to be indexed in accordance with the size of the next record released to the turntable at substantially the mid-point of the record changing cycle.

During the last half of the record changing cycle the cycling slide 221 moves in the direction of the arrow 477 shown in FIG. 25. However, the tone arm spring 770 holds the end portion 762 of the safety spring 755 in engagement with the end flange 753 on the cycling slide 221, it being remembered that the index bracket 711 and the tone arm bracket 348 are locked together during this portion of the record changing cycle, so that the tone arm is moved inwardly toward the spindle 105. With this arrangement the spring 770 provides the force necessary to produce inward movement of the tone arm 102 while, at the same time, the spring 770 cannot move the tone arm inward abruptly since the safety spring tip 762 remains in engagement with the end flange 753 on the cycling slide 221. Accordingly, as the cycling slide 221 moves slowly back to its rest position the tone arm is moved smoothly in towards the centering spindle 105. This movement of the tone arm continues until the index pawl flange 436 engages one of the indexing steps 713a, 713b or 713c on the index bracket 711, the index pawl flange 736 having been positioned for engagement with the correct index step on the bracket 711 by means of the tone arm indexing mechanism to be described in more detail hereinafter.

When the index pawl flange 436 engages one of the indexing steps, such as the seven inch record indexing step 713a, for example, inward movement of the tone arm is terminated and the spring 770 holds the index pawl flange 436 in engagement with the step 713a while the cycling slide continues its movement in the direction of the arrow 477 to its rest position at the end of the record changing cycle. During this latter movement of the cycling slide 221, the inclined flange 750 engages the corner 752 of the index bracket 711 and lifts this index bracket upwardly on the post 345 against the force of the lift spring 751. Accordingly, as the tongue portion 726 on the bracket 711 is elevated the tone arm is lowered until it engages the lead-in groove of the seven inch record positioned on the turntable 101. When the tone arm thus engages the lead-in groove of the record, further downward movement of the tone arm is terminated and as the index bracket continues to move upwardly by engagement with the inclined flange 750, the tongue 726 is moved upwardly out of the notch 723 to the position shown in FIG. 39, in which the tongue 726 is positioned in a horizontal plane above the bottom edge 727 of the notch 722 on the pivot bracket 363. The tone arm is thus released from the index bracket 711 and is permitted to move inwardly over the record by engagement with the record grooves during the playing cycle while the index bracket 711 is held in the previously indexed position under the force of the spring 770 which holds the index pawl stop 436 in engagement with the seven inch indexing step 713a.

*Automatic tripping mechanism*

Considering now in more detail the automatic tripping mechanism of the present invention, it will be recalled from the general description of the changer and the above description of the cycling slide driving mechanism that a record changing cycle may be initiated by movement of the control arm 125 to either the on, reject position 126 or the off position 127 thereof, this movement of the control arm 125 causing the control lever 306 to lift the cycling control lever 266 upwardly by engagement of one of the inclined arms 322 or 323 of the control lever 306 with the offset arm 325 of the cycling control lever 266.

A record changing cycle may also be initiated automatically by means of a velocity tripping mechanism which includes the trip arm 205 and the trip cam 202, the cam 202 being positioned beneath the turntable hub 208 and rotating therewith during record playing periods. More particularly, a polished washer 775 (FIG. 22) is positioned on the bottom flange 351 of the tone arm bracket 348 and the hub portion 776 of the trip arm 205 is positioned on the washer 775 and rotates about the bearing sleeve 353. A trip arm spring 777 is positioned between the hub portion 776 of the trip arm 205 and a reset washer 778 which is adapted to engage the underside of an annular flange 779 provided intermediate the ends of the bearing sleeve 353, the reset washer 778 being provided with an offset arm portion 780. The trip arm 205 is provided with an upturned flange portion 781 which extends along the length of the trip arm 205 to provide stiffness for this member, the flange 781 having an upstanding curved flange portion 782 at the edge of the hub portion 776, the flange 782 terminating in an arcuate flange portion 783 of greater height than the remainder of the flange 782. One end 784 of the trip arm spring 777 extends radially away from the pivot post 345 and is adapted to engage the edge 785 of the arcuate flange 783. The other end of the grip arm spring 777 terminates in an upstanding end portion 786 which is adapted to engage the edge 787 of the reset washer arm 780, as shown in FIG. 21. The trip arm 205 is provided with an offset flange portion 790 having an upstanding tongue portion 791 thereon which is adapted to be engaged by the upstanding end portion 759 of the safety spring 755 which is carried by the bottom flange 351 of the tone arm bracket 348.

When a record changing cycle is initiated and the tone arm bracket 348 is rotated about the pivot post 345 by engagement of the end flange 753 on the cycling slide 221 with the tip portion 762 of the safety spring 755, the trip arm 205 is carried with the tone arm bracket 348 until the rest washer arm 780 is stopped by the side flange 338 of the main mounting bracket 335 at which time the upstanding end portion 759 of the safety spring 755 engages the upstanding flange portion 791 of the trip arm 205 so that the trip arm 205 is positioned in correct relation to the tone arm 102. Normally, the trip arm spring 777 exerts a torsional force on the edge 787 of the reset washer arm 780 so that this arm is held in engagement with the edge portion 795 of the arcuate flange portion 783 of the trip arm 205. However, as the tone arm 102 is moved to its extreme outward position and the reset washer arm 780 has engaged the edge of the side flange 338 of the main mounting bracket 335, as shown in FIG. 21, the reset washer arm 780 is moved away from the edge 795 of the arcuate flange 783 against the torsional force of the trip arm spring 777. With this arrangement, the tone arm 102 may be moved outwardly by a substantial amount so as to provide for positive engagement of the 78 r.p.m. control lever 113 in the manner described heretofore, while maintaining the correct relationship between the trip arm 205 and the tone arm 102 due to the overtravel permitted by the reset washer arm 780 and the trip arm spring 777.

As the tone arm 102 is moved inwardly from its extreme outward position, the trip arm spring 777 functions to hold the upstanding flange 791 on the trip arm 205 in engagement with the upstanding end portion 759 of the safety spring 755 so that the correct relationship between the trip arm 205 and the tone arm 102 is maintained. However, after the tone arm has been moved inwardly by an amount sufficient to bring the side 795 of the arcuate flange 783 into engagement with the reset washer arm 780 the arm 780 is moved away from the edge of the mounting bracket flange 338 and thereafter the trip arm 205, the trip arm spring 777 and the reset washer 778 move together as a unitary assembly.

The trip arm spring 777 also acts as a compression member between the reset washer 778 and the hub portion 776 of the trip arm 205 so that the reset washer is urged into engagement with the shoulder 779 on the bearing sleeve 353 and the hub portion 776 of the trip arm 205 is urged into engagement with the polished washer 775. Accordingly, the trip arm spring 777 provides a frictional connection between the trip arm 205 and the tone arm bracket 348. This frictional connection is sufficient to cause the trip arm 205 to move inwardly toward the spindle 105 in synchronism with inward movement of the tone arm over the record during the playing cycle and during this period the flange 791 remains in engagement with the end portion 759 of the safety spring 755 since the flange 791 was so positioned at the end of the record changing cycle. However, as the tone arm moves inwardly over the record and approaches the runout groove 796, for example, of a record 797 positioned on the turntable (FIG. 47), the trip arm 205 has been moved inwardly toward the spindle by an amount sufficient to cause the free end portion of the trip arm 205 to be engaged by the trip cam 202 which rotates with the turntable 101. More particularly, the trip arm 205 is provided with an end flange 800 (FIG. 21) the edge 801 of which is positioned at a slight angle with respect to a tangent of the center of the spindle 105. The trip cam 202 includes a hub portion 204 connected to which is an outwardly and upwardly extending arm portion 206 which terminates in an offset arm portion 203, the arm portion 203 extending at an angle of substantially 45 degrees with respect to the plane of the hub portion 204 for a substantial distance both above and below the hub portion 204, as is best illustrated in FIG. 51. The bottom end of the turntable hub 208 is arranged to seat on the hub portion 204, through the friction washer 210, with sufficient weight that the trip cam 202 is normally rotated in synchronism with the turntable 101. As the trip cam 202 is thus rotated the outer edge of the offset arm portion 203 thereof engages the edge 801 of the trip arm end flange 800 and since the edge 801 is slightly off tangency with respect to the center of the spindle 105 the trip arm 205 is moved outwardly to the position shown in dotted lines at 803 in FIG. 48 each time the trip cam arm 203 engages the edge 801 thereof. Thus, during the remainder of the playing cycle the trip arm is moved inwardly toward the spindle 105 in synchronism with inward movement of the tone arm 102 and is then knocked outwardly by engagement of the offset arm 203 on the trip cam 202 with the edge 801.

During the playing period the inward movement of the trip arm 205 is relatively slow and hence the engagement of the edge 801 by the trip cam arm 203 once during each revolution of the turntable is sufficient to maintain the trip arm 205 in substantially the same poesition. However, as soon as the tone arm engages the runout groove 796 of the record, the tone arm is moved rapidly in toward the spindle 105 and the trip arm is also moved in toward the spindle 105 at the same rate. Accordingly, when the runout groove 796 is engaged the trip arm 205 is moved inwardly during one revolution of the turntable by an amount sufficient to cause the upper surface of the offset arm 203 of the trip cam 202 to engage the transverse edge 802 of the end flange 800 on the trip arm 205 instead of the edge 801 thereof. When this occurs the trip arm 205 is not knocked outwardly but instead the offset trip cam arm 203 cams the outer end of the trip arm 205 bodily upward as the cam 202 is rotated so that the edge 802 of the trip cam 205 rides up the inclined surface of the offset arm 203 (FIG. 50) to the upper edge thereof and then drops back to its normal horizontal position as the trip cam 202 continues to rotate.

When the trip arm 205 is brought to a position in which the edge 801 thereof is engaged by the offset arm 203 on the trip cam 202, the end flange 800 of the trip arm 205 is then positioned beneath the end of the cycle control lever 266 as illustrated in FIGS. 48 and 50. Accordingly, when the edge 802 of the trip cam 205 is engaged by the offset trip cam arm 203 so that the end flange 800 of the trip arm 205 is moved bodily upward to the position shown in FIG. 51, the end flange 800 engages the underside of the cycle control lever 266 and tilts the end of this lever upwardly by an amount sufficient to cause the flange 276 on the lever 266 to release the cycling driver arm 275 and hence initiate a record changing cycle in a manner identical to that described above in connection with FIG. 7 wherein the record changing cycle was initiated by manual actuation of the control lever 306 which also produced a lifting movement on the outer end of the lever 266 by engagement of the offset arm portion 325 thereof with one of the inclined arms 322 or 323 on the control lever 306. As the record changing cycle proceeds the trip arm 205 is moved outwardly from beneath the lever 266 since it is frictionally attached to the tone arm bracket 348, as described in detail heretofore, so that the trip arm 205 does not in any way interfere with the operation of the cycling mechanism during the record changing cycle.

*Tone arm skip preventing mechanism*

Considering now in more detail the manner in which the tone arm is restrained at the beginning of the playing cycle so that the needle cannot skip or skate inwardly over the first few grooves of the record as the turntable is brought up to playing speed, it will be recalled from the general description of the changer that a frictional force of predetermined value is applied to the tone arm 102 during the latter portion of the record changer cycle so that when the needle is lowered onto the record and the turntable is brought up to the desired playing speed at approximately the end of the record changing cycle the needle does not skip or skate inwardly over the first few grooves of the record. However, when the needle engages the spiral lead-in groove of the record the tone arm is moved inwardly against this frictional force and after one or two revolutions of the turntable 101 the frictional force is removed altogether so that no side thrust on the grooves of the record is produced and wear on the sound grooves is avoided.

In order to provide the above described frictional force, there is provided a friction member indicated generally at 805, the hub portion 806 of which is pressed against the upper side of the annular flange 779 on the bearing sleeve 353 by means of the coil spring 807 the upper end of which is positioned beneath a C-washer 808 positioned in a groove in the upper end of the bearing sleeve 353. The friction member 805 is provided with a horizontally extending friction arm 809 which terminates in an upwardly inclined end portion 810. The upper end 811 of the coil spring 807 extends outwardly from the hub portion 806 of the friction member 805 and is adapted to engage one side of the tone arm bracket 348. The other end 812 of the coil spring 807 extends radially outwardly from the hub portion 806 and is adapted to engage the other side of the tone arm bracket 348. The member 805 is provided with a pointed lug portion 813 which extends radially outwardly from and is inclined slightly upwardly from the plane of the hub portion 806.

In order to position the friction member 805 in correct relation to the tone arm bracket 348, and hence the tone arm 102, during each record changing cycle, the member 805 is provided with a reset arm 814, which is offset upwardly from the plane of the hub portion 806 to provide clearance from the upper edge of the arcuate flange portion 783 of the trip-arm 205, as best illustrated in FIG. 22, the reset arm 814 being adapted to engage the side flange 338 of the main mounting bracket 335 as the tone arm is moved outwardly during the record changing cycle. More particularly, as the tone arm 102 is moved outwardly during the record changing cycle and the tone arm bracket 348 is rotated in the direction of the arrow 815 about the pivot post 345 (FIG. 76) the friction member 805 rotates with the tone arm bracket until the reset arm 814 strikes the edge of the mounting bracket flange 338. As the tone arm continues to move outwardly to its extreme outward position at substantially the mid-point of the record changing cycle the lug portion 813 of the friction member 805 engages the end portion 812 of the coil spring 807 and urges this end portion away from the side of the tone arm bracket 348 to the postion shown in FIG. 77 in which position the bracket 348 is in the position corresponding to the extreme outward position of the tone arm 102. As the tone arm is moved inwardly during the last half of the record changing cycle the bracket 348 is rotated in the opposite direction from the arrow 815 so that the end portion 812 of the coil spring 807 again engages the side of the bracket 348 at which point the friction member 805 is positioned in correct relation to the tone arm bracket 348 and hence the tone arm 102. As the tone arm continues to move inwardly the friction member 805 rotates with the tone arm bracket 348 and hence produces no frictional force on the tone arm. However, if the friction arm 809 is blocked or restrained, as described in more detail hereinafter, a frictional force is applied to the tone arm 102 since the coil spring 807 urges the hub portion 806 of the friction member 805 into engagement with the flange 779 on the bearing sleeve 353. In this connection it will be noted that since the spring arms 811 and 812 straddle the tone arm bracket 348 the coil spring 807 is prevented from rotating with respect to the tone arm bracket 348 and hence this spring does not wind up during relative motion between the friction member 805 and the tone arm bracket 348 but instead functions to apply a smooth frictional force against the hub portion 806 which holds this hub portion against the flange 779 with a predetermined frictional force. It will also be noted that the spring arms 811 and 812 function to provide a safety feature in that the friction arm 809 may be held during rotation of the tone arm bracket 348 without damaging the mechanism due to the resilient nature of the spring arms 811 and 812.

In order to restrain or block the friction member 805 from rotating with the tone arm bracket 348 so that a frictional force is exerted on the tone arm 102 as the needle is lowered into engagement with either a twelve inch, a ten inch or a seven inch record, there is provided a friction control rod 820 one end of which is provided with a U-shaped portion 821 and the other end of which is provided with an upstanding end portion 822. The U-shaped end portion 821 extends through an elongated aperture 823 (FIG. 18) in the flange portion 341a of the flange 341 and the bottom leg 824 of the U-shaped end portion 821 is positioned in a notch 825 formed in the bottom edge of the flange 341. The elongated opening 823 is provided so that the U-shaped end portion 821 may be inserted bodily through the aperture 823 after which the leg 824 is positioned within the notch 825 so that the friction control rod 820 can be readily assembled. In order to support the forward end of the control rod 820 adjacent the upstanding end portion 822 thereof, there is provided a mounting bracket 826 (FIG. 3), which is secured to the underside of the central portion 142 of the base plate 100 so that the control rod 820 is loosely supported adjacent the under side of the base place 100 and may be readily reciprocated longitudinally of its length.

In order to move the friction control rod 820 forwardly to the position shown in FIG. 71, there is provided on the main cycling slide 221 a transversely extending lug portion 827 which is positioned to engage the upstanding end portion 822 of the friction control rod 820. Accordingly, as the cycling slide 221 moves forwardly to the position shown in dotted lines in FIG. 71 during the first half of the record changing cycle the lug 827 engages the end portion 822 and moves the friction control rod 820 from the position shown in FIG. 73 to the position shown in FIG. 71. The friction arm 809 of the friction member 805 is positioned below the end of the flange portion 341a which supports the U-shaped end portion 821 of the control rod 820 so that when the control rod 820 is in the position shown in FIG. 73 the friction arm 809 can move with the tone arm bracket 348 as the tone arm is moved outwardly during the first portion of the record changing cycle and the friction arm 809 passes beneath the end of the flange portion 341a. However, just prior to the mid-point of the record changing cycle the lug 827 on the cycling slide 221 engages the end portion 822 and moves the control rod 820 forwardly to the position shown in FIG. 71 in which position the bottom leg 824 of the U-shaped end portion 821 is positioned in the path of the upturned end portion 810 of the friction arm 809. Accordingly, as the tone arm is moved inwardly during the last half of the record changing cycle the friction member 805 moves with the tone arm bracket 348 until the friction arm end portion 810 strikes the leg portion 824 of the control rod 820, as shown in dotted lines in FIG. 76, at which point the friction member 805 is prevented from rotating with the tone arm bracket 348 and further inward movement of the tone arm must overcome the frictional force produced between the hub 806 of the friction member 805 and the flange 779 of the bearing sleeve 353 which is secured to the tone arm bracket 348.

The end portion 810 is adapted to engage the leg 824 before the tone arm has been moved inwardly to the twelve inch indexing position so that as the tone arm is moved inwardly to either the twelve inch position, the ten inch position or the seven inch indexing position the above described frictional force is exerted thereon. As the tone arm is lowered onto the record in any one of the three indexing positions thereof, the frictional force tending to prevent inward movement of the tone arm persists as the needle engages the record on the turntable 101 so that when the turntable is brought from a standstill to the desired playing speed at substantially the end of the record changing cycle the needle will not skip or skate inwardly over the first few grooves of the record. However, as soon as the needle engages the spiral lead-in groove of the record the tone arm is moved inwardly against the above described frictional force since the force exerted by the coil spring 807 is very slight and is merely sufficient to prevent inward skipping of the needle as the turntable is started up.

In order to remove the leg 824 from the path of the end portion 810 after one or two revolutions of the turntable 101 so that even the frictional force exerted by the coil spring 807 is removed by the time the needle engages the sound grooves of the record, there is provided a camming member indicated generally at 830 which is positioned in a groove 831 formed in the turntable bushing hub 208, the camming member 830 being secured in the groove 831 with sufficient biasing force so that the member 830 rotates with the turntable hub 208 when the turntable 101 is rotated. The camming member 830, which is preferably formed of music wire or other suitable round cross section stock, includes a first camming portion 832 which extends tangentially away from the periphery of the hub 208. The camming member 830 also includes a second camming portion 833 which is parallel to but spaced laterally from the camming portion 832, the portions 832 and 833 being connected by means of an upstanding inverted U-shaped intermediate portion 834.

Assuming that the control rod 820 has been moved to the extreme forward position shown in FIG. 71 by engagement of the lug 827 with the upstanding end portion 822 and recalling that the turntable 101 is held stationary during most of the record changing cycle, during the first revolution of the turntable 101 at substantially the end of the record changing cycle the camming member 830 rotates with the turntable 101 and the camming portion 832 thereof engages the upstanding end portion 822 of the control rod 820, as shown in FIG. 74, and cams the control rod 820 rearwardly until the end portion 822 passes between the upstanding arms of the U-shaped portion 834 of the camming member 830, as shown in FIG. 72, so that the control rod 820 is moved to the intermediate position shown in FIG. 72. However, in the position shown in FIG. 72, the leg 824 of the control rod 820 is still positioned in the path of the friction arm end portion 810 so that the above described frictional force continues to be exerted on the tone arm 102 so that inward skipping of the needle is prevented during the first revolution of the turntable. During the second revolution of the turntable 101 the outer camming portion 833 of the camming member 830 engages the upstanding end portion 822 of the control rod 820, as shown in FIG. 75. This is because the camming portion 833 overlaps the U-shaped portion 834 and as the turntable is rotated the camming portion 833 cams the control rod 820 rearwardly by a second increment so that the control rod 820 is moved to its most rearward position shown in FIG. 73 in which position the leg 824 is removed from the path of the friction arm end portion 810. The friction member 805 and the tone arm bracket 348 are then permitted to move together as a unit while the tone arm moves inwardly over the sound grooves of the record and hence no frictional force is exerted on the needle which would tend to produce wear on the sound grooves of the record.

Once the control rod 820 has been moved to its rearmost position shown in FIG. 73 by engagement with the camming portion 833 of the camming member 830 this control rod remains in this position while the turntable is rotating during the remainder of the playing cycle. The control rod 820 also remains in the position shown in FIG. 73 during substantially the entire first half of the record changing cycle so as to permit the friction arm end portion 810 to be moved outwardly beyond the path of the leg 824 as the tone arm is moved outwardly toward the rest post 111 during this portion of the record changing cycle. However, as described above, the lug 827 engages the end portion 822 and moves the control rod 820 forwardly to the position shown in FIG. 71 at substantially the mid-point of the record changing cycle so that when the tone arm is thereafter moved inwardly the leg 824 can block the friction arm end portion 810 and produce the above described frictional force which will prevent inward skipping of the needle as the turntable is brought up to speed.

While the camming member 830 is retained within the groove 831 in the hub 208 with sufficient biasing force so that the camming member 830 rotates with the hub 208, the camming member 830 is preferably arranged so that it can be moved within the groove 831 so that if the camming member 830 is positioned in the path of the end portion 822 as this end portion is moved forwardly by engagement of the lug 827 therewith the camming member 830 will merely be moved within the groove 831 and jamming or damage to the camming member 830 will be prevented. It will be understood that such a situation could only occur if the turntable were stopped with the camming portion 833 directly in the path of forward movement of the end portion 822 of the control rod 820. It will also be noted that the end portion 810 of the friction arm 809 is inclined at an angle to the vertical so that if the leg 824 of the control rod 820 happens to strike the end portion 810 as the control rod 820 is moved forwardly by engagement of the lug 827 with the end portion 822 the leg 824 will ride over the end portion 810 with the result that the friction arm 809 will merely be tilted about the bushing 353, the hub portion 806 being provided with a sufficient large clearance hole to permit this tilting action.

Since the turntable 101 may be stopped in any position during the record changing cycle the turntable could be stopped with the camming member 830 almost in position to engage the end portion 822 so that as soon as the turntable 101 is rotated the camming portion 832 would engage the end portion 822 and move the rod 820 its first increment of movement to the position shown in FIG. 72. However, the rod 820 will not be moved outwardly by engagement with the second camming portion 833 until one full revolution of the turntable later so that the frictional force which tends to prevent inward skipping of the needle is maintained during at least one full revolution as the turnable is being brought up to speed. On the other hand, this frictional force may last for substantially two full revolutions since it may require almost one full revolution to bring the camming portion 832 into engagement with the end portion 822.

In the event that the skip preventing mechanism of the present invention is employed in a changer in which the turntable continues to rotate during the record changing cycle, as, for example, when the braking element 935 described in detail hereinafter is eliminated so that the turntable 101 would coast during record changing cycles but would not be brought to a complete stop, the skip preventing mechanism of the present invention will function properly in such a changer provided only that the camming member 830 is prevented from rotating with the turntable during the record changing cycle so that the rod 820 is held in the position shown in FIG. 71 until substantially the end of the record changing cycle. Such action can conveniently be provided by merely providing a laterally extending tab portion 840 on the cycling control lever 266, as shown in FIG. 78. It will be recalled from the previous description of the changer that the cycling control lever 266 is tilted upwardly to the position shown in FIG. 61 when the record changing cycle is initiated and remains in this position until near the end of the record changing cycle at which time the flange portion 276 of the lever 266 is moved outwardly beyond the tip portion 275 of the lever 228 so that the cycling control lever 266 is permitted to drop back to a horiozntal position, as shown in FIG. 10. In the embodiment of FIG. 78, the tab portion 840 is so positioned that when the lever 266 is tilted upwardly to the position shown in FIG. 61 the tab 840 is positioned in the path of the camming member 830 and restrains the camming member 830 so that this member slides within the groove 831 as the turntable is rotated during the record changing cycle. However, at substantially the end of the record changing cycle the lever 266 is tilted back to its normal horizontal position and the tab 840 is moved downwardly below the path of the camming member 830 so as to permit this camming member to rotate with the turntable hub 208. When this occurs the camming member 830 functions to move the friction control rod 820 rearwardly in two successive increments, as described in detail heretofore, so that an antiskipping frictional force is provided during at least the first full revolution of the turntable after the record changing cycle is completed. In this connection it will be understood that in the embodiment of FIG. 78, in which the turntable is rotating during the record changing cycle, the other portions of the skip preventing mechanism are identical to that described in detail heretofore the only addition which is required being the addition of the tab 840 on the cycling control lever 266.

Tone arm indexing mechanism

Considering now in more detail the manner in which the tone arm 102 is positioned correctly for records of different sizes, it will be recalled from the general description of the changer and the description of the tone arm mounting mechanism that the index finger 104 is employed to detect the size of the record which is deposited on the turntable 101 and a suitable mechanism is provided for positioning the tone arm 102 in accordance with movement of the indexing finger 104.

The indexing finger 104 is pivotally mounted on a lug 401, a C-washer 405 (FIG. 18) being positioned under base portion 336 of the main mounting bracket 335. More particularly, the shaft portion 402 of the indexing finger 104 is provided with a curved end portion 403 which is positioned on a stud 404 mounted on the lug 401, a C-washer 405 (FIG. 18) being positioned under the head portion 406 of the stud 404 to retain the end portion 403 of the indexing finger on the supporting stud 404. The shaft portion 402 of the indexing finger 104, which is of generally rectangular cross section, extends through an opening 407 (FIG. 21) formed in the base postion 336 when the lug 401 is formed, through a guiding slot 408 (FIG. 20) in the upper flange 339 of the main mounting bracket 335, through a clearance slot 409 in the main base plate 100, and through a second clearance slot 410 in the top wall 411 of the base portion 412 of the balance arm support 115.

A coil spring 415 is provided to urge the indexing finger 104 within the slot 408 to the position shown in dotted lines at 132 in FIG. 20, one end of the spring 415 being hooked around the shaft portion 402 of the indexing finger 104 and the other end of the spring 415 being secured to the base portion 336 of the main mounting bracket 335, as best illustrated in FIGS. 20 and 21. However, an indexing finger retracting spring 418 is provided to hold the indexing finger in a retracted position with the shaft portion 402 thereof urged against the back end 419 of the guide slot 408 (FIG. 20) during periods between the record changing cycles so that the indexing finger 104 does not interfere with the removal of records from the turntable 101. More particularly, one end portion 420 (FIG. 19) of the retracting spring 418 terminates in a right angle tip portion 421 (FIG. 24) which is secured to the cycling slide 221 by any suitable means such as the rivet 422 and the other end portion 423 of the spring 418 terminates in an inclined intermediate portion 424 and a transversely extending tip portion 425, the tip portion 425 being urged into engagement with the shaft 402 of the indexing finger 104, in the manner shown in FIG. 20 of the drawings, when the cycling slide 221 is in the initial or rest position shown in FIGS. 1, 2 and 17. When the main cycling slide 221 is in the rest position shown in FIGS. 1, 2 and 17, the tip portion 425 of the retracting spring 418 holds the indexing finger 104 in the fully retracted position shown in FIGS. 1, 2 and 4 of the drawings. However, as soon as the record changing cycle is initiated and the cycling slide 221 is moved forwardly, the tip portion 425 of the retracting spring 418 is carried with the cycling slide and the shaft 402 of the indexing finger 104 follows the tip portion of retracting spring under the force of the spring 415 and permits the indexing finger to be moved forwardly against the forward edge 426 of the guide slot 408, i.e., the position shown in dotted lines at 132 in FIG. 20. The retracting spring continues to move forwardly and out of engagement with the shaft 402 as the index finger stops on the edge 426 of the guide slot 408.

If a seven inch record is deposited on the turntable during the record changing cycle, the indexing finger 104 is not struck by this record and hence remains in the position shown in dotted lines at 132 in FIG. 20. If the record deposited on the turntable is a ten inch record the outer edge portion of this record strikes the sloping side 428 of the indexing finger 104 and moves it to the position shown in dotted lines at 131 in FIG. 20. If the record deposited on the turntable during the record changing cycle is a twelve inch record the outer edge portion of this record strikes the sloping edge 428 of the indexing finger 104 and moves it to the position shown in dotted lines at 134 in FIG. 20. A control linkage now to be described is provided to translate movement of the indexing finger 104 to one of the above described positions into a corresponding index position of the index pawl flange 436 so that the tone arm is properly engaged with the lead-in groove of the record in accordance with its diametral size.

More particularly, the index pawl flange 436 is provided on the free end of an index pawl member 435. A bearing sleeve 438 (FIG. 20) is secured in the opening 439 (FIG. 23) of the index pawl 435 by any suitable means, such as a staking operation or the like, and the bearing sleeve 438 is mounted on a post 440 which is staked or otherwise secured on a shallow depressed portion 441 of the top flange 339 of the main mounting bracket 335, so that the index pawl 435 is pivotally mounted for movement about the post 440, the bearing stud 448 being retained on the post 440 by means of a C-washer 442. An index pawl stop 445 is pivotally connected to a downturned flange 446 on the other end of the index pawl 435. More particularly, the index pawl stop 445 is provided with a slot 447 which is adapted to receive the tongue-like end portion 448 of the flange 446, the tongue 448 having notches 449 and 451 in the sides thereof to provide a neck portion 452 which is adapted to fit in an enlarged arcuate portion 450 of the slot 447 in the index pawl stop 445. The tongue portion 448 is first inserted into the slot 447 and the neck portion 452 is then moved into the arcuate slot portion 450 so that the index pawl 435 and the index pawl stop 445 are pivotally connected together in the manner shown in FIGS. 24 and 25 of the drawings. With this arrangement free pivotal movement of the index pawl stop 445 with respect to the index pawl 435 is permitted while preventing the index pawl stop 445 from twisting. This arrangement also eliminates the need for a post and C-washer for arranging these parts so that one pivots about the other.

The outer end portion 455 of the index pawl stop 445 is adapted to engage a downturned lug 456 on the index pawl 435, a horizontally extending lug portion 457 (FIG. 24) of the side flange 337 of the main mounting bracket 335 being provided to prevent the end portion 455 of the index pawl stop 445 from falling down below the tip of the lug 456 on the index pawl 435. An index finger catch 460 is pivotally connected to the index pawl stop 445 by means of the rivet 461 and is provided with an upturned flange 462 which is adapted to engage, under certain conditions, the edge 463 of the index pawl stop 445. The index finger catch 460 is provided with a hole 464 which is adapted to receive one end of a coil spring 465, the other end of the spring 465 being secured to the downwardly extending flange portion 341 of the main mounting bracket 335.

The main cycling slide 221 is provided with an upturned flange 470 along one edge thereof, this flange terminating in a rounded end portion 471 which is adapted to engage a curved shoulder or camming surface 472 (FIG. 24) provided on the index pawl stop 445. When the cycling slide 221 is in the rest position shown in FIG. 17, for example, the flange 470 engages the shoulder 472 on the index pawl stop 445 and urges the tip portion 455 of the index pawl stop 445 away from the shaft 402 of the indexing finger 104.

Considering now the operation of the above described tone arm indexing mechanism and assuming that the parts are in the rest position shown in FIG. 17, when the parts are in this rest position, the pawl flange 436 of the index pawl 435 is in engagement with the rest position step 713d on the tone arm index bracket 711 and is held against this step by the bias of the spring 770. However, due to the sidewise thrust exerted by the flange 470 on the shoulder 472 of the index pawl stop 445 the tip portion 455 thereof is positioned out of engagement with the lug portion 456 on the index pawl 435 against the force of the biasing spring 465. When the cycling slide 221 starts to move in the direction of the arrow 473 (FIG. 17) during the first portion of the record changing cycle, the tip portion 425 of the retracting spring 418 is first moved out of engagement with the shaft portion 402 of the indexing finger 104 so as to permit the indexing finger 104 to be positioned as shown in dotted lines at 132 in FIG. 20 under the force of the biasing spring 415. As the cycling slide 221 moves further in the direction of the arrow 473 the end portion 471 of the flange 470 moves along the curved camming shoulder 472 provided on the index pawl stop 445 so that the edge 489 of the pawl stop 445 is urged into engagement with the side of the index finger shaft 402 by the spring 465, as shown in FIG. 24 of the drawings, it being recalled that the index pawl stop 445 is pivotally connected to and supported by the flange portion 446 of the index pawl 435 and hence the index pawl stop 445 pivots about the apex of the arcuate slot 450 as it is urged into engagement with the side of the index finger shaft 402 by the spring 465.

Up to this point in the record changing cycle the index pawl flange 436 remains in engagement with the rest portion step 713d on the tone arm index bracket 711, i.e., the position shown in dotted lines at 475 in FIG. 24 due to the fact that the tone arm return spring 770 exerts a biasing force which holds these members in engagement. However, as the slide 221 continues to move in the direction of the arrow 473, the flange 753 thereon engages the safety spring tip 762 and rotates the tone arm bracket 348 about the post 345. When the index bracket 711 is locked in step with the tone arm bracket 348 the index bracket 711 is also rotated about the pivot post 345 so that the ratchet step 713d thereon is moved away from the index pawl flange 436. As soon as the tone arm index bracket 711 is moved sufficiently to release the index pawl flange 436, the index pawl 435 is pivoted outwardly to the position shown in full lines in FIG. 24 in which position the lug 456 on the index pawl 435 engages the tip 455 of the index pawl stop 445. This outward movement of the index pawl 435 from the position shown in dotted lines at 475 in FIG. 24 to the position shown in full lines in this figure is brought about by the spring 465 which exerts a force through the index finger catch 460 on the index pawl stop 445. Since the index pawl stop 445 is itself in engagement with the index finger shaft 402, a force in the direction of the arrow 476 in FIG. 24 is exerted on the pivot flange 446 of the index pawl 435 so that the index pawl 435 is pivoted about the post 440 until the lug 456 engages the pawl stop tip 455. In this connection it is noted that the cycling slide 221 is shown in full lines in FIG. 24 in a position just after the safety spring tip 762 has been engaged by the cycling slide flange 753 and the index bracket 711 has been pivoted by an amount sufficient to release the index pawl flange 436.

When the index pawl 435 has been moved to the position shown in full lines in FIG. 24, the pawl flange 436 is in the correct position to engage the seven inch ratchet step 713a on the tone arm index bracket 711. Just after the above described release of the pawl flange 436 from the rest-step 713d, and at substantially the mid-point of the record changing cycle, the spindle 105 releases a record to the turntable 101. If this record is a seven inch record it will drop down on the spindle 105 without striking the indexing finger 104 so that the index finger shaft 402 remains in the position shown in dotted lines at 132 in FIG. 20 and the position shown in full lines in FIG. 24. During the last half of the record changing cycle the cycling slide 221 is moved in the direction of the arrow 477 in FIG. 25 and as the slide moves in this direction it permits the tone arm return spring 770 to pivot the index bracket 711 in the direction of the arrow 478 shown in FIG. 25 until the index pawl flange 436 engages the seven inch index step 713a on the index bracket 711.

The inward movement of the tone arm 102 is thus arrested by engagement of the pawl flange 436 with the seven inch record step 713a in the correct position for the needle to engage the lead-in groove of the seven inch record positioned on the turntable 101. As the cycling slide 221 continues to move in the direction of to arrow 477 (FIG. 25), the flange 470 on the cycling slide 221 engages the curved camming shoulder 472 on the index pawl stop 445 and exerts a force on this shoulder in the direction of the arrow 479 shown in FIG. 25. Since the index pawl 435 is held fixed by engagement of the pawl flange 436 with the seven inch record step 713a and the index pawl stop 445 is pivotally connected to the index pawl 435 by the interconnection of the pivot flange 446 with the slot 450, the force exerted on the index pawl stop 445 in the direction of the arrow 479 causes the index pawl stop 445 to be pivoted so that the tip portion 455 thereof is moved to the position shown in full lines in FIG. 25 of the drawings. When the index pawl stop 445 is moved to this position, it is moved out of engagement with the side of the index finger shaft 402 thus permitting the indexing finger 104 to be moved to the retracted position shown in full lines in FIG. 20 by engagement of the tip portion 425 of the retracting spring 418 with the index finger shaft 402 as the cycling slide 221 is moved to its rest position at the end of the record changing cycle shown in FIG. 25. The force exerted in the direction of the arrow 479 tends to pivot the index pawl 435 so that the index pawl flange 436 is urged into engagement with the index bracket flange 713 during the playing period when the main cycling slide 221 is at rest.

When a ten inch diameter record is released by the spindle 105, it strikes the sloping shoulder 428 of the indexing finger 104 and moves this member to the position shown in dotted lines at 131 in FIG. 20. The index pawl stop 445 is provided with a shoulder 485 and as the indexing finger 104 is moved from the position shown in dotted lines at 132 in FIG. 20 to the position shown in dotted lines at 131 in FIG. 20, by engagement with a ten inch record, the indexing finger shaft 402 is moved beyond the shoulder 485 and the index pawl stop 445 is thus permitted to move to the ten inch indexing position shown in FIG. 52 in which position the side of the indexing finger shaft 402 engages the offset edge 490 of the index pawl stop 445 beyond the shoulder 485 thereof. Since the index pawl stop 445 and the index pawl 435 as a unitary linkage in the absence of any force exerted on the camming shoulder 472 of the index pawl stop 445, this unitary linkage being pivotable about the post 440, when the index pawl stop 445 is moved to the ten inch indexing position shown in FIG. 52, the pawl flange 436 is moved to the correct position to engage the ten inch step 713b on the tone arm index bracket 711. Accordingly, as the cycling slide 221 is moved in the direction of the arrow 477 during the last half of the record changing cycle, the flange 713 is moved to the position shown in dotted lines at 480 in FIG. 52 in which position the ratchet step 713b engages the pawl flange 436 so that the tone arm 102 is correctly positioned for engagement of the needle with the lead-in groove of the ten inch record positioned on the turntable 101. As the cycling slide 221 approaches its final position at the end of the record changing cycle, the flange 470 engages the camming shoulder 472 and pivots the index pawl stop 445 out of engagement with the index finger shaft 402 while the index pawl flange 436 remains in engagement with the ten inch ratchet step 713b. Accordingly, at substantially the end of this record changing cycle the tip 425 of the retracting spring 418 engages the index finger shaft 402 and moves the index finger 102 to the fully retracted position shown in full lines in FIG. 20.

When a twelve inch record is released by the spindle 105, it strikes the inclined shoulder 428 of the indexing finger 104 as it drops to the turntable 101 and moves the indexing finger 104 to the twelve inch position shown in dotted lines at 134 in FIG. 20. The index pawl stop 445 is provided with another shoulder 486 and when the indexing finger 104 is moved to the twelve inch indexing position 134 (FIG. 20) the index finger shaft 402 is moved beyond the shoulder 486 and thus permits the offset edge 488 of the index pawl stop 445 to be moved to the twelve inch indexing position shown in FIG. 53. In this twelve inch indexing position of the index pawl 445 the pawl flange 436 is positioned to engage the twelve inch record step 713c on the tone arm index bracket 711. Accordingly, as the cycling slide 221 is moved in the direction of the arrow 477 during the last half of the record changing cycle the ratchet step 713c is moved into engagement with the pawl flange 436, as shown in dotted lines in FIG. 53 of the drawings, and the tone arm 102 is positioned so that the needle will engage the lead-in groove of the twelve inch record positioned on the turntable 101. As the cycling slide 221 completes its movement at the end of the record changing cycle the flange 470 engages the camming shoulder 472 and pivots the index pawl stop 445 away from the index finger shaft 402 so that the retracting spring 418 can move the indexing finger 104 to the retracted position shown in full lines in FIG. 20 at the end of the record changing cycle, as described in detail heretofore.

When the indexing finger 104 is struck by a twelve inch record it may be pivoted outwardly with such force that it will strike the end 419 of the guide slit 408 and rebound past the shoulder 486 before the offset edge 488 of the index pawl stop has been moved into engagement with the index shaft 402. To prevent any bounceback of the index finger shaft 402 past the twelve inch indexing shoulder 486, the index finger catch 460 referred to heretofore is provided. More particularly, it will be noted that when the indexing finger shaft 402 is moved to the ten inch indexing position shown in FIG. 52, the index finger catch 460 is merely moved into alignment with the edge 490 of the pawl stop 445. However, when the indexing finger shaft 402 is moved to the twelve inch indexing position shown in FIG. 53 the index finger catch 460 is pivoted outwardly to the position shown in FIG. 53 as soon as the index finger shaft 402 has been moved beyond the corner of the index finger catch 460, this pivotal movement of the catch 460 being limited however, by engagement of the upturned flange 462 on the catch 460 with the edge 463 (FIG. 23) of the pawl stop 445. Accordingly, any rebounding or bounceback movement of the index finger shaft 402 is blocked by engagement of the index finger shaft 402 with the end 487 of the index finger catch 460 which restrains the index finger shaft 402 at the twelve inch indexing position in which the side of the index finger shaft 402 engages the edge 488 on the index pawl stop 445.

In order to position the index pawl flange 436 for proper engagement with the rest position step 713d on the tone arm index bracket 711 so that the tone arm may be positioned on the ledge 110 of the rest post 111 when either the on, reject-off control arm 125 is actuated to the off position or when the last record shutoff mechanism to be described in more detail hereinafter functions automatically to turn the machine off, there is provided an index pawl stop catch 495 (FIG. 23). One end of the pawl stop catch 495 is pivotally mounted in the side flange 337 of the main mounting bracket 335 by means of a tongue end portion 496 of the pawl stop catch 495 which is positioned in a slot 497 (FIG. 4) in the flange 337. At the other end of the pawl stop catch 495 there is provided a guide slot 498 which loosely receives the edge of the downturned flange 341 of the main mounting bracket 335. The pawl stop catch 495 is provided with a downturned flange 499 on the end adjacent the guide slot 498 and the bottom edge of the flange 499 rests on the end portion 500 of a shutoff control wire 501.

The control wire 501 extends through an elongated opening 502 in the flange 341 of the main mounting bracket 335 and is provided with a U-shaped portions 508 (FIG. 3) at the other end thereof which terminates in the end portion 503 which projects upwardly through a slot 504 in the depressed central portion 142 of the base plate 100 (FIG. 2). The intermediate portion of the control wire 501 is positioned beneath a lug 505 which is struck out of the portion 142 of the base plate 100 and, as best illustrated in FIG. 4, since the opening 502 in the flange 341 is postioned somewhat below the base plate portion 142, the U-shaped portion 508 of the control wire 501 is urged into engagement with the underside of the base plate portion 142 so as to prevent the control wire 501 from twisting. Also, due to the resilience of the control wire 501 the free end portion thereof is urged into engagement with the top edge of the opening 502 in the flange 341. The end portion 503 of the control wire 501, which extends upwardly through the slot 504 in the base plate portion 142, is positioned between a pair of arm extension portions 506 and 507 (FIG. 5) provided on the control lever 306.

It will be recalled that the control lever 306 is pivotally mounted on the upper surface of the base plate portion 142 and is biased to a neutral position by means of the spring 310. When the control lever 306 is actuated to either one of its record changing cycle initiating positions the arm portions 506 and 507 thereof function to shift the shutoff control wire end portion 503 from one end of the slot 504 to the other so that the control wire 501 is shifted longitudinally of the length thereof to control the position of the index pawl stop catch 495 is provided with a downturned lug 510 which, in the rest position of the parts shown in FIGS. 4 and 17, is positioned in alignment with a rest position shoulder 511 provided on the index pawl stop 445.

Assuming that the parts are in the rest position shown in FIGS. 2, 5 and 17, when the on, reject-off control arm 125 is moved to the on, reject position 126 shown in FIG. 7, the arm portion 506 of the control lever 306 engages the end portion 503 of the control wire 501 and moves the control wire 501 from the position shown in FIG. 2 to the other end of the slot 504 and the free end portion of the control wire 501 is thus moved from the off position shown in FIGS. 4 and 19 to the on position shown in FIG. 41. When the operator releases the control arm 125 and the control lever 306 is returned to its neutral position by the spring 310, the control wire 501 remains in the on position shown in FIG. 41 since the arm portion 507 of the control lever 306 does not engage the end 503 when the lever 306 is in its neutral position and also the fact that the control wire 501 is flexed downwardly from the lug 505 so that the U-shaped portion 508 thereof is resiliently urged against the underside of the base plate portion 142. When the control wire 501 is thus moved to the on position shown in FIG. 41, an inclined portion 515 adjacent the end portion 500 of the control wire 501 is moved through the opening 502 in the flange 341 and as this occurs the end portion 500 of the control wire 501 is moved upwardly to the position shown in FIG. 41 due to the fact that the free end of the control wire 501 is resiliently urged into engagement with the top edge of the opening 502. As the inclined portion 515 of the control wire 501 is moved through the opening 502 the end portion 500 of the control wire 501 slides along the bottom edge of the flange 499 of the index pawl stop catch 495 but continues to support this end of the catch 495 and pivots the index pawl stop catch 495 upwardly to the position shown in FIG. 41 in which the lug portion 510 of the index pawl stop catch 495 is positioned above the horizontal plane of movement of the index pawl stop 445. When the index pawl stop catch 495 is thus pivoted to the position shown in FIG. 41 it is prevented from affecting the operation of the pawl stop 445 and the index pawl 435 during the remainder of the record changing cycle and during succeeding record changing cycles. Accordingly, the members 445 and 435 function during these periods to position the index pawl flange 436 for engagement with one of the indexing steps on the index bracket 711 in accordance with the record initiated movement of the indexing finger 104, as described in detail heretofore.

When the operator wishes to initiate an automatic shutoff record changing cycle he actuates the on, reject-off control arm 125 to the off position shown in FIG. 57 and as the control lever 306 is moved to the position shown in FIG. 57 the arm portion 507 of the control lever 306 engages the end 503 of the control wire 501 and shifts it to the other end of the slot 504, i.e., the position shown in FIG. 57. When the control wire 501 is thus shifted to the off position shown in FIG. 19 at the start of the shutoff record changing cycle the end portion 500 thereof is lowered, by engagement of the inclined portion 515 with the top edge of the opening 502, the index pawl stop catch 495 is also lowered with the result that the lug 510 on the index pawl stop catch 495 is positioned adjacent the shoulder 511 on the index pawl stop 445. Accordingly, as the shutoff record changing cycle proceeds and the flange 470 on the cycling slide 221 is moved out of engagement with the camming surface 472 and the index pawl stop 445 is permitted to move. During normal record changing cycles the index pawl stop 445 is urged into engagement with the side of the index finger shaft 402 by the spring 465. However, when the lug 510 engages the shoulder 511 on the index pawl stop 445 the index pawl stop 445 pivots about the lug 510 so that the portion of the index pawl stop 445 which contains the slot 450 is moved outwardly in the direction of the arrow 516 shown in FIG. 17. Since the index pawl 435 is pivotally connected to the slot 450, outward movement of the pawl stop 445 in the direction of the arrow 516 causes the index pawl 435 to pivot about the post 440 so that the index pawl flange 436 is urged into engagement with the stepped edge of the index bracket flange 713. In this connection it will be understood that the index pawl flange 436 may be engaging any one of the indexing steps on the bracket 711 depending upon the size of the record played during the previous playing cycle. However, as the index bracket is rotated about the post 345 during the record changing cycle the index pawl flange 436 rides along the stepped edge of the flange 713 until the rest position step 713d is engaged. When the rest position step 713d is engaged by the index pawl flange 436 the tone arm 102 is restrained over the rest post ledge 110 so that as the tone arm 102 is lowered in the normal manner at the end of the record changing cycle the tone arm is positioned on the ledge 110. The tone arm 102 then remains in this rest position until the control wire 501 is shifted to the on position shown in FIG. 41 in which position the end portion 500 of the control wire 501 raises the index pawl stop catch 495 so that the lug portion 510 thereof clears the shoulder 511 on the index pawl stop 445 and thus permits normal indexing operation of the members 445 and 435 as described in detail heretofore.

*Turntable speed control mechanism*

Considering now in more detail the manner in which the speed of the turntable 101 is controlled in accordance with the present invention, it will be recalled from the general description of the changer that the speed of rotation of the turntable 101 may be controlled either automatically or manually, depending upon the position of the speed control knob 118. More particularly, the speed of the turntable 101 is controlled by raising or lowering the idler arm 166 so that the idler wheel 170 may engage one of the steps of the multi-step turret 156 in accordance with the desired turntable speed.

Figure 16:
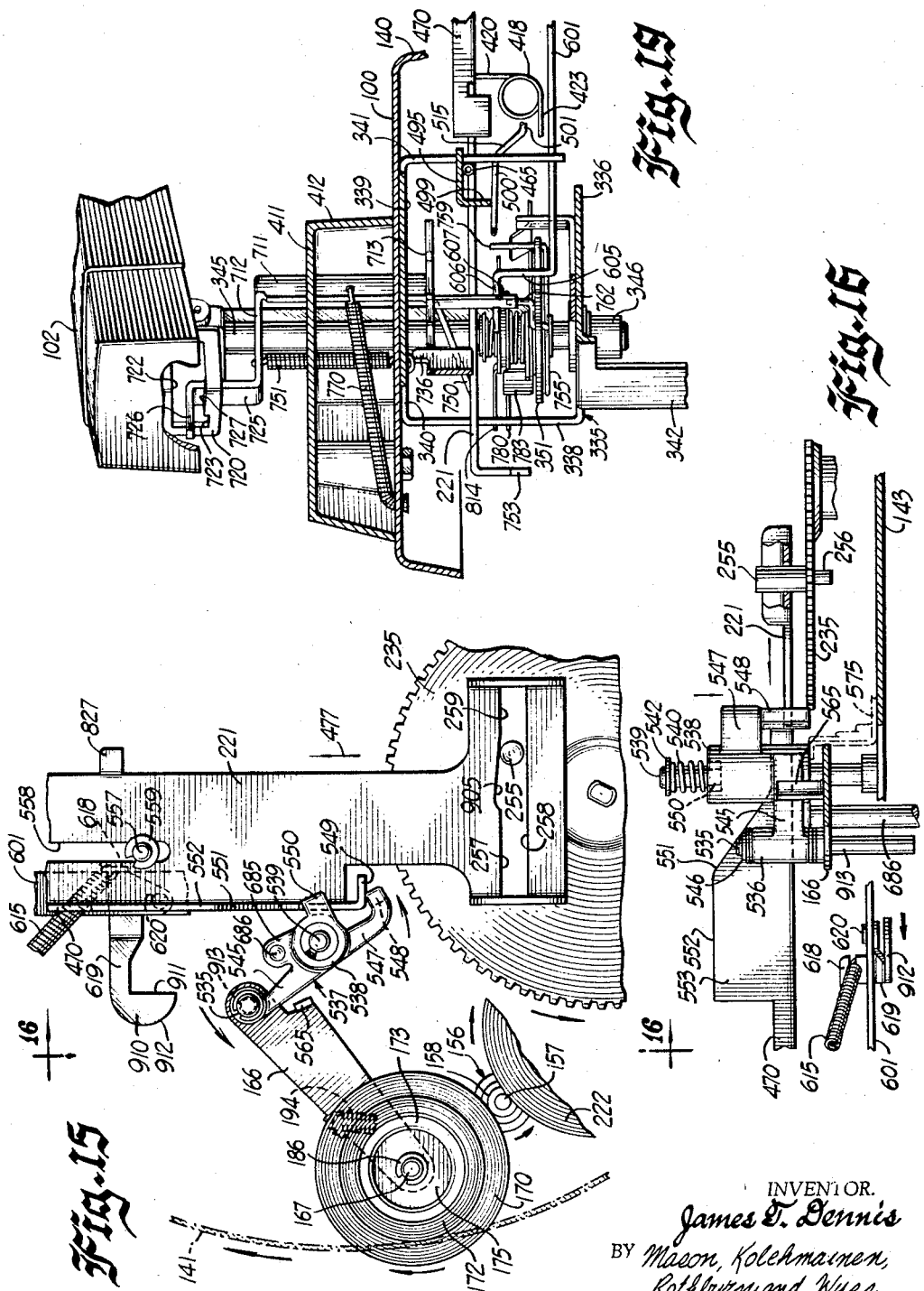
FIG. 16 is a fragmentary sectional view taken along the lines 16—16 of FIG. 15.

In accordance with the present invention the idler arm 166 is controlled so that the idler wheel 172 is first moved out of engagement with the turntable rim 141 so as to permit the turntable to be stopped during the record changing cycle by the braking mechanism to be described in more detail hereinafter. The idler arm 166 is then controlled so that the idler wheel 170 is moved out of engagement with the particular step of the multi-step turret 156 with which it was previously engaged and the idler wheel 170 is moved away from the turret 156 by an amount sufficient to permit the positioning of the idler wheel 170 in engagement with the 78 r.p.m. step 160, i.e., the largest step of the turret 156. More particularly, an idler arm shaft 535 (FIG. 13) is secured to the end of the idler arm 166 opposite the idler hub post 167, the shaft 535 being pivotally mounted in the bearing sleeve portion 536 of a speed control casting indicated generally at 537. The casting 537 is provided with a hub portion 538 which is mounted for pivotal movement on a post 539 which is secured to the motor plate 143. The hub portion 538 of the speed control casting 537 is also arranged to be moved up and down on the post 539 and is urged to a downward position by means of a spring 540 which is seated on the shoulder 541 (FIG. 16) formed in the hub portion 538 by a bore of larger diameter than the post 539, the upper end of the spring 540 being positioned beneath a C-washer 542 which is secured to the top end of the post 539. The bearing sleeve portion 536 of the casting 537 is connected to the hub portion 538 thereof by means of an arm portion 545 and the idler arm shaft 535 is secured in the bearing sleeve portion 536 by means of a C-washer 546. The casting 537 is also provided with an arm portion 547 which extends away from the hub 538 in a direction opposite to the arm 545 and terminates in an offset leg portion 548 which is adapted to engage the end portion 549 of the flange 470 on the cycling slide 221. The hub portion 538 is also provided with a transversely extending lug portion 550 adjacent the top edge thereof, the lug 550 being adapted to engage the inclined edge 551 and upper edge 552 of an extension 553 of the flange 470 on the cycling slide 221.

In order to position the cycling slide 221 for cooperation with the elements of the record changing mechanism controlled thereby, a trough 555 (FIG. 4) is provided in the depressed central portion 142 of the base plate 100 and the cycling slide rests on a transverse rib portion 556 which is formed upwardly from the bottom of the trough 555. A guide pin 557 is provided in the middle of the rib 556 and extends through a slot 558 in the cycling slide 221, a C-washer 559 being provided on the guide pin 557 to retain the guide pin within the slot 558. The rear portion of the cycling slide 221 is also slidably supported in the depending flange portion 341 of the main mounting bracket 345, the notches 560 and 561 (FIG. 18) being provided in the sides of an irregularly shaped opening 562 in the flange 341, the notches 560 and 561 in the flange 341 being adapted to receive and slidably support the edges of the rear portion of the cycling slide 221.

Considering now the operation of the turntable speed control mechanism described thus far, and assuming that a seven inch 45 r.p.m. record is being played in which case the idler wheel 170 is in engagement with the turret step 159 and the idler wheel 172 is in engagement with the turntable rim 141, as the cycling slide 221 is moved in the direction of the arrow 473 the end flange 549 thereof engages the offset arm 548 of the casting 537 and pivots this casting about the post 539 so that the idler wheel 172 is withdrawn from engagement with the turntable rim 141 although the idler wheel 170 remains in engagement with the turret 156, as shown in FIG. 67 of the drawings. As the cycling slide moves further in the direction of the arrow 473 and the casting 537 continues to be pivoted about the post 539 an upstanding lug 565 provided on the idler arm 166 engages the side of the arm portion 545 of the casting 537. When this occurs further pivotal movement of the casting 537 about the post 539 causes the idler wheel 170 to be moved away from the turret step 159 to the position shown in FIG 12 of the drawings in which position the idler wheel 170 is positioned beyond the edge of the largest step 160 of the turret 156 and the idler wheels 170 and 172 are thus held out of engagement with the turntable rim 141 and the turret 156 during a major portion of the record changing cycle.

Figure 14:
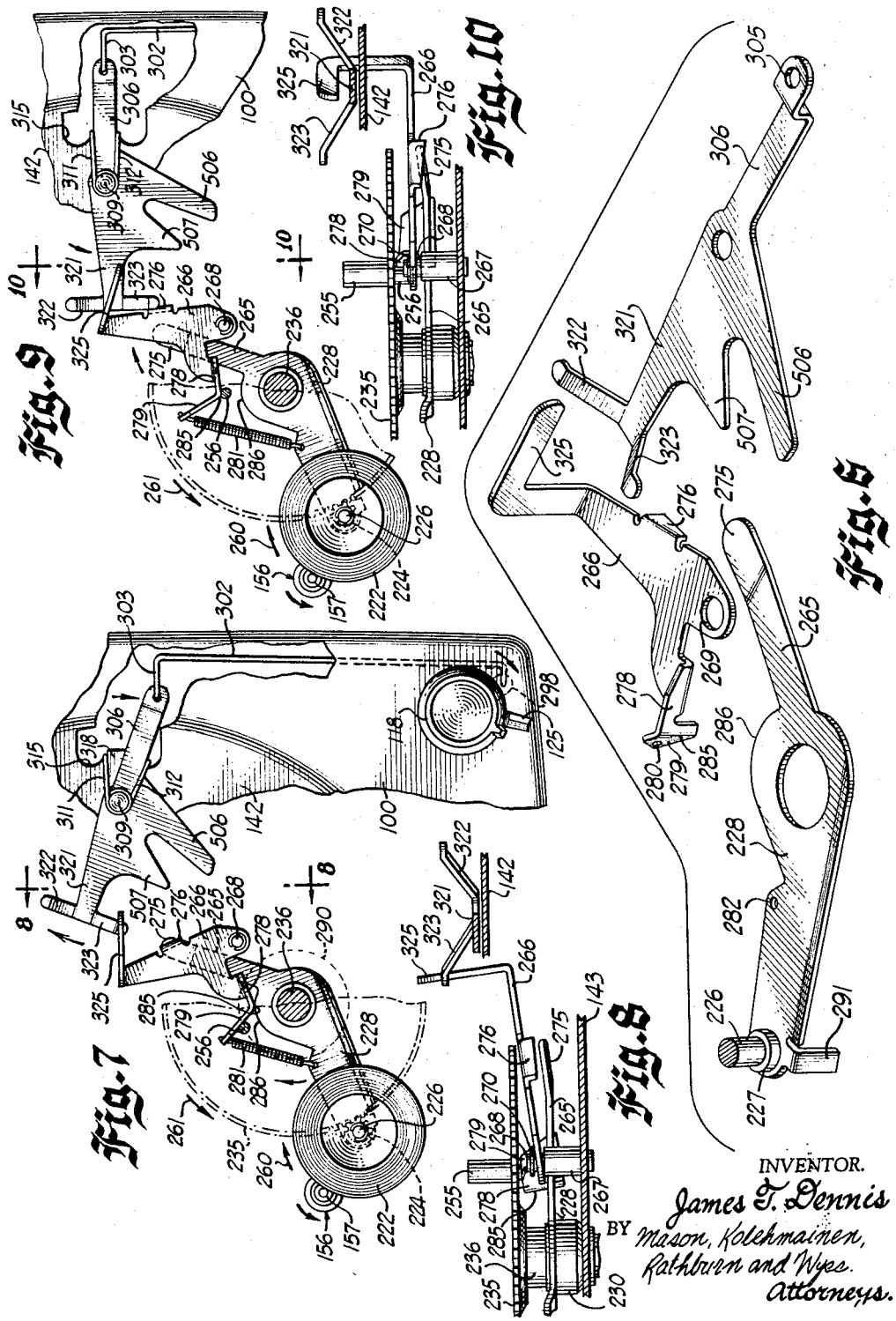
FIG. 14 is a fragmentary sectional view taken along the lines 14—14 of FIG. 12.

As the cycling slide 221 is moved to its mid-position shown in FIG. 12, the lug portion 550 of the casting 537 engages the inclined edge portion 551 of the flange extension 553 so that the casting 537 is raised on the post 539 against the force of the spring 540 to the position shown in FIG. 14 in which position the lug 550 rides along the top edge 552 of the flange extension 553. As the cycling slide 221 is returned to its rest position shown in dotted lines at 566 in FIG. 12 during the last half of the record changing cycle the lug 550 rides back down the inclined shoulder 551 of the flange extension 553 and thus permits the casting 537 to be lowered on the post 539 by virtue of its own weight and assisted by the force of the spring 540. However, by means of a speed stop mechanism now to be described, this downward movement of the casting 537 on the post 539 is terminated at any one of a number of discrete positions corresponding to the steps on the turret 156 so that the idler wheel 170 may be selectively brought into engagement with a desired one of these steps and the turntable 101 brought up to the corresponding speed when the idler wheel 172 is moved into engagement with the turntable rim 141 near the end of the record changing cycle.

The speed stop mechanism referred to above includes a speed stop member 575 (FIG. 26) having an upstanding flange 576 on one end thereof, the flange 576 being provided with a series of horizontally extending step portions 577, 578 and 579 of different heights. The speed stop 575 is pivotally mounted on a stud 580 (FIG. 68) which is itself mounted in an aperture 581 in the motor plate 143, the stud 580 being provided with a head portion 582 which engages the underside of the motor plate 143 and a shoulder portion 584 which engages the aperture 581. A speed stop reset lever 585 is also pivotally mounted on the stud 580 and rests on the upper surface of the speed stop 575, the reset lever 585 being provided with an arm portion 586 (FIG. 26) which is adapted to engage an upturned flange 587 on the speed stop 575. A coil spring 588 is positioned between the reset lever 585 and a C-washer 589 secured to the end of the stud 580. One end portion 590 of the spring 588 engages a notch 591 in the edge of the flange 587 and the other end portion 592 of the spring 588 engages a notch 593 in an upturned flange portion 594 of the reset lever 585. The spring 588 thus acts as a compression member between C-washer 589 and shoulder 584 to hold the mounting stud 580 and the members 575 and 585 in assembled relation while permitting free pivotal movement thereof and the spring 588 also provides a torsional force which is exerted on the flanges 587 and 594 and acts to hold the arm 586 against the flange 587 so that the members 575 and 585 normally act as a unitary linkage.

The mounting stud 580 is so positioned relative to the post 539 and the hub of the casting 537 that any one of the steps 577, 578 or 579 on the flange portion 576 of the speed stop 575 may be positioned to engage the bottom edge of the hub portion 538 so as to provide for selective positioning of the hub 538 on the post 539 in accordance with a desired turntable speed. Specifically, when the hub portion 538 rests on the step 577 the idler arm 166, which, it will be recalled, is pivotally mounted to the bearing sleeve portion 536 of the casting 537, is positioned in the correct horizontal plane so that the idler wheel 170 can be moved into engagement with the 33⅓ r.p.m. step 158 on the multi-step turret 156 at substantially the end of the record changing cycle. In this connection it will be noted that positioning of the hub portion 538 on any one of the step portions of the speed stop 575 does not interfere with pivotal movement of the hub portion 538 about the post 539 so that the speed control casting 537 may be pivoted outwardly as controlled by engagement with the leg portion 548 with the end flange 549 on the cycling slide 221 at substantially the end of the record changing cycle so that the idler wheel 170 is moved into engagement with a particular one of the steps on the turret 156 and the idler wheel 172 is moved into engagement with the turntable rim 141.

When the speed stop 575 is pivoted to an intermediate position shown in FIG. 28 the hub portion 538 is adapted to engage the intermediate step 578 on the speed stop 575 and in this position the idler arm 166 is positioned in the correct horizontal plane for engagement of the idler wheel 170 with the 45 r.p.m. step 159 on the multi-step turret 156. When the speed stop 575 is pivoted still more to the position shown in FIG. 44, the hub portion 538 of the casting 537 may be lowered still further on the post 539 until it rests on the bottom step 579 of the speed stop 575, in which position the idler arm 166 is positioned in the correct horizontal plane for engagement of the idler wheel 170 with the 78 r.p.m. step 160 on the turret 156.

In order to shift the speed stop 575 so that the step portions 577, 578 and 579 thereof may be selectively brought into engagement with the hub 538, several actuating linkages are provided one of which is a control slide 601 which is moved longitudinally of its length in accordance with movement of the tone arm 102 and adjusts the speed stop 575 so that either the 33⅓ r.p.m. step 577 of the speed stop 575 engages the hub 538 or the 45 r.p.m. step 578 engages the hub 538. More specifically, the rear end of the control slide 601 is slidably mounted in the depending flange portion 341 of the main mounting bracket 345, the slide 601 being supported within notches 603 and 604 (FIG. 18) in the flange 341 which are adapted to receive the edges of the slide 601. An upstanding flange 605 (FIG. 19) at the rear of the control slide 601 terminates in a horizontally extending end portion 606 which is provided with a slot 607 (FIG. 23) in one edge thereof which is adapted to receive a downwardly projecting pin 608 which is secured at its upper end to the flange portion 713 of the tone arm index bracket 711. The forward end of the control slide 601 rests on a transverse rib or bearing surface 611 (FIG. 26) which is formed upwardly out of the motor plate 143 and the forward end of the control slide 601 is spring biased into sliding engagement with a lug portion 612 which is struck up from the motor plate 143, the lug 612 engaging the edge portion 613 (FIG. 26) of the control slide 601.

To provide this biasing action a spring 615 (FIG. 15) is provided, one end of which is secured in an opening 616 (FIG. 5) in the depressed central portion 142 of the base plate and the other end of which is positioned in a notch 617 (FIG. 13) which is formed in an upstanding flange portion 618 of a neutral catch member 619 which is pivotally connected to the control slide 601 by means of the rivet 620. The neutral catch 619 is provided for the purpose of holding the idler arm 166 in a neutral position when the tone arm 102 is positioned on the rest post 111, as will be described in more detail hereinafter. However, it will be noted that since the neutral catch 619 is positioned beneath the control slide 601 and the spring 615 extends away from the slide 601 at an angle thereto, as best illustrated in FIG. 5, the spring 615 urges the flange 618 of the neutral catch 619 against the edge of the control slide 601 and thus exerts a sidewise thrust on the control slide 601 which holds it in sliding engagement with the lug 612 so that the control slide 601 remains correctly positioned while it is reciprocated during pivotal movement of the tone arm. The spring 615 also functions to hold the neutral catch 619 in its neutral catch position while permitting the catch to be pivoted with respect to the control slide 601 under certain conditions, as will be described in more detail hereinafter.

A 78 r.p.m. speed change wire 602, which is actuated by outward movement of the tone arm 102 during the record changing cycle when the needle selecting arm 109 is in the 78 r.p.m. or three mil needle position, is also provided to adjust the speed stop 575 so that the 78 r.p.m. step 579 on the speed stop 575 engages the hub 538. More particularly, the 78 r.p.m. speed change wire 602 is provided with a U-shaped end portion 625 (FIG. 30) at the end thereof adjacent the rest post 111 which is interconnected with an end flange 626 provided on the bottom end of the recessed speed control lever 113. The rest post 111 is secured to the base plate 100 by means of the bolt 627 and is provided with a downwardly extending portion 628 of generally U-shaped cross section which extends through the base plate 100 to a point adjacent the connection of the speed change wire 602 to the recessed control lever 113 so as to protect these members from damage during servicing or the like. A transverse pivot pin 630 is provided in the rest post 111 which pivotally supports the recessed speed control lever 113. Accordingly, when the needle selecting arm 109 is in the 78 r.p.m. or three mil needle position shown in FIG. 54 and the tone arm is moved to its extreme outward position as shown in this figure, the upper end of the lever 113 is moved outwardly and the bottom end of the lever 113 is pivoted in the opposite direction so that the speed change wire 602 is moved from the position shown in FIG. 30 to the position shown in FIG. 54. The other end of the speed change wire 602 is provided with an upturned portion 631 (FIG. 26) which extends upwardly through a slot 632 in the motor plate 143, this end of the speed change wire being provided with a horizontal tip portion 633 which rests on the reset lever 585 so as to support this end of the speed change wire 602.

In addition to the above described control linkages, the reset lever 585 is controlled during the first portion of the record changing cycle to readjust or reset the speed stop 575 so that the 33⅓ r.p.m. step 577 is positioned under the hub 538.

In order to actuate the reset lever 585 at the correct point in the record changing cycle so that the speed stop 575 is reset to the 33⅓ r.p.m. position, the flange portion 594 of the reset lever 585 is provided with a horizontally extending offset arm portion 635 (FIG. 26). The speed stop 575 and the reset lever 585 are so arranged that the arm 635 is struck by the portion 256 of the crank pin 255 which extends beneath the main gear 235 as this gear is rotated during the record changing cycle. Thus, if the speed stop 575 is in the 78 r.p.m. position shown in FIG. 44, the speed stop 575 is pivoted about the pivot pin 580 to the 33⅓ r.p.m. position thereof by engagement of the crank pin portion 256 with the arm 635 as shown in FIG. 45. In this connection it will be understood that the arm 635 is not struck by the crank pin portion 256 until the main gear has moved through approximately one-quarter revolution and by this time in the record changing cycle the speed control casting 537 has been lifted upwardly on the post 539 by engagement of the lug portion 550 thereof with the flange extension 553 on the cycling slide 221, so that the hub portion 538 of the casting 537 is positioned above the highest step, i.e., the 33⅓ r.p.m. step 577 on the speed stop 575, as shown in FIG. 14 so as to permit the speed stop 575 to be pivoted and reset in the manner described above to the 33⅓ r.p.m. position. It will also be understood that if the speed stop 575 is already positioned in the 33⅓ r.p.m. position, as for example when a 33⅓ r.p.m. record has been played during the previous playing cycle, the offset arm portion 635 is positioned so that it is not engaged by the crank pin portion 256 since no reset actuation of the speed stop 575 is required.

Considering now the manner in which the above described speed control mechanism and its associated control linkages function to adjust the speed of the turntable in a fully automatic manner, and assuming that the speed stop 575 is in the 33⅓ r.p.m. position at the start of a record changing cycle, as the cycling slide 221 moves in the direction of the arrow 473 during the first half of the record changing cycle, the offset arm position 548 of the speed control casting 537 is engaged by the end flange 549 on the cycling slide 221 so that the speed control casting 537 is pivoted about the post 539, the idler wheel 172 is withdrawn from the turntable rim 141 and the idler wheel 170 is withdrawn from engagement with the 33⅓ r.p.m. step 158 of the turret 156. As the cycling slide 221 continues to move in the direction of the arrow 473 the arm 550 on the casting 537 engages the edge 551 of the flange extension 552 and raises the casting 537 upwardly on the post 539 so that at the middle of the record changing cycle, i.e., the position shown in FIGS. 12 and 14, the casting 537 is positioned above the top step 577 on the speed stop 575. Since it has been assumed that the speed stop 575 was already in the 33⅓ r.p.m. position, the crank pin extension 256 does not engage the offset arm portion 635 of the reset lever 585 so that under these conditions the speed stop 575 does not move during the first half of the record changing cycle.

As described heretofore in connection with the tone arm mounting mechanism, the tone arm bracket 348 is rotated about the pivot post 345 during the first half of the record changing cycle by engagement of the end flange 753 of the cycling slide 221 with the end portion 762 of the safety spring 755. As soon as the index bracket 711 becomes locked in engagement with the tone arm bracket 348, i.e., the tongue portion 726 of the bracket 711 is positioned in the notch 723 of the pivot bracket 363, the index bracket is also rotated and since this bracket carries the pin 608 in the bottom flange 713 thereof which pin is positioned in the notch 607 on the control slide 601, the control slide is moved forwardly in the same direction as the cycling slide 221 to the position shown in dotted lines at 614 in FIG. 5 at the mid-point of the record changing cycle. In this connection it will be understood that the parts are shown in FIG. 5 in the rest position in which position the index bracket 711 is held by engagement of the pawl flange 436 with the rest step 713d so that the control slide 601, which is interconnected therewith is positioned as shown in full lines in FIG. 5 close to its extreme forward position 614.

During the last half of the record changing cycle the tone arm spring 770 functions to rotate the index bracket 711 in the opposite direction so that the tone arm 102 is moved inwardly toward the spindle until the index pawl flange 436 on the index pawl 435 engages one of the indexing steps 713a–713d, inclusive, on the index bracket 711. Assuming that a seven inch 45 r.p.m. record is deposited on the turntable during this record changing cycle, the index pawl flange 436 is positioned in the manner described in detail above in connection with the tone arm indexing mechanism so that the flange 436 engages the 45 r.p.m. (seven inch) step 713a on the index bracket 711.

As the index bracket 711 is rotated by the spring 770 to the seven inch indexing position, the control slide is moved rearwardly, i.e., in the direction of the arrow 636 shown in FIG. 28. The control slide 601 is provided with an elongated notch 637 in one side thereof, the notch 637 having a sloping edge portion 638 (FIG. 28). When the speed stop 575 is in the 33⅓ r.p.m. position in which the step 577 thereof is positioned beneath the hub 538 of the speed control casting 537, the offset end portion 639 of the speed stop 575 is positioned in engagement with the bottom edge 640 of the notch 637 in the control slide 601. However, when the control slide 601 is moved in the direction of the arrow 636 as the tone arm is moved inwardly to the seven inch indexing position, the sloping edge 638 of the control slide 601 engages the offset end 639 of the speed stop 575 and pivots the speed stop 575 about the pivot post 580 to the position shown in FIG. 28 in which position the 45 r.p.m. step 578 on the speed stop 575 is positioned beneath the hub 578 of the control casting 537.

As the cycling slide 221 continues to move in the direction of the arrow 477 during the last portion of the record changing cycle, the arm 550 on the speed control casting 537 rides down the inclined edge 551 so that the speed control casting is lowered on the post 539 until the hub 538 rests on the 45 r.p.m. step 578 of the speed stop 575, as shown in FIGS. 28 and 29 of the drawings. At the same time, the offset arm 548 of the speed control casting 537 engages the end flange 549 on the cycling slide 221 so that the speed control casting 537 is pivoted about the post 539 to the position shown in dotted lines at 641 in FIG. 28, in which position the idler wheel 172 engages the rim 141 of the turntable 101 and the idler wheel 170 engages the 45 r.p.m. step 159 of the turret 156.

Assuming that the above described seven inch 45 r.p.m. record has been played and a new record changing cycle is initiated, as the cycling slide 221 is moved in the direction of the arrow 473 the offset arm portion 548 of the casting 537 engages the end flange 549 on the slide 221 and pivots the casting 537 about the post 539 so that the idler wheel 172 is moved out of engagement with the turntable rim 141 and the idler wheel 170 is moved out of engagement with the 45 r.p.m. step 159 on the turret 156. Since it has been assumed that a seven inch 45 r.p.m. record has just been played, the index bracket 711 is positioned with the seven inch step 713a in engagement with the index pawl flange 436 and is held in this position by the spring 770 during the first portion of the record changing cycle. Accordingly, the control slide 601 also remains in the position shown in FIG. 28 during the first portion of the record changing cycle. However, when the tone arm bracket 348 has been rotated about the post 345 by an amount sufficient to position the tongue portion 726 in the notch 723 of the pivot bracket 353, the index bracket 711 becomes locked to the tone arm bracket 348 and upon further rotation of the tone arm bracket 348 the index bracket 711 is likewise rotated about the post 345 with the result that the control slide, which is interconnected with the index bracket 711 through the pin 608, is moved forwardly in the direction of the arrow 645 (FIG. 28).

As soon as the control slide 601 is moved in the direction of the arrow 645 by an amount sufficient to move the inclined edge 638 thereof ahead of the offset end portion 639 of the speed stop 575, the main gear 235 has been rotated by an amount sufficient to bring the crank pin end portion 256 into engagement with the offset arm 635 on the reset lever 585 so that the speed stop 575 is pivoted about the pivot post 580 to the reset position shown in FIG. 45 in which position the offset end flange 639 of the speed stop 575 is positioned in engagement with the bottom edge 640 on the notch 637 in the control slide 601. In this connection, it is pointed out that the crank pin portion 256 does not engage the offset arm 635 until the arm portion 550 of the casting 537 has engaged the inclined flange edge 551 and raised the casting 537 on the post 539 above the 33⅓ r.p.m. step 577 on the speed stop 575 since otherwise the speed stop 575 could not be reset to its 33⅓ r.p.m. position. As the tone arm bracket 348 continues to be rotated about the post 345 to the extreme outward position of the tone arm 102 the control slide 601 continues to move in the direction of the arrow 645 to its mid-position shown in dotted lines at 614 in FIG. 5.

Assuming that a 78 r.p.m. record of, for example, a twelve inch diameter, is deposited on the turntable 101 by the spindle 105 at substantially the mid-point of this record changing cycle, and that the operator has adjusted the needle selecting arm 109 so that it projects outwardly from the tone arm 102, i.e., the three mill needle position shown in FIG. 54, as the tone arm 102 is moved to its extreme outward position at substantially the midpoint of the record changing cycle, the end of the needle selecting arm 109 engages the recessed speed control lever 113 and actuates it to the 78 r.p.m. speed change position shown in FIG. 54. When the lever 113 is thus rotated about the pivot pin 630 in the rest post 111, the 78 r.p.m. speed change wire 602 is moved in the direction of the arrow 646 in FIG. 30, and as the speed change wire 602 is moved in this direction the upstanding portion 631 thereof, which extends through the slot 632 in the motor plate 143, engages the edge 647 (FIG. 44) of the speed stop 575 and pivots this member about the pivot post 580 to the 78 r.p.m. position shown in FIG. 44. In this connection it will be noted that the upstanding portion 631 of the speed change wire 602 engages the speed stop 575 at a point intermediate the end flange 576 thereof and the pivot stud 580 so that longitudinal movement of the speed change wire 602 produces pivotal movement of the speed stop 575 in a direction opposite to that produced by the reset lever 585 when the speed stop 575 is reset to the 33⅓ r.p.m. position during the first portion of each record changing cycle.

As soon as the tone arm 102 is moved away from the rest post and toward the spindle 105 the recessed speed control lever 113 is released and returns to its normal vertical position shown in FIG. 30 by virtue of its own weight so that the speed change wire 602 is returned to its normal position shown in FIG. 28.

When the speed stop 575 is moved to the 78 r.p.m. position shown in FIG. 44, in which position the step 579 on the speed stop 575 is positioned under the hub 538, the subsequent movement of the control slide 601 as the index bracket 711 is positioned in accordance with the diameter of the released 78 r.p.m. record does not affect the positioning of the speed stop 575 since the end flange 639 thereof does not engage the control slide 601 when the stop 575 is in the 78 r.p.m. position shown in FIG. 44. However, if the operator now desires to play a 33⅓ r.p.m. record, for example, and adjusts the needle selecting arm 109 to the one mil position shown in FIG. 30, the speed stop 575 will be reset to the 33⅓ r.p.m. position during the first part of the next record changing cycle, as described in detail heretofore. Furthermore, since it is assumed that only ten inch or twelve inch 33⅓ r.p.m. records are to be played in intermixed relation with 45 r.p.m. records, the control slide 601 is not moved rearwardly in the direction of the arrow 636 (FIG. 28) during the indexing of either a ten inch or a twelve inch record by an amount sufficient to cause the inclined edge 638 of the control slide 601 to engage the end flange 639 on the speed stop 575. Accordingly, the speed stop 575 remains in the 33⅓ r.p.m. position to which it is reset in the manner described heretofore when ten inch or twelve inch microgroove records are played so that the turntable 101 is rotated at 33⅓ r.p.m. during the corresponding playing cycles.

*Manual speed changing mechanism*

Considering now in more detail the manual speed changing mechanism of the present invention, it will be recalled from the general description of the changer that this mechanism cooperates completely with the above described automatic speed changing mechanism and permits manual selection of a particular turntable speed by rotation of the speed control knob 118 to one of the manual speed selecting positions 120 to 123, inclusive, thereof. Generally considered, the manual speed changing mechanism includes facilities for moving the speed stop 575 to the 78 r.p.m. position in each of the four manual speed selecting positions of the speed control knob 118 and further includes facilities independent of the speed stop 575 for controlling the position of the speed control casting 537 on the post 539.

Figure 3:
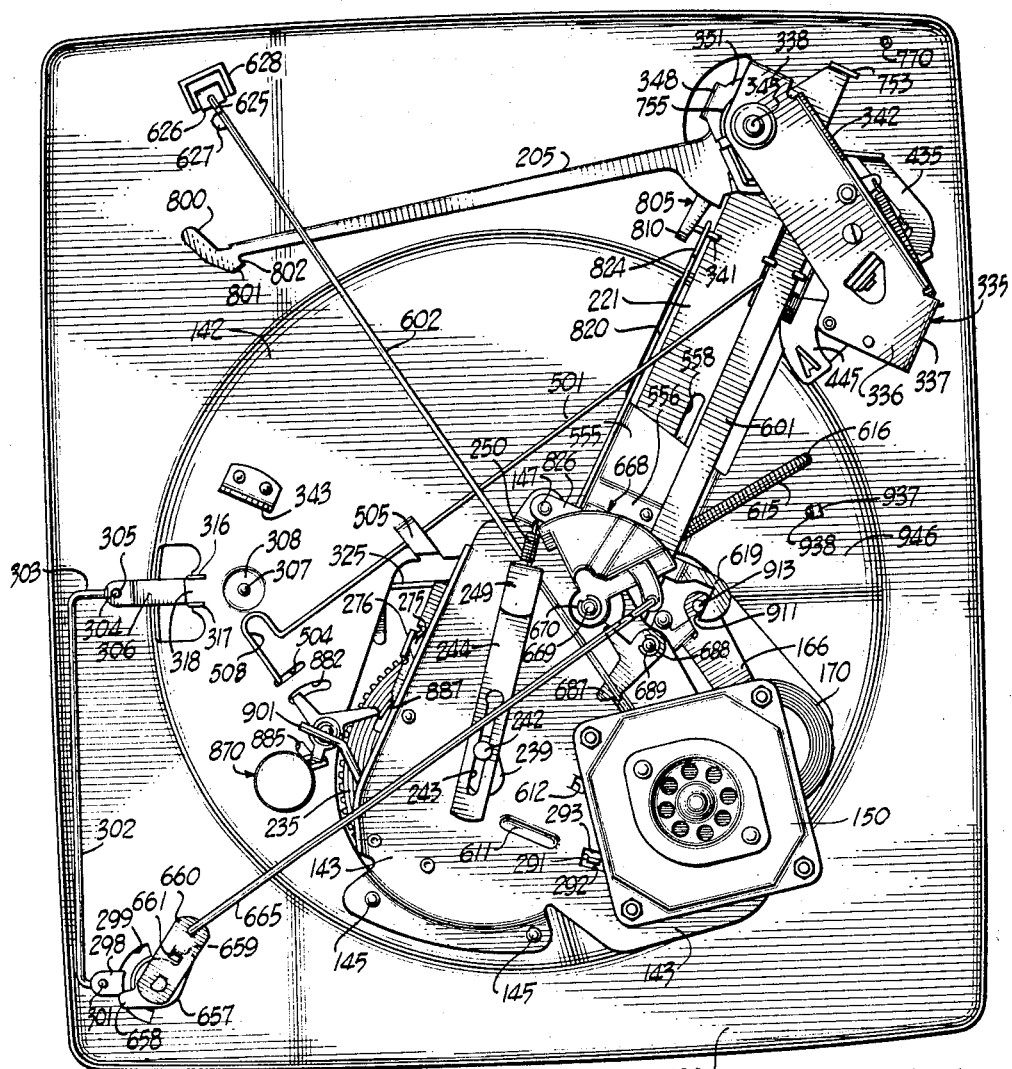
FIG. 3 is a bottom plan view of the record changer of FIG. 1 showing the mechanism thereof in rest position.

More particularly, the speed control knob 118 is connected by means of a set screw or the like to the upper end of a speed knob shaft 655 (FIG. 66) which is journalled in the speed knob bushing 297 and is held in place by means of a C-washer 656, which washer rests on the upper surface of the hub portion 295 of the on, reject-off control lever 125. A speed knob stop member 657 is secured to the bottom end of the speed knob bushing 297 by a suitable staking operation or the like, the knob stop 657 being provided with a pair of spaced apart arm portions 658 and 659 (FIG. 3). A lever 660 is secured to the bottom end of the shaft 655 by any suitable means so that the lever 660 may be rotated with respect to the knob stop 657, the lever 660 being provided with an upstanding lug portion 661 (FIG. 3) which is adapted to engage one of the arms 658 or 659 of the knob stop 657 so as to provide limit stops which limit rotation of the speed knob 118.

One end of a manual shift control rod 665 is rotatably mounted in the end of the lever 660, the other end of the control rod 665 being provided with a U-shaped end portion 666 (FIG. 57) which is pivotally connected to an offset arm portion 667 of a manual shift casting indicated generally at 668. The manual shift casting 668 is rotatably mounted on a post 669, and is retained in place by means of the C-washer 670 (FIG. 4) the post 669 being secured to and extending downwardly from a dimpled portion 671 of the motor plate 143. The manual shift casting 668 comprises a hub portion 675 (FIG. 57) at the top end of which there is provided an outwardly extending flange portion 676, the outer edge of which forms an arcuate camming surface 677. The casting 668 is further provided with a transversely extending generally arcuate shaped skirt portion 678, this skirt portion being provided with a series of inclined camming surfaces 679, 680 and 681 between which are positioned horizontal step portions 682, 683 and 684 of different heights.

The inclined camming surfaces 679, 680 and 681 and the horizontal step portions 682, 683 and 684 are provided for the purpose of positioning the speed control casting 537 on the post 539 independently of the speed stop 575. To this end, the speed control casting 537 is provided with an offset arm portion 685 (FIG. 13) adjacent the bottom end of the hub 538 thereof, and a downwardly extending lift post 686 is positioned in the end of the arm 685 and extends downwardly to a position in which it may be engaged by the inclined camming surfaces and horizontal step portions of the casting 668.

In order to disable the speed stop 575 when the speed control knob 118 is in any one of the speed selecting positions 120 to 123, inclusive, there is provided a manual change lever 687 (FIG. 33) which is pivotally mounted on the end portion 688 (FIG. 3) of the post 539 which extends below the motor plate 143, the lever 687 being retained in position on the end 688 of the post 539 by means of a C-washer 689. The lever 687 is positioned between the motor plate 143 and the 78 r.p.m. speed change wire 602 and the end of the lever 687 is adapted to engage the upstanding portion 631 of the speed change wire 602 as the lever 687 is pivoted about the end portion 688 of the post 539. In order to actuate the lever 687 it is provided with an offset arm portion 690, the end portion of which is positioned adjacent the edge 691 of the camming flange 676 on the casting 668.

When the speed control knob 118 is in the automatic-intermix position 119 the manual shift casting 668 and manual change lever 687 are in the relative position shown in FIG. 33. However, when the speed control knob 118 is moved to the 78 r.p.m. position 120, the control rod 665 is moved in the direction of the arrow 692 shown in FIG. 33 so that the manual shift casting 668 is rotated in the direction of the arrow 693 in FIG. 33 about the post 669 to its 78 r.p.m. position shown in FIG. 55. As the manual shift casting 668 is thus rotated to the 78 r.p.m. position shown in FIG. 55 the flange 676 of the casting 668 engages the offset arm portion 690 of the manual change lever 687 and pivots this lever about the end portion 668 of the post 539 to the position shown in FIG. 55. As the lever 687 is thus pivoted about the post 688, the end portion thereof engages the upstanding portion 631 of the 78 r.p.m. speed change wire 602 and moves the speed change wire 602 to the 78 r.p.m. position shown in FIG. 55 and since the portion 631 of the speed change wire 602 which extends above the motor plate 143 is adapted to engage the edge 647 of the speed stop 575, this pivotal movement of the lever 687 causes the speed stop 575 to be moved to the 78 r.p.m. position, as shown in FIG. 46, in which position the step 579 is positioned beneath the hub 538 of the casting 537.

When the speed control knob 118 is moved to the other manual speed selecting positions 121, 122 or 123, the lever 687 continues to hold the speed stop 575 in the 78 r.p.m. position thereof as the end of the offset arm 690 engages the camming surface 677 on the casting 668. When the lever 687 thus holds the speed stop 575 in the 78 r.p.m. position, the offset arm 635 of the reset lever 585 projects into the path of the crank pin portion 256 and during record changing cycles the crank pin portion 256 would engage the offset arm 635 and attempt to reset the speed stop 575 to the 33⅓ r.p.m. position as is done during automatic-intermix operation. However, it will be recalled that the reset lever 585 is merely biased into engagement with the flange 587 on the speed stop 575 and when the speed stop 575 is restrained in the 78 r.p.m. position by the lever 687, the reset lever 585 is pivoted away from the flange 587 as the crank pin portion engages the offset arm 635, as shown in FIG. 46. Accordingly, the speed stop 575 may be held in the 78 r.p.m. position during manual speed selection operation of the changer without damage thereto, due to the fact that the reset lever 585 is biased in engagement with the speed stop 575 only by the spring 588, the force of which may be overcome by the crank pin portion 256 and the reset lever 585 pivoted away from the speed stop 575 during a record changing cycle, as shown in FIG. 46.

Considering now the manner in which the lift post 686 is engaged by the inclined camming surfaces and the horizontal steps of the casting 668, it will be noted that when the speed control knob 118 is in the automatic-intermix position 119, the lift post 686 is spaced a substantial distance from the casting 668, as shown in FIG. 33 and as the speed control casting 537 is pivoted about the post 539 during the record changing cycle the lift post 686 is moved to the position indicated in dotted lines at 693 in FIG. 33. Accordingly, the casting 668 in no way interferes with the pivotal movement of the casting 537 about the post 539 or the raising and lowering of this casting on the post 539 during an automatic record changing cycle.

When the speed control knob is moved to the 78 r.p.m. position 120, the manual shift casting 668 is moved to the position shown in FIG. 55 and at the same time the speed stop 575 is actuated to the 78 r.p.m. position shown in FIG. 46, in which position the 78 r.p.m. step 579 thereof is positioned beneath the hub 538 of the casting 537. Accordingly, for 78 r.p.m. manual operation the 78 r.p.m. step 579 functions to control the downward movement of the speed control casting 537 on the post 539 and to position the idler arm 166 in the proper horizontal plane for rotation of the turntable 101 at 78 r.p.m. In this connection it will be noted that in the manual 78 r.p.m. position shown in FIG. 55 the manual shift casting 668 has been moved closer to the lift post 686 but again does not interfere with the raising and lowering of the speed control casting on the post 539 or the pivotal movement thereof about this post during the record changing cycle, the path described by the idler arm 166 and casting 537 during pivotal movement of the speed control casting 537 during the record changing cycle when the speed control knob is in the 78 r.p.m. manual position 120 being indicated in dotted lines at 694 in FIG. 55.

When the speed control knob 118 is moved to the 45 r.p.m. speed selecting position 121, the manual shift casting 668 is pivoted further in the direction of the arrow 693 to the position shown in FIG. 56 and as the casting 668 is rotated to this position the lift post 686 is engaged by the camming surface 679 so that the speed control casting is lifted upwardly on the post 539 until the lift post 686 engages the horizontal step portion 682 of the casting 668. Accordingly, during record changing cycles when the speed control knob 118 is in the 45 r.p.m. manual speed selecting position 121, the speed control casting is lifted upwardly on the post 539 during the cycle by engagement of the arm portion 550 of the casting 537 with the inclined flange 551 on the cycling slide 221. Also, as the speed control casting 537 is pivoted about the post 539 during the first part of the record changing cycle by engagement of the offset arm 548 with the end flange 549 on the cycling slide 221, the lift post 686 rides on the horizontal step 682 and is moved to the position indicated in dotted lines at 695 in FIG. 56. During the last half of the record changing cycle, the speed control casting is lowered on the post 539 as the arm 550 thereof rides down the inclined flange 551 until the lift post 686 strikes the horizontal step portion 682 of the casting 668, at which time further downward movement of the speed control casting 537 on the post 539 is terminated and the casting 539 is positioned in the correct horizontal plane so that the idler wheel 170 can engage the 45 r.p.m. step 159 and the idler wheel 172 engage the turntable 141 at the end of the record changing cycle. It will be noted that in the 45 r.p.m. manual speed selecting position 121 the offset arm 690 of the lever 687 is engaged by the camming surface 677 on the casting 668 so that the speed stop 575 continues to be held in the 78 r.p.m. position although the speed control casting is positioned in alignment with the 45 r.p.m. step thereof by engagement of the lift post 686 with the horizontal step 682 on the casting 668.

In a similar manner, when the speed control knob 118 is moved to the 33⅓ r.p.m. manual speed selecting position 122 the manual shift casting 668 is rotated further in the direction of the arrow 693 and the lift post 686 is engaged by the camming surface 680 so that the speed control casting 537 is moved upwardly on the post 539 until the lift post 686 engages the horizontal step portion 683. During a record changing cycle when the knob 118 is in the 33⅓ r.p.m. manual speed position the speed control casting 537 is again lifted upwardly on the post 539 by engagement of the arm 550 with the inclined flange 551 and is pivoted about the post 539 as the idler wheels 170 and 172 are moved out of engagement with their respective driving and driven members. However, when the speed control casting 537 is lowered downwardly on the post 539 the lift post 686 engages the horizontal step 683 and terminates downward movement of the casting 537 in the correct position so that the idler wheel 170 can engage the 33⅓ r.p.m. step 158 on the multistep turret 156.

When the speed control knob 118 is moved to the 16⅔ r.p.m. manual speed selecting position 123 the casting 668 is moved further in the direction of the arrow 693 and the lift post 686 engages the camming surface 681 and lifts the speed control casting 537 upwardly on the post 539 until the lift post 686 engages the horizontal step portion 684 in which position the speed control casting 537 is positioned so that the idler wheel 170 can engage the 16⅔ r.p.m. step 157 of the turret 156. When the speed control casting 537 is held in the 16⅔ r.p.m. position by engagement of the lift post 686 with the horizontal step 684, the arm portion 550 of the casting 537 is positioned above the top edge 552 of the flange 553 on the cycling slide 221 so that the speed control casting is not moved upwardly during the record changing cycle. However, the offset arm 548 engages the end flange 549 of the cycling slide 221 during the record changing cycle so that the speed control casting 537 is pivoted about the post 539 as described heretofore.

In order to provide a detent action for the speed control knob 118 so that it can be moved to any one of the positions 119 to 123, inclusive, thereof and a detent action will be provided in each one of these positions, a detent pin 698 (FIG. 57) having a spherical end portion is mounted in the top of the manual shift casting 668 and is spring biased upwardly by means of a coil spring positioned therebeneath so that the pin 698 is biased into engagement with one of the detent openings 699 provided in the motor plate 143. When the pin 698 is positioned in any one of the openings 699, the speed control knob 118 is held in one of the indicated speed selecting positions 119 to 123, inclusive. However, when the speed control knob is actuated by the operator the pin 698 is compressed and rides along the undersurface of the motor plate 143 until it engages the next detent opening 699 so that the operator is informed by this detent action of the discrete speed selecting positions of the knob 118.

*Last record shutoff mechanism*

Considering now in detail the last record shutoff mechanism of the present invention, it will be recalled from the general description of the changer that when a stack of records are to be played they are placed on the centering spindle 105 and the balance arm 103 is positioned on top of this record stack to hold them substantially horizontal. When the last record has been deposited on the turntable 101 the balance arm 103 drops downwardly and this motion of the balance arm 103 is employed to set the last record shutoff mechanism of the changer so that after the last record is played a shutoff record changing cycle is initiated at the end of which the tone arm is positioned on the ledge 110 of the rest post 111, the motor is deenergized and the idler wheels 170 and 172 are restrained in a neutral position out of engagement with the turret 156 and the turntable rim 141. The balance arm support 115 is provided with a vertically extending aperture 852 therein which is adapted to receive the shaft 851, the bottom end of the shaft 851 extending through a bearing opening 853 (FIG. 21) in the bottom flange 336 of the main mounting bracket 335. The balance arm support 115 is also provided with a vertically extending channel 854 (FIG. 65) which communicates with the vertically extending opening 852 and is adapted to receive a transverse locating pin 855 which is secured to and extends transversely from the side of the balance arm shaft 851. A top opening recess 856 is provided in the upper end of the balance arm support 115, the recess 856 being provided with a radially extending groove or depression 857 which is adapted to receive the pin 855.

When the balance arm 103 is positioned over the rest post 111, as shown in FIG. 2, the pin 885 on the balance arm shaft 851 is resting in the groove 857 and the balance arm 103 is positioned well above the record supporting shelf 105a of the spindle 105. However, when the balance arm 103 is moved inwardly toward the spindle 105 the pin 855 rides out of the groove 857 and along the bottom of the recess 856 until the pin 855 engages the channel 854, in which position the balance arm 103 is positioned adjacent the spindle 105 and in correct relationship thereto to support a stack of records which are positioned on the shelf 105a of the spindle 105. When the pin 855 engages the channel 854 the shaft 851 is permitted to move downwardly within the opening 852 so that the balance arm 103 may be lowered into engagement with the upper record of the stack supported on the spindle shelf 105a. The balance arm shaft 851 is also provided with a collar 860 (FIG. 18) which is secured within a groove provided in the shaft 851 so that the collar 860 moves up and down with the shaft 851.

Figure 18:
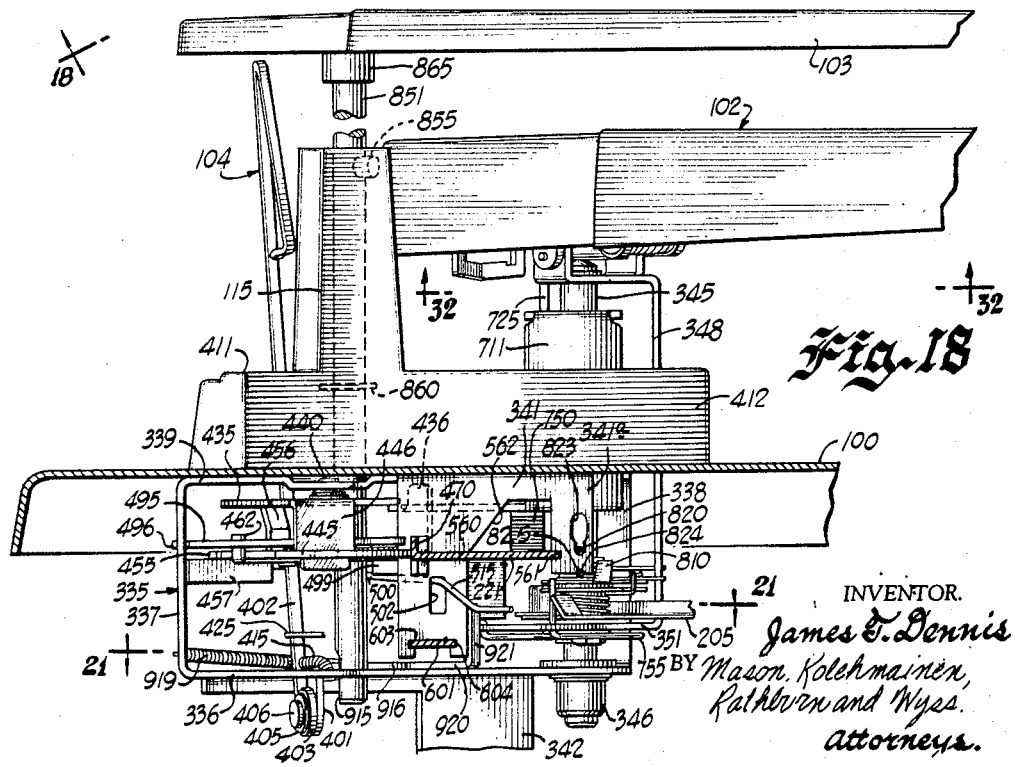
FIG. 18 is a fragmentary sectional view taken along the lines 18—18 of FIG. 17.

As discussed heretofore in connection with the tone arm indexing mechanism, the end portion 500 of the control wire 501 supports one end of the pivotally mounted index pawl stop catch 495 since the downturned flange 499 on the stop catch 495 rests on the end portion 500. When the record changer is in the rest position the end portion 500 of the control wire 501 is in engagement with the top edge of the slot 502 in the flange 341 of the main mounting bracket 335 and the index pawl stop catch 495 is positioned in its lowermost position in which the flange 510 thereof is positioned to engage the shoulder 511 on the index pawl stop 445, as shown in FIGS. 17 and 18. However, when the on, reject-off control lever 125 is actuated to the on, reject position 126, the end portion 500 of the control wire 501 is moved to the position shown in FIG. 41 so that the index pawl stop catch 495 is tilted upwardly (FIG. 41) by an amount sufficient to move the flange 510 thereof above the shoulder portion 511 of the index pawl stop 445. Accordingly, during the succeeding record changing cycles the index pawl stop catch 495 is held out of engagement with the index pawl stop 445 and the tone arm indexing mechanism functions in the manner described in detail heretofore to index the tone arm 102 in accordance with the diameter of the record released to the turntable 101. However, when the last record is released by the spindle 105 to the turntable 101 the balance arm 103 moves downwardly past the shelf 105a of the spindle 105 since the record on which it was resting has been released to the turntable. When the balance arm 103 is thus moved downwardly, the balance arm shaft 851 is also moved downwardly until the bushing 865 provided on the upper end of the balance arm shaft 851 rests upon the upper surface of the balance arm support 115. As the balance arm shaft 851 is thus moved downwardly within the balance arm support 115 the collar 860 is moved downwardly by an amount sufficient to engage the end portion 500 of the control wire 501 and push the end portion 500 downwardly to the position shown in FIG. 42. When the end portion 500 of the control wire 501 is thus moved downwardly by engagement of the collar 860 therewith, the index pawl stop catch 495 is lowered but since the balance arm 103 drops as soon as the record is released at substantially the mid-point of the record changing cycle, and at this point in the cycle the index pawl stop 445 is urged into engagement with the side of the index finger shaft 402 by the spring 465, the depending flange portion 510 on the index pawl stop catch 495 merely rests on the upper surface of the index pawl stop 445. However, when the record changing cycle is completed and the flange 470 on the cycling slide 221 engages the camming surface 472 of the index pawl stop 445 and pivots the index pawl stop 445 outwardly to the position shown in FIG. 17, the shoulder 511 of the index pawl stop 445 is moved outwardly beyond the flange 510 of the index pawl stop catch 495, thus permitting the index pawl stop catch 495 to drop downwardly to the shut-off position shown in FIG. 42. After the last record has been played a shutoff record changing cycle is initiated and, as described in detail heretofore in connection with the tone arm indexing mechanism, the index pawl flange 436 is positioned to engage the rest position step 713d on the index bracket 711 so that the tone arm is restrained in a position over the rest post 111 and as the tone arm is lowered at the end of the record changing cycle it is positioned on the ledge 110 of the rest post 111.

When the tone arm is thus positioned on the rest post 111 the control slide 601, which is interconnected with the index bracket 711 by means of the depending interconnecting pin 608, is held in the position shown in FIGS. 5 and 31 and remains in this position for the rest of the shutoff record changing cycle. This positioning of the control slide 601 is correlated with rotation of the main gear 235 during the remainder of the shutoff record changing cycle so that the turntable driving motor 150 is deenergized in a manner now to be described.

Considering first the energization of the driving motor 150, an on-off switch 870 of the toggle type is secured to the underside of the depressed central portion 142 of the main base plate 100, the switch 870 being provided with a bifurcated switch arm 871 which extends beyond the housing of the toggle switch 870. The switch 870 is connected to interrupt the supply of current to the driving motor 150 when the switch arm 871 is in the position shown in FIG. 5. In order to actuate the switch arm 871, there is provided a switch lever 875 which is connected to the bottom end of a post 876. The post 876 is slidably and rotatably mounted in a bearing sleeve 877 which is secured to the depressed central portion 142 of the main base plate 100 and extends downwardly therefrom as shown in FIG. 31. The switch lever 875 is provided with an arm portion 880 which terminates in an upstanding flange portion 881 which extends upwardly through a curved slot 882 (FIG. 2) provided in the depressed portion 142 of the main base plate 100. The switch lever 875 is also provided with an arm portion 883 which terminates in an upstanding end portion 884 which is positioned between the bifurcated arms of the switch arm 871 and extends upwardly through a curved slot 885 (FIG. 2) in the depressed central portion 142 of the main base plate 100.

In order to energize the record changer, the control arm 125 is moved to the on, reject position 126 which causes the control lever 306 to be moved to the position shown in FIG. 7. As the control lever 306 is moved to the position shown in FIG. 7 the extension arm 506 thereof engages the upstanding end portion 881 of the switch lever 875 and rotates this lever about the axis of the bearing sleeve 877 and as the switch lever 875 is thus rotated, the upstanding end portion 884 thereof engages the switch arm 871 and actuates the toggle switch 870 so that this switch is turned on and power is supplied to the turntable driving motor 150, as shown in FIG. 63. The upstanding end portion 881 of the switch lever 875 is restrained in its movement by the end of the slot 882 so that the end portion 884 of the switch lever 875 is capable of turning off the toggle switch 870 when the switch lever 875 is rotated in the opposite direction, as best illustrated in FIG. 63.

In order to rotate the switch lever 875 in the opposite direction, this lever is provided with an arm portion 886 (FIG. 5). The switch lever 875 is also arranged to be moved bodily up and down within the sleeve 877 so that the arm 886 of the switch lever 875 may either be raised upwardly to the position shown in FIG. 31, in which position the arm 886 is positioned in the path of movement of a downturned flange 887 on the main cycling gear 235, or the switch lever 875 may be positioned in a lower position shown in FIG. 64, in which position the arm 886 is positioned below the flange 887 so that this flange does not engage the arm 886 as the main gear 235 is rotated. Furthermore, the raising and lowering of the switch lever 875 is coordinated with the position of the control slide 601 so that the switch lever 875 is only held in the upper position shown in FIG. 31 when the control slide 601 is held in its rest position (FIG. 5) during that portion of the record changing cycle in which the flange 887 passes by the arm 886. More particularly, there is provided a shutoff rod 890 which is loosely mounted on the motor plate 143 by means of a hinge plate 891 which is secured to the motor plate 143 by means of the rivets 892. The hinge plate 891 is provided with a pair of hinge members 893 and 894 which loosely retain the shutoff rod 890 on the motor plate 143. The shutoff rod 890 is provided with a right angle portion 896 adjacent the hinge 893 and terminates in an end portion 897 which rests on the upper surface of the control slide 601. An end flange 895 on the hinge plate 891 functions to retain the shutoff rod 890 under the hinge members 893 and 894 while permitting this rod to be rotated about the axis of the central portion thereof. The other end 901 of the shutoff rod 890 is offset from the pivoted portion thereof and is adapted to engage the underside of the switch lever 875, as shown in FIGS. 31 and 64. The control slide 601 is provided with a raised camming shoulder or surface 902 which is formed upwardly out of control slide 601 along one edge thereof and is provided with inclined end portions to facilitate lifting of the end 897 of the shutoff rod 890 onto the raised surface 902.

At the same time that the switch 870 is turned on by actuation of the control lever 306 to the position shown in FIG. 7, a record changing cycle is initiated in the manner described in detail heretofore in connection with the cycling slide driving mechanism so that the drive wheel 222 is moved into engagement with the 16⅔ r.p.m. step 157 of the multi-step turret 156 and the main gear 235 starts to rotate. During this record changing cycle the tone arm is lifted upwardly off of the ledge 110 of the rest post 111 and at substantially the mid-point of the record changing cycle the index bracket 711 is locked into engagement with the tone arm bracket 348 so that the control slide 601 is now moved in accordace with movement of the tone arm 102.

As the tone arm is moved inwardly during the last half of the record changing cycle, the control slide 601 is moved in the direction of the arrow 636 (FIG. 28) and as the control slide moves in this direction the end 897 of the shutoff rod 890 moves off of the raised shoulder 902 and rests on the upper surface of the control slide 601. When this occurs the end portion 901 of the shutoff rod 890 is lowered to the position shown in FIG. 64 and the switch lever 875, which rests on the end portion 901 is also lowered by its own weight to the position shown in FIG. 64. When the switch lever 875 is thus lowered to the position shown in FIG. 64 the arm portion 886 thereof is moved below the bottom edge of the downturned flange 887 on the main gear 235. Accordingly, at substantially the end of the record changing cycle the flange 887 passes over the arm 886 and does not engage the same so that the switch lever 875 is not actuated to the off position but instead the motor 150 remains energized and successive playing cycles and record changing cycles may be initiated by the automatic tripping mechanism described in detail heretofore. However, after the last record has been played the shutoff record changing cycle described heretofore is initiated and it will be recalled that during this record changing cycle the tone arm 102 is restrained over the ledge 110 of the rest post 111 and the control slide 601 remains in the rest position shown in FIG. 5, in which position the end 897 of the shutoff rod 890 is positioned on the raised shoulder 902 of the control slide 601 so that the switch lever 875 is lifted upwardly, guided by the sleeve 877, to the position shown in FIG. 31. Since the tone arm 102 does not move inwardly during the remainder of the shutoff record changing cycle, the control slide 601 remains in the rest position shown in FIG. 5 and the switch lever 875 remains in its lifted position shown in FIG. 31. Accordingly, at substantially the end of the shutoff record changing cycle the downturned flange 887 on the main gear 235 strikes the arm 886 of the switch lever 875 which is now positioned in the path of the flange 887 and pivots the switch lever 875 about the sleeve 877 so that the upstanding arm portion 884 thereof engages the switch arm 871 and actuates the switch 870 to the off position and power is removed from the driving motor 150. Since the flange 887 on the gear 235 does not engage the arm 886 of the switch lever 875 until substantially the end of the record changing cycle and there is some inertia in the driving motor 150, the main gear 235 continues to rotate a short time after the motor 150 is deenergized until the crank pin 255 is moved into engagement with a notch 905 provided in the edge portion 259 of the cycling slide 221. The notch 905 also serves to prevent the main gear 235 from further rotation so that it is indexed properly for the start of the next record changing cycle. In this connection it will be noted that the end portion 884 of the switch lever 875 is of sufficient length that it extends upwardly through the slot 885 and can engage the switch arm 871 even though the switch lever 875 is in its lower position shown in FIG. 64.

In order to hold the idler wheel 172 out of engagement with the turntable rim 141 and the idler wheel 170 out of engagement with the multi-step turret 156 during periods when the machine is turned off so that flat portions will not be produced on these idler wheels during prolonged periods of idleness of the changer, there is provided a neutral catch 619 which, it will be recalled, is pivotally connected to the control slide 601 by means of the rivet 620. The neutral catch 619 is provided with an offset end flange 910 (FIG. 13), this flange being provided with an edge 911, which is parallel to the line of movement of the control slide 601, and a curved outer edge 912. The idler arm shaft 535, which, it will be recalled, is pivotally mounted in the bearing sleeve portion 536 of the speed control casting 537, is provided with a downwardly extending portion 913 (FIG. 13) which extends downwardly below the plane of the neutral catch 619 as shown in FIG. 14.

During the record changing cycle the speed control casting 537 is pivoted about the post 539 by engagement of the offset arm 548 thereof with the end flange 549 on the cycling slide 241, and as the tone arm 102 moves outwardly during the first portion of the record changing cycle the control slide 601 also moves forwardly after the tongue 726 engages the notch 723 so that at the midpoint of the record changing cycle the control slide 601 is moved forwardly by an amount sufficient to position the edge 911 of the neutral catch flange 910 alongside the downwardly extending pin portion 931 of the idler arm shaft 535, as shown in FIG. 12. During normal record changing cycles the control slide 601 is then moved rearwardly during the last half of the record changing cycle as the tone arm 102 is moved inwardly to either the twelve inch, ten inch or seven inch indexing position and under these conditions the neutral catch 619 is also moved rearwardly so that the edge 911 thereof is moved out of the path of the pin 913 as the speed control casting 537 is pivoted at the end of the record changing cycle to bring the idler wheel 172 into engagement with the rim 141 and the wheel 170 into engagement with one of the steps in the turret 156. However, when a shutoff record changing cycle is initiated in the manner described in detail heretofore, the control slide 601 is held in the rest position shown in FIG. 5 and as the speed control casting 537 is pivoted about the post 539 at the end of the shutoff record changing cycle the pin 913 engages the edge 911 of the neutral catch 619 and holds the speed control casting 537 and idler arm 166 in the position shown in FIG. 5, in which position the idler wheels 170 and 172 are held out of engagement with their respective driving and driven members.

It will be noted that the neutral catch 619 is pivotally connected to the control slide 601 by means of the rivet 620. The spring 615 normally functions to hold the flange 618 of the neutral catch 619 against the edge of the control slide 601 so that normally the neutral catch 619 is positioned with the edge 911 thereof parallel to the path of movement of the control slide 601. However, the neutral catch 619 is pivotally connected to the control slide 601 so as to permit rotation thereof under certain conditions when the record changer is being operated as a manual player, as will be described in more detail hereinafter in connection with the manual play mechanism of the changer.

*Manual playing arrangement*

Considering now in more detail the manual playing mechanism of the present invention, it will be recalled from the general description of the changer that when the balance arm 103 is lifted upwardly and moved outwardly over the rest post 111 an arrangement is provided for disabling the automatic tripping mechanism of the changer so that either one record may be played a number of times or records may be manually deposited on the turntable 101 and played in succession by manual positioning of the tone arm 102 thereon. More particularly, the movement of the balance arm 103 outwardly to a position over the rest post 111 is employed to block movement of the velocity tripping arm 205 so that this arm is prevented from moving inwardly by an amount sufficient to engage the trip cam 202 and hence prevent the initiation of an automatic record changing cycle thereby. To this end, the bottom end of the balance arm shaft 851 is provided with a flat side 915 (FIG. 41) and a trip arm blocking member 916 (FIG. 21) is pivotally mounted on the bottom flange 336 of the main mounting bracket 335 by means of the stud 917. The blocking member 916 is provided with an offset arm 918 which is spring biased into engagement with the side of the balance arm shaft 851 by means of the trip arm blocking spring 919, this spring being connected between the blocking member 916 and the side flange 337 of the main mounting bracket 335. The blocking member 916 is also provided with an offset arm 920 which terminates in an upstanding portion 921 and the offset flange portion 790 of the trip arm 205 is provided with a cooperating shoulder 922.

When the balance arm 103 is positioned adjacent the spindle 105 so that the balance arm shaft pin 855 is positioned in alignment with the channel 854 in the balance arm support 115, the arm portion 918 of the blocking member 916 engages the side of the balance arm shaft 851 so that the blocking member 916 is held in the position shown in dotted lines at 925 in FIG. 21. When the blocking member 916 is in this position the end portion 921 thereof is positioned outside the path of the shoulder 922 on the trip arm 205 so that the trip arm may be moved inwardly to the position shown in FIG. 49, in which it may be engaged by the trip cam 202 so that an automatic tripping operation is performed in the manner described in detail heretofore. However, when the balance arm 103 is lifted upwardly and moved outwardly to a position over the rest post 111, the balance arm shaft 851 is rotated so that the flat 915 at the bottom end thereof moves to the position shown in full lines in FIG. 21, thus permitting the spring 919 to rotate the blocking member 916 until the arm 918 engages the flat 915, in the position shown in full lines in FIG. 21. Accordingly, as the tone arm 102 is moved inwardly over the record during the playing cycle, the trip arm 205 moves inwardly therewith until the shoulder 922 on the trip arm 205 engages the upstanding end portion 921 of the blocking member 916, at which point the trip arm 205 ceases to follow the inward movement of the tone arm 102 and is restrained in this position so that the end flange 800 thereof cannot move inwardly and be engaged by the trip cam 202. Accordingly, no automatic tripping operation is effected and the tone arm may be manually lifted off of the record and placed on the rest post so that a manual type of operation is provided.

During manual play operation the tone arm may be manually lifted off of the record and placed on the rest post 111 and during this outward movement of the tone arm the index bracket 711 is also rotated about the post 345 as the tongue 726 engages the end of the slot 722 in the pivot bracket 363. As the index bracket 711 is thus rotated the index pawl flange 436 successively engages the indexing steps 713a to 713d, inclusive, until the pawl flange 436 is positioned in engagement with the rest position step 713d, in which position the index pawl flange 436 is held in engagement with the step 713d by the spring 770 for the remainder of the manual playing period. Since the control slide 601 is interconnected with the index bracket 711 by means of the pin 608, when the index bracket 711 is thus manually moved to the rest position the control slide 601 is also held in the rest position shown in FIG. 5 although the speed control casting is positioned as shown in FIG. 15 with the idler wheel 172 in engagement with the turntable rim 141 since the above described outward movement of the tone arm 102 was effected manually during the playing period while the idler wheel 172 is driving the turntable 101.

When the control slide 601 is in the rest position shown in FIG. 5 the neutral catch 619 is positioned to block pivotal movement of the speed control casting 537 when automatic record changing operation is resumed since the pin 913 carried by the casting 537 would strike the edge portion 912 of the neutral catch, thus preventing the casting 537 from being rotated to the position shown in FIG. 12, at the mid-point of the record changing cycle. In order to prevent such a condition the neutral catch 619 is pivotally connected to the control slide 601, as described heretofore, and when an automatic record changing period is resumed after a manual playing period has been in effect and the speed control casting 537 is pivoted about the post 539 by engagement of the offset arm 548 with the end flange 549 of the cycling slide 221, the pin portion 913 engages the edge 912 of the neutral catch 619 and cams this catch outwardly to the position shown in FIG. 43 so that the speed control casting 537 may be pivoted in the normal manner during the record changing cycle without interference from the neutral catch 619. However, it will be noted that once the pin 913 has moved beyond the edge of the neutral catch 619 this catch is returned to its normal position by the spring 615 and thereafter the neutral catch 619 performs the above described function of holding the idler wheels out of engagement with the turntable rim 141 and the turret 156 when the machine is shut off after the shutoff record changing cycle.

In accordance with an alternative embodiment of the present invention, the above described manual play operation may be effected by means of the arrangement shown in FIGS. 69 and 70 in which figures the trip arm 205 is modified and is provided with an enlarged offset arm portion 930. In this embodiment, the spring 919, the blocking member 916, the mounting stud 917 and the flat 915 on the end of the balance arm shaft 851 of the previously described embodiment are all eliminated and the arm 930 of the embodiment shown in FIGS. 69 and 70 is simply blocked by the upstanding portion 605 of the control slide 601 when the control slide is in the rest position shown in FIG. 5. In the embodiment of FIGS. 69 and 70 the balance arm need not be lifted upwardly and moved outwardly over the rest post 111 but instead a manual playing period may be initiated during any playing cycle and while a stack of records is supported on the spindle 105 by merely lifting the tone arm off of the record and moving the tone arm outwardly to the rest post 111. As the tone arm is moved over to the rest post 111 the control slide 601 is moved to the rest position shown in FIGS. 5 and 70 and is held in held in this position by engagement of the index pawl flange 436 with the rest step 713d on the index bracket 711. Accordingly, as the tone arm is moved inwardly over the record during the manual playing operation the trip arm 205 moves in synchronism therewith until the arm portion 930 thereof (FIG. 69) engages the upstanding portion 605 of the control slide 601, as shown in dotted lines in FIGS. 69 and 70, at which point the trip arm 205 is blocked from further inward movement thus preventing an automatic tripping operation. However, as soon as the control arm 125 is moved to the on, reject position, an automatic record changing cycle is initiated and during this cycle the control slide 601 will be positioned from the rest position to one of its speed indexing positions, depending upon the size of the record released to the turntable during this record changing cycle. Since the control slide 601 is not positioned as far forward in these speed indexing positions as it is in the rest position thereof shown in FIG. 70, the upstanding portion 605 thereof does not interfere with inward movement of the trip arm 205 during the next playing cycle and automatic tripping operation is restored.

*Turntable braking mechanism*

Considering now in more detail the turntable braking mechanism of the present invention, it will be recalled from the general description of the changer that this mechanism is provided to bring the turntable 101 to a standstill as soon as a record changing cycle is initiated so that when the record is released to the turntable during the record changing cycle the turntable 101 and the records positioned thereon are stationary and the released record does not grind or scrape over records already positioned on the turntable as it is deposited during the record changing cycle. The braking action on the turntable 101 is released at substantially the end of the record changing cycle, and after the desired turntable sped has been set up by the automatic speed selecting mechanism described in detail heretofore, so that the turntable is brought up to the correct operating sped as the tone arm 102 engages the lead-in groove of the uppermost record on the turntable.

More particularly, a brake lever 935 (FIG. 5) is provided, the lever 935 being pivotally mounted on the depressed central portion 142 of the main base plate 100 by means of a downturned flange portion 936 which rests on the base plate portion 142 and terminates in a tongue portion 937 (FIG. 3) which extends through an aperture 938 in the base plate portion 142, the tongue portion 937 being turned outwardly so that the brake lever 935 is loosely retained within the opening 938. The brake lever 935 is provided with an arm portion 940 which rests on the upper edge of the flange 470 of the cycling slide 221 and is adapted to engage the end 941 (FIG. 4) of the upstanding flange extension 553 on the cycling slide 221. The lever 935 is also provided with an arm 942 which is positioned at an obtuse angle to the arm 940 and is provided with an upstanding end portion 944 (FIG. 4) which supports a brake pad 943, the end 945 of the lever 935 being clamped around the brake pad 943 to hold the same securely and permanently in place. The base plate portion 142 is provided with a raised section 946 (FIG. 4) on which the outer end of the arm 942 of the brake lever 935 rests and in this position the brake pad 943 is positioned at the correct level to engage the inner surface of the turntable rim 141. One end of a brake spring 950 is connected to an upstanding lug 951 on the brake lever 935 and the other end of the spring 950 is hooked over the adjacent edge of the base plate portion 142, as best illustrated in FIG. 5. The spring 950 acts to pivot the brake lever arm 942 outwardly so that the brake pad 943 engages the turntable rim 141. However, during playing periods when the cycling slide is in its rest position shown in FIG. 5, the arm 940 of the brake lever 935 engages the edge 941 of the upstanding flange 553 on the cycling slide 221 so that the brake lever 935 is blocked and the spring 950 is prevented from moving the brake pad 943 into engagement with the turntable rim 141.

As soon as the record changing cycle is initiated and the cycling slide 221 starts to move in the direction of the arrow 473 the flange 553 on the cycling slide 221 moves forwardly and thus permits the spring 950 to rotate the lever 935 so that the brake pad 943 is brought into engagement with the turntable rim 141. During this portion of the record changing cycle the speed control casting 537 has been pivoted about the post 539 by engagement of the offset arm 548 thereof with the end flange 549 on the slide 221 by an amount sufficient to move the idler wheel 172 out of engagement with the turntable rim 141. Accordingly, when the brake pad 943 engages the turntable rim 141 the idler wheel 172 has been moved out of engagement therewith and hence the turntable is brought quickly to a standstill by virtue of the force exerted on the brake lever 935 by the spring 950. In this connection it will be noted that the spring 950 extends downwardly at an angle to the base plate portion 142, as best illustrated in FIG. 4, and hence exerts a downward force on the brake lever 935 which holds the arm portion 942 thereof in place against the surface of the raised portion 946 of the base plate portion 142.

During the last half of the record changing cycle the cycling slide 221 moves rearwardly in the direction of the arrow 477 and as it nears its rest position the edge 941 of the flange 553 engages the arm 940 and pivots the brake lever 935 so that the brake pad 943 is moved out of engagement with the turntable rim 141. At the same time the speed control casting 537 is pivoted about the post 539 as the offset arm 548 thereof reaches the end flange 549 so that as the brake pad 943 is withdrawn from the turntable rim the idler wheel 172 is moved into engagement therewith and brings the turntable 101 up to the desired playing speed as the tone arm is being moved into engagement with the lead-in groove of the record deposited on the turntable during this record changing cycle. In this connection it will be understood that in the event that no braking action on the turntable 101 is desired during the record changing cycle, the brake lever 935 and spring 950 may be omitted, with the result that the turntable 101 will coast during record changing cycles when the idler wheel 172 is removed from the turntable rim 141 and without affecting the operation of the other portions of the changer described in detail heretofore.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In an automatic phonograph changer having a chassis and a turntable supported thereon, a tone arm, means including a shaft extending vertically from said chassis to mount said tone arm for horizontal movement about a vertical axis, automatic record changing means supported upon said chassis for depositing individual records on said turntable and for placing the outer end of said tone arm onto the outer edge of each record after it is placed on said turntable, an anti-skate device for preventing said tone arm from skating across a record when said tone arm is set down upon the record, said device comprising a first member frictionally secured for horizontal rotation about said vertical shaft in response to movement of said tone arm, a second member mounted on said chassis and movable into and out of engagement with said first member for selectively inhibiting rotation of said first member thereby frictionally opposing horizontal movement of said tone arm about said vertical shaft, and anti-skate activating means connected to and operable from said automatic record changing means and engageable with said second member for moving said second member into engagement with said first member during the portion of the changing cycle of said automatic phonograph wherein said tone arm is lowered onto a record.

2. In an automatic phonograph changer having a chassis and a turntable supported thereon, a tone arm, means including a shaft extending vertically from said chassis to mount said tone arm for horizontal movement about a vertical axis, automatic record changing means supported upon said chassis for depositing individual records on said turntable and for placing the outer end of said tone arm onto the outer edge of each record after it is placed on said turntable, an anti-skate device for preventing said tone arm from skating across a record when said tone arm is set down upon the record, said device comprising a first member frictionally secured for horizontal rotation about said vertical shaft in response to movement of said tone arm, a second member mounted on said chassis and movable into and out of engagement with said first member, and anti-skate activating means connected to and operable from said automatic record changing means for moving said second member into engagement with said first member during the portion of the changing cycle of said automatic phonograph wherein said tone arm is lowered onto a record, wherein engagement of said first and said second member introduces a friction drag between said tone arm and said chassis through said anti-skate device, the friction drag being in opposition to horizontal movement of said tone arm.

3. In combination with an automatic phonograph changer and a tone arm mounted in said changer for horizontal movement about a vertical shaft, an anti-skate device for preventing said tone arm from skating across the surface of a record when said tone arm is lowered thereon during the change cycle of said phonograph comprising, a first movable member frictionally secured for horizontal rotation about said vertical shaft in response to horizontal movement of said tone arm, a second member stationary with respect to horizontal movement of said tone arm, activating means in said automatic phonograph changer for selectively engaging and disengaging said second member and said movable member, said activating means engaging said second member with said movable member during the portion of the change cycle of said phonograph when said tone arm is lowered onto a record thereby introducing a friction drag opposing horizontal movement of said tone arm about said vertical shaft.

4. An anti-skate device for use with a horizontally rotatable tone arm and stylus comprising, a first member frictionally secured to and horizontally rotatable with the tone arm as the tone arm is lowered onto the record and during the period in which the tone arm stylus engages the lead-in groove of the record, said first member movable with respect to the tone arm against the force of friction between said movable member and the tone arm, a second member fixed with respect to rotation of the tone arm, said first and second members being selectively interengageable for selectively introducing a frictional force resisting horizontal rotation of the tone arm, and selective activation means for effecting interengagement of said first and second members.

5. In an automatic phonograph having a chassis and a turntable supported thereon, a tone arm, means including a shaft extending vertically from said chassis to mount said tone arm for horizontal movement about a vertical axis, an automatic record changing element, an anti-skate device for preventing said tone arm from skating across a record when said tone arm is set down upon the record comprising a first member frictionally secured for horizontal rotation about said vertical shaft in response to movement of said tone arm, a second member mounted on said chassis and movable into and out of engagement with said first member for selectively inhibiting rotation of said first member thereby frictionally opposing horizontal movement of said tone arm about said vertical shaft, and anti-skate activating means connected to and operable from said automatic record changing element and engageable with said second member for moving said second member into engagement with said first member during the portion of the changing cycle of an automatic phonograph wherein said tone arm is lowered onto a record.

6. In an automatic record changer, a rotatable turntable for supporting records to be played, means for rotating said turntable, automatic record changer means including centering spindle means for supporting a stack of records above said turntable and successively releasing individual records of the stack onto said turntable during successive record changing cycles, a tone arm pivotally mounted beyond the edge of said turntable and adapted to engage a record thereon, automatic tripping means responsive to movement of said tone arm for initiating a record changing cycle, a balance arm pivotally mounted beyond the edge of said turntable and adapted to be moved to a point adjacent said centering spindle means and positioned in engagement with the uppermost record of a stack of records supported on said centering spindle means so that the record stack is held substantially horizontal, and means responsive to movement of said balance arm to a point beyond the edge of said turntable for disabling said automatic tripping means.

7. In an automatic record changer, a rotatable turntable for supporting records to be played, drive means for rotating said turntable during playing cycles, a tone arm pivotally mounted beyond the edge of said turntable, automatic record changing means for supporting a stack of records above said turntable and successively releasing individual records of the stack onto said turntable during successive record changing cycles, said automatic record changing means including means for moving said tone arm outwardly beyond the edge of said turntable before a record is released from the stack and thereafter positioning said tone arm for engagement with the released record after it has been deposited on said turntable, means for stopping said turntable during at least a portion of each record changing cycle, and means for preventing said tone arm from skipping inwardly over the initial grooves of the released record as said tone arm is engaged therewith and said turntable is rotated by said drive means.

8. In an automatic record changer, a rotatable turntable for supporting records to be played, a tone arm pivotally mounted beyond the edge of said turntable, automatic record changing means for supporting a stack of records above said turntable and successively releasing individual records of the stack onto said turntable during successive record changing cycles, said automatic record changing means including means for moving said tone arm outwardly beyond the edge of said turntable before a record is released from the stack and thereafter positioning said tone arm for engagement with the released record after it has been deposited on said turntable, a friction exerting member mounted for rotation with said tone arm and adapted to exert a predetermined frictional drag on said tone arm when said member is restrained, means for continuously restraining said member as the tone arm engages a record deposited on said turntable, and means for thereafter removing said restraint so that said member is again permitted to move with said tone arm.

9. In an automatic phonograph changer having a chassis and a turntable supported thereon, a tone arm, means including a shaft extending vertically from said chassis to mount said tone arm for horizontal movement about a vertical axis, automatic record changing means supported upon said chassis for depositing individual records on said turntable and for placing the outer end of said tone arm onto the outer edge of each record after it is placed on said turntable, an anti-skate device for preventing said tone arm from skating across a record when said tone arm is set down upon the record, said device comprising a first member frictionally secured for horizontal rotation about said vertical shaft in response to movement of said tone arm, and a second member movable into and out of engagement with said first member for selectively inhibiting rotation of said first member thereby frictionally opposing horizontal movement of said tone arm about said vertical shaft, said second member being engaged with said first member during the portion of the changing cycle of said automatic phonograph wherein said tone arm is lowered onto a record.

10. An anti-skate device for use with a horizontally rotatable tone arm and stylus comprising, a first member frictionally secured to and horizontally rotatable with the tone arm as the tone arm is lowered onto the record and during the period in which the tone arm stylus engages the lead-in groove of the record, said first member movable with respect to the tone arm against the force of friction between said movable member and the tone arm, and a second member selectively engageable with said first member for selectively introducing a frictional force resisting horizontal rotation of the tone arm.

11. In an automatic record changer, a rotatable turntable for supporting records to be played, drive means for rotating said turntable during record playing cycles, automatic record changing means for supporting a stack of records spaced from said turntable and successively depositing individual records of the stack onto said turntable during successive record changing cycles, and means controlled by said automatic record changing means for stopping said turntable during at least a portion of the record changing cycle so that said turntable is substantially stationary when a record is released thereon by said automatic record changing means.

12. The combination as set forth in claim 11, wherein said automatic record changing means includes a reciprocating member, and brake means controlled by movement of said reciprocating member during the record changing cycle for stopping said turntable during at least a portion of the record changing cycle.

13. The combination as set forth in claim 11, wherein said automatic record changing means includes a cycling member movable over a predetermined path during a record changing cycle, and means controlled by movement of said cycling member during the record changing cycle for disengaging said drive means from said turntable and applying a braking force to said turntable during at least a portion of the record changing cycle so that said turntable is maintained substantially stationary when a record is deposited thereon by said automatic record changing means.

14. The combination as set forth in claim 11, wherein said automatic record changing means includes a reciprocating slide movable in a first direction during the first half of the record changing cycle and movable in the opposite direction during the last half of the record changing cycle, a pivotally mounted brake lever, means for holding said brake ever out of engagement with said turntable between record changing cycles, means for moving said brake lever into engagement with said turntable in response to movement of said slide in said one direction, and means for moving said brake lever out of engagement with said turntable in response to movement of said slide in said opposite direction.

15. The combination as set forth in claim 11, wherein said drive means includes an idler wheel adapted to engage the rim of said turntable, brake means for said turntable, means for moving said idler wheel out of engagement with said turntable rim and applying said brake means to said turntable during the initial portion of the record changing cycle, and means for releasing said brake means and re-engaging said idler wheel with said turntable rim during the latter part of the record changing cycle.

16. The combination as set forth in claim 15, wherein slip clutch means is included in said drive means for preventing an abrupt increase in the speed of said turntable when said idler wheel is re-engaged therewith.

17. In an automatic record changer, a rotatable turntable, a tone arm provided with a stylus adapted to engage the grooves of a record on said turntable, automatic record changing means for supporting a stack of records above said turntable and successively releasing individual records of the stack onto said turntable during successive record changing cycles, said automatic record changing means including a cycling slide movable over a predetermined longitudinal path during the record changing cycle and means responsive to said longitudinal movement of said cycling slide for positioning said tone arm for engagement with the released record after it has been deposited on said turntable, means for producing a frictional drag on said tone arm during the period said stylus engages the spiral lead-in groove portion of a record on said turntable which force is sufficient to prevent said stylus from skipping inwardly over the slick surface of the spiral lead-in groove portion of the record but is slight enough to be overcome when the stylus engages the lead-in groove and is led thereby to the initial recorded groove of the record, and means for removing said frictional drag after said stylus is in engagement with the lead-in groove of the record.

References Cited

UNITED STATES PATENTS 2,803,465  8/1957  Dobrogowski et al. ____ 274—10
2,959,419  11/1960  Edema _____ 274—10

NORTON ANSHER, *Primary Examiner.*

JOSEPH F. PETERS, JR., *Assistant Examiner.*